United States Patent
Urushihara et al.

(10) Patent No.: US 8,487,206 B2
(45) Date of Patent: Jul. 16, 2013

(54) JOINT PRODUCT BETWEEN STEEL PRODUCT AND ALUMINUM MATERIAL, SPOT WELDING METHOD FOR THE JOINT PRODUCT, AND ELECTRODE CHIP FOR USE IN THE JOINT PRODUCT

(75) Inventors: Wataru Urushihara, Kobe (JP); Mikako Takeda, Kobe (JP); Katsushi Matsumoto, Kobe (JP); Jun Katoh, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/192,069

(22) Filed: Jul. 27, 2011

(65) Prior Publication Data
US 2012/0021240 A1 Jan. 26, 2012

Related U.S. Application Data

(62) Division of application No. 12/280,599, filed as application No. PCT/JP2007/053228 on Feb. 21, 2007.

(30) Foreign Application Priority Data

Feb. 23, 2006 (JP) ................. 2006-047090
Mar. 2, 2006 (JP) ................. 2006-056751
Aug. 30, 2006 (JP) ................. 2006-234054
Nov. 20, 2006 (JP) ................. 2006-313139

(51) Int. Cl.
*B23K 11/11* (2006.01)
*B23K 11/20* (2006.01)

(52) U.S. Cl.
USPC ........................................ 219/91.2

(58) Field of Classification Search
None
See application file for complete search history.

(56) References Cited

U.S. PATENT DOCUMENTS 6,543,670 B2 * 4/2003 Mahoney .................. 228/112.1
7,521,129 B2 * 4/2009 Takeda et al. ................. 428/653
(Continued)

FOREIGN PATENT DOCUMENTS

JP  50 152948       12/1975
JP  63-177977        7/1988
(Continued)

OTHER PUBLICATIONS

Japanese Office Action issued Feb. 14, 2012 in patent application No. 2007-067030 with English translation.

(Continued)

*Primary Examiner* — John J Zimmerman
(74) *Attorney, Agent, or Firm* — Oblon, Spivak, McClelland, Maier & Neustadt, L.L.P.

(57) ABSTRACT

Provided is a joint product of a steel product and an aluminum material, the joint product being formed by joining the steel product having a sheet thickness $t_1$ of 0.3 to 3.0 mm with the aluminum material having a sheet thickness $t_2$ of 0.5 to 4.0 mm by spot welding, wherein a nugget area in a joint part is from $20 \times t_2^{0.5}$ to $100 \times t_2^{0.5}$ mm$^2$, an area of a portion where a thickness of an interface reaction layer is from 0.5 to 3 μm is $10 \times t_2^{0.5}$ mm$^2$ or more, and a difference between the thickness of the interface reaction layer at a joint part center and the thickness of the interface reaction layer at a point distant from the joint part center by a distance of one-fourth of a joint diameter is 5 μm or less, and wherein the aluminum material is pure aluminum or an aluminum alloy material.

2 Claims, 11 Drawing Sheets

U.S. PATENT DOCUMENTS

| | | | |
|---|---|---|---|
| 7,951,465 B2 * | 5/2011 | Urushihara et al. | 428/572 |
| 2006/0081563 A1 | 4/2006 | Ueda et al. | |
| 2006/0275623 A1 | 12/2006 | Takeda et al. | |
| 2007/0212565 A1 | 9/2007 | Urushihara et al. | |
| 2008/0206594 A1 * | 8/2008 | Fukuda et al. | 428/653 |
| 2011/0097595 A1 * | 4/2011 | Takeda et al. | 428/594 |
| 2011/0123825 A1 * | 5/2011 | Sakurai et al. | 428/650 |

FOREIGN PATENT DOCUMENTS

| | | |
|---|---|---|
| JP | 64-62285 | 3/1989 |
| JP | 2 50832 | 11/1990 |
| JP | 4 46684 | 2/1992 |
| JP | 4 143083 | 5/1992 |
| JP | 4 251676 | 9/1992 |
| JP | 5 228643 | 9/1993 |
| JP | 6 55277 | 3/1994 |
| JP | 6 63763 | 3/1994 |
| JP | 7 24581 | 1/1995 |
| JP | 7 178563 | 7/1995 |
| JP | 7 178565 | 7/1995 |
| JP | 7-214338 A | 8/1995 |
| JP | 9 174249 | 7/1997 |
| JP | 11 342477 | 12/1999 |
| JP | 2003 145278 | 5/2003 |
| JP | 2004 114108 | 4/2004 |
| JP | 2005-67029 | 3/2005 |
| JP | 2005 305504 | 4/2005 |
| JP | 2005 152958 | 6/2005 |
| JP | 2005 152959 | 6/2005 |
| JP | 2005-193298 | 7/2005 |
| JP | 2005 319481 | 11/2005 |
| JP | 2005-334971 A | 12/2005 |
| JP | 2006 167801 | 6/2006 |
| JP | 2006 289452 | 10/2006 |
| WO | 2005 030424 | 4/2005 |
| WO | 2005 102586 | 11/2005 |

OTHER PUBLICATIONS

Japanese Office Action issued Mar. 13, 2012 in patent application No. 2007-047494.

Office Action issued Apr. 4, 2012 in European Patent Application No. 11 002 467.6-1262.

Office Action issued Mar. 27, 2012 in Japanese Application No. 2007-067029 (With English Translation).

Kyoko Hamahara, et al., "Effect of Mg in Phosphate on corrosion resistance", The Iron and Steel Institute of Japan (ISIJ), materials and processes: report of the ISIJ meeting Mar. 1, 1999, vol. 12, No. 1, CAMP-ISIJ vol. 15, 2002, p. 1284.

Kyoko Hamahara, et al., "Corrosion Behavior of Mg containing Phosphated Electrogalvanized Steel Sheet", The Iron and Steel Institute of Japan (ISIJ), materials and processes: report of the ISIJ meeting Mar. 1, 1999, vol. 12, No. 1, CAMP-ISIJ vol. 16, 2003, p. 1280-1283 (With Partial English Translation).

Extended European Search Report issued Jun. 17, 2011, in Patent Application No. 11002467.6.

Office Action issued Sep. 8, 2010, in Chinese Patent Application No. 200780006234.5 (with English translation).

Office Action issued Sep. 6, 2010 in Korean Application No. 10-2008-7020545 (With English Translation).

Extended European Search Report issued Oct. 5, 2010 in European Application No. 07714728.8.

* cited by examiner

JOINT PRODUCT BETWEEN STEEL PRODUCT AND ALUMINUM MATERIAL, SPOT WELDING METHOD FOR THE JOINT PRODUCT, AND ELECTRODE CHIP FOR USE IN THE JOINT PRODUCT

CROSS-REFERENCE TO RELATED APPLICATIONS

The present application is a divisional of U.S. patent application 12/280,599, filed on Aug. 25, 2008, which is a 35 U.S.C. §371 National Stage patent application of International patent application PCT/JP2007/053228, filed on Feb. 21, 2007, which claims priority to Japanese patent applications JP 2006-313139, filed on Nov. 20, 2006, JP 2006-234054, filed on Aug. 30, 2006, JP 2006-056751, filed on Mar. 2, 2006, and JP 2006-047090, filed on Feb. 23, 2006.

TECHNICAL FIELD

The present invention relates to a technique of joining a steel product with an aluminum material by spot welding, which is required in the assembling process of a transit vehicle such as automobile and railway vehicle, a mechanical part, a building structure or the like.

BACKGROUND ART

Spot welding generally joins together similar metal members with each other. However, if it is applicable to joining of dissimilar metal members (dissimilar material joint product), for example, joining of an iron-based material (hereinafter simply referred to as a "steel product") and an aluminum-based material (a generic term for pure aluminum and aluminum alloys; hereinafter simply referred to as an "aluminum material"), this can greatly contribute to weight saving and the like.

However, in joining together a steel product and an aluminum materials a brittle intermetallic compound is readily produced at the joint part and it is very difficult to obtain a joint part having reliably high strength (bonding strength). Accordingly, joining for such a dissimilar material joint product (joint product of dissimilar metal members) has been conventionally performed using a bolt, a rivet or the like, but this has a problem in the coupling joint reliability, airtightness, cost and the like.

To solve such a problem, many studies have been heretofore made on a spot welding method for these dissimilar material joint products. For example, a method of inserting an aluminum-steel clad material between an aluminum material and a steel product has been proposed (see, Patent Documents 1 and 2). Also, a method of plating or inserting a metal having a low melting point on the steel product side has been proposed (see, Patent Documents 3, 4 and 5). Furthermore, there have been proposed, for example, a method of sandwiching an insulator particle between an aluminum material and a steel product (see, Patent Document 6) and a method of previously creating irregularities on a member (see, Patent Document 7).

However, all of these methods involve not a simple spot welding but a spot welding in multiple layers, require a separate step such as plating or working, raise an issue that new equipment must be incorporated into the ousting welding line, or incur a rise of the welding cost. Furthermore, these methods all have many problems in view of operation, such as severe limitations on the welding conditions.

Patent Documents 8 to 11 have proposed a method of applying a film such as plating to steel by a different technique. These patent publications are aiming at reducing the interface reaction layer or creating irregularities on the interface by forming a highly general-purpose film having a low melting point between steel and an aluminum material, because the previously plated steel or aluminum material allows for direct welding, and each demonstrates that higher strength than that in direct joining of steel with an aluminum material is obtained. Also, depending on the kind of plating, dissimilar metal contact corrosion, which occurs between steel and an aluminum material, can be suppressed. The film formed is Mg in Patent Document 8, a film lower in the melting point than an aluminum material in Patent Document 9, a film lower in the melting point than steel in Patent Document 10, and a film having a melting point which is not less than a temperature 300° C. lower than the melting point of an aluminum material and is a temperature lower than the melting point of an aluminum material in Patent Document 11.

However, in Patent Document 8, the strength is 80 kgf and is insufficient, though the breaking is a base material rupture. In Patent Document 9, sufficiently high tensile shear strength is obtained but a nugget is not formed. Merely by an anchor effect owing to such microscopic bonding, tensile shear strength may be ensured but cross tensile strength (peel strength) cannot be maintained, and the usage is limited to special cases involving only tensile shear stress.

In Patent Document 10, a resistive element needs to be further inserted and this not only raises the above-described issue that new equipment must be incorporated into the existing welding line, but also incurs a rise in the cost. In Patent Document 11, although base material rupture is obtained with respect to the cross tensile strength, an interface reaction layer is not formed and this is described as an action of realizing high strength. Certainly, the interface reaction layer which is an intermetallic compound of steel and aluminum is brittle, but according to the present inventors, it is found that if the interface reaction layer is not present at all as in Patent Document 10, an adherence layer by interdiffusion is in turn not formed and low bonding strength results. Accordingly, similarly to Patent Document 9, merely by microscopic bonding, sufficiently high cross tensile strength cannot be maintained, and the demand for a higher-strength joint product cannot be responded to.

The present inventors have continuously made studies mainly for optimizing the structure of the interface reaction layer at the joint part formed by spot welding and found that a dissimilar material joint product having high bonding strength can be produced by controlling the thickness, area and structure of the interface reaction layer.

In Patent Documents 12 to 15, the present inventors have proposed a technique where a peel strength of 0.9 kN/spot or more can be obtained by controlling the thickness and melting point of plating film and further controlling the nugget diameter and the thickness of interface reaction layer.

Patent Document 1: JP-A-6-63763
Patent Document 2: JP-A-7-178563
Patent Document 3: JP-A-4-251676
Patent Document 4: JP-A-7-24581
Patent Document 5: JP-A-4-143083
Patent Document 6: JP-A-5-228643
Patent Document 7: JP-A-9-174249
Patent Document 8: JP-A-4-143083
Patent Document 9: JP-A-4-251676
Patent Document 10: JP-A-7-24581
Patent Document 11: JP-A-7-178565
Patent Document 12: JP-A-2005-305504

Patent Document 13: JP-A-2005-152958
Patent Document 14: JP-A-2005-152959
Patent Document 15: JP-A-2006-167801

DISCLOSURE OF THE INVENTION

Problem that the Invention is to Solve

However, in order to meet the requirements for more increase in the strength of an assembly and reduction in the number of weld spots, it is demanded to complete a spot welding technique ensuring that higher bonding strength is obtained.

Even the techniques of Patent Documents 12 to 15 have a limit in more increasing the bonding strength. In particular, contact corrosion called electrical erosion is readily generated between dissimilar metals, that is, steel and aluminum material, and this is no exception in a dissimilar material joint product obtained by joining a steel product with an aluminum material by spot welding. If such electrical erosion occurs during use of a dissimilar material joint product as an automotive member or the like, the bonding strength of the dissimilar material joint product decreases.

Accordingly, such contact corrosion needs to be suppressed so that a dissimilar material joint product obtained by joining a steel product with an aluminum material by spot welding can be used in practice as an automotive member or the like. For suppressing such contact corrosion, it is effective to insulate a steel product from an aluminum material by an organic resin film or the like. However, when a steel product is insulated from an aluminum material by an organic resin film or the like, this makes it difficult to perform the spot welding itself where these materials are welded together by passing electricity therebetween, though the contact corrosion may be suppressed. Conversely, there arises a problem that the bonding strength of the dissimilar material joint product, by spot welding decreases.

Under these circumstances, little has been so far proposed for the effective technique ensuring that not only the bonding strength of a dissimilar material joint product obtained by joining a steel product with an aluminum material by spot welding can be increased but also the contact corrosion can be suppressed.

There is also a problem that in a dissimilar material joint product between a steel product and an aluminum material, spot weldability with a galvanized steel sheet used for general purpose on the steel product side of an automotive body panel or the like is worse than with a bare steel sheet.

This is attributable to the fact that in addition to the brittle intermetallic compound produced in the joint part of dissimilar joint, a brittle Zn—Fe-based compound layer deriving from galvanization is inevitably produced in dissimilar joint between a galvanized steel sheet (galvanized steel product) and an aluminum material. This Zn—Fe-based compound layer is brittle and therefore, breaking starts therefrom to extremely decrease the bonding strength.

The present invention has been made to solve these various problems. An object of the present invention is to provide a joint product of a steel product and an aluminum material, and a spot welding method for the joint product, ensuring that in joining a steel product with an aluminum material by spot welding, a joint product with excellent bonding strength can be formed by an existing spot welding apparatus at a low cost, unlike the above-described conventional techniques, without newly using other materials such as clad material or without newly adding a separate step.

Another object of the present invention is to provide a dissimilar material joint product and a spot welding method for the dissimilar material joint product, ensuring that in joining a steel product with an aluminum material by spot welding, the bonding strength can be increased and at the same time, contact corrosion can be suppressed.

Still another object of the present invention is to provide a joint product of a steel product and an aluminum material, ensuring that even a galvanized steel sheet (steel product) can be spot-welded with high bonding strength.

Means for Solving the Problem

As described below, the present inventors have forte made advanced studies to attain these objects, thereby accomplishing the present invention.

Spot welding of similar materials to each other, for example, steel products to each other or aluminum materials to each other, is generally attained by promoting the formation of a nugget, and it is known that as the nugget area is larger, both shear strength and cross tensile strength are higher.

The nugget area (diameter) has a strong relationship with the amount of heat input and becomes larger as the amount of current is higher and the time is longer. Therefore, a joint product with high bonding strength is generally obtained by controlling the nugget area by the amount of heat input at the spot welding. Of course, it is important to obtain an appropriate nugget area, because if the nugget area is excessively large, the melted part reaches the non-joining surface (surface opposite the joining surface) of the material to be joined and this causes surface flash.

On the other hand, in joining together dissimilar materials, that is, a steel product and an aluminum material, the amount of heat generated on the steel product side is larger than that generated on the aluminum material side, because the steel product is high in both the melting point and the electrical resistance and low in the thermal conductivity as compared with the aluminum material. Consequently, the aluminum material having a low melting point starts melting from the surface in contact with the steel product. Subsequently, the steel product surface in contact with the aluminum material melts, as a result, an Al—Fe-based brittle intermetallic compound layer (hereinafter referred to as an "interface reaction layer") is formed at the joint interface, failing in obtaining high bonding strength.

It is known that the intermetallic compound formed by spot bonding between a steel product and an aluminum material is roughly divided into two layers, that is, an $Al_5Fe_2$-based compound (this means an intermetallic compound $Al_5Fe_2$ defined in Table 10 and the like described later) is formed on the steel product side and an $Al_3Fe$-based compound (this means an intermetallic compound $Al_3Fe$ defined in Table 10 and the like described later) is formed on the aluminum material side. These intermetallic compounds are very brittle and therefore, it is heretofore supposed that high bonding strength cannot be obtained.

In addition, in the spot bonding between a galvanized steel sheet (galvanized steel product) and an aluminum material, as described above, a Zn—Fe-based compound (this means an intermetallic compound $Fe_3Zn$, defined in Table 10 and the like described later) layer deriving from galvanization is produced and inevitably included in the above-described compound layer. This Zn—Fe-based compound layer is brittle, and breaking starts therefrom to extremely reduce the bonding strength.

Also, if the melting reaches the non-joining surface of the aluminum material to cause surface flash, reduction in the thickness of the aluminum material increases and high bonding strength is still not obtained.

In other words, in the case of joining dissimilar materials, that is, a steel product and an aluminum material, together by spot welding, a heat input high enough to form a nugget in a certain diameter is required for obtaining high bonding strength. However, the present inventors have found that in order to obtain higher bonding strength, it is necessary to control the area or thickness distribution of the interface reaction layer formed rather than to control the nugget diameter.

More specifically, in the case of joining together dissimilar materials, that is, a steel product and an aluminum material, a heat input high enough to form a nugget having a predetermined area is necessary for obtaining high bonding strength, but it is required to minimize the melting of the steel product for restraining the formation of an interface reaction layer at the joint interface and suppress the generation of surface flash to the least extent.

In this respect, as for the spot welding conditions, it is considered that when the steel product and the aluminum material can be restrained from heat generation and the melting of the steel product at the joint interface can be suppressed as uniformly and largely as possible while obtaining a large nugget area by passing a high current, a thin and wide interface reaction layer can be formed and high bonding strength can be obtained.

However, when a high current is supplied in a conventional spot welding method, the joint part center comes to have a high current density and cause heat generation/melting of the steel product and melting of the aluminum material to a great extent and therefore, a thick interface reaction layer is formed in the joint part center. It may be possible to attain joining over a wide area by increasing the tip R of the electrode chip and reducing the concentration of the current on the joint part center, but the interface reaction layer in the joint part center is still thick and depending on the welding conditions, a defect is developed in the aluminum material in the joint part center.

In the studies so far, considering that the bonding strength is governed by the periphery of the joint part but not the center thereof, increase in the thickness of the interface reaction layer in the center is neglected, but analysis in more detail has revealed that even when the interface reaction layer in the periphery is thick to the same extent, if the thickness of the interface reaction layer in the center exceeds a certain level, the bonding strength decreases and further, not only the outer appearance is impaired due to generation of surface flash but also the thickness distribution of the interface reaction layer in the periphery is changed, giving rise to fluctuation of the bonding strength.

That is, it is found that for more increasing the bonding strength than ever, it is important to join a steel product with an aluminum material at a current as high as possible while suppressing heat generation and dispersing the current density and to control the interface reaction layer of a dissimilar material joint product obtained by joining, including the joint part center, to have an optimal thickness range in a large area.

The following inventions have been accomplished based on these findings.

For attaining the above-described objects, a gist of the present invention is a joint product of a steel product and a pure aluminum or aluminum alloy material (which is hereinafter referred to as an aluminum material), the joint product being formed by joining a steel product having a sheet thickness $t_1$ of 0.3 to 3.0 mm with an aluminum material having a sheet thickness $t_2$ of 0.5 to 4.0 mm by spot welding, wherein a nugget area in a joint part is from $20 \times t_2^{0.5}$ to $100 \times t_2^{0.5}$ mm$^2$, an area of a portion where a thickness of an interface reaction layer is from 0.5 to 3 μm is $10 \times t_2^{0.5}$ mm$^2$ or more, and a difference between the thickness of the interface reaction layer at a joint part center and the thickness of the interface reaction layer at a point distant from the joint part center by a distance of one-fourth of a joint diameter is 5 μm or less.

The maximum thickness of the interface reaction layer is preferably in a range of 0.5 to 10 μm.

An electrode chip for use in spot welding for forming the joint product in the above-mentioned gist is preferably an electrode chip which is brought into contact with a material to be joined at two or more points or in a linear or planar manner.

In the above-described electrode chip, the tip is preferably formed in a dome shape and a recess having a diameter of 2 mm or more is preferably formed in the center of the tip.

The spot welding method for forming the joint product in the above-mentioned gist preferably uses the above-described electrode chip for at least one of a pair of electrode chips.

In the above-described spot welding method, the spot welding is preferably performed while cooling at least one of the steel product and the aluminum material to 5° C. or less.

For attaining the above-described objects, another gist of the present invention is a dissimilar material joint product of a steel product and an aluminum material, the dissimilar material joint product being formed by joining a steel product having a sheet thickness $t_1$ of 0.3 to 3.0 mm with an aluminum material having a sheet thickness $t_2$ of 0.5 to 4.0 mm by spot welding, wherein the spot welding is performed in such a state that a Zn, Zn alloy, Al or Al alloy film having a melting point of 350 to 1,000° C. and an average thickness of 3 to 19 μm and an organic resin adhesive film or phosphate film are previously provided between a joining surface of the steel product and the aluminum material to be joined together, and an area of a portion where a thickness of an interface reaction layer in a welded part after the spot welding is from 0.5 to 5 μm is $10 \times t_2^{0.5}$ mm$^2$ or more.

In the above, for increasing the bonding strength of the dissimilar material joint product the area of the portion where the thickness of the interface reaction layer is from 0.5 to 5 μm is preferably $50 \times t_2^{0.5}$ mm$^2$ or more.

Similarly, for increasing the bonding strength of the dissimilar material joint product, the Zn or Zn alloy film is a plating film which contains 88 mass % or more of Zn and is applied to a surface on the steel product side.

Similarly, for increasing the bonding strength of the dissimilar material joint product, the average thickness of the phosphate film is preferably from 0.1 to 5 μm. Also, the phosphate film preferably contains from 0.01 to 10 mass % of Mg.

For attaining the above-described objects, still another gist of the present invention is a spot welding method for a dissimilar material joint product of a steel product having a sheet thickness $t_1$ of 0.3 to 3.0 mm and an aluminum material having a sheet thickness $t_2$ of 0.5 to 4.0 mm, the method comprising performing a spot welding in such a state that a Zn or Al metal film having a melting point of 350 to 1,000° C. and an average thickness of 3 to 19 μm and an organic resin adhesive film are previously provided between a joining surface of the steel product and the aluminum material to be joined together, wherein the spot welding is performed with a current pattern having a step of applying a welding pressure by electrode chips, with the electrode chip on the aluminum material side having a tip diameter of 7 mmφ or more, to satisfy a relationship of $(R \times W)^{1/3}/R > 0.05$ between a tip curvature radius R mm and the welding pressure W kN while passing a current of $15 \times t_2^{0.5}$ to $30 \times t_2^{0.5}$ kA for $100 \times t_2^{0.5}$ to $1,000 \times t_2^{0.5}$ msec, and having no other step of passing a current higher than the current in the above-described step.

In the above, for increasing the bonding strength of the dissimilar material joint product, the area of a portion where the thickness of the interface reaction layer is from 0.5 to 5 μm is preferably $50 \times t_2^{0.5}$ mm$^2$ or more.

For attaining the above-described objects, still more another gist of the present invention is a spot welding method for a dissimilar material joint product of a steel product having a sheet thickness $t_2$ of 0.3 to 3.0 mm and an aluminum material having a sheet thickness $t_2$ of 0.5 to 4.0 mm, the method comprising performing a spot welding in such a state that a Zn or Zn alloy film having a melting point of 350 to 1,000° C. and an average thickness of 3 to 19 μm and a phosphate film are previously provided between a joining surface of the steel product and the aluminum material to be joined together, wherein the spot welding is performed with a current pattern having a step of applying a welding pressure by electrode chips, with the electrode chip on the aluminum material side having a tip diameter of 7 mmφ or more, to satisfy a relationship of $(R \times W)^{1/3}/R > 0.05$ between a tip curvature radius R mm and the welding pressure W kN while passing a current of $15 \times t_2^{0.5}$ to $30 \times t_2^{0.5}$ kA for $100 \times t_2^{0.5}$ to $1,000 \times t_2^{0.5}$ msec, and having no other step of passing a current higher than the current in the above-described step.

Similarly, for increasing the bonding strength of the dissimilar material joint product, the spot welding is preferably preformed with a current pattern having a step of passing a current $1 \times t_2^{0.5}$ to $10 \times t_2^{0.5}$ kA for $100 \times t_2^{0.5}$ to $1,000 \times t_2^{0.5}$ msec after the step of passing a current of $15 \times t_2^{0.5}$ to $30 \times t_2^{0.5}$ kA for $100 \times t_2^{0.5}$ to $1,000 \times t_2^{0.5}$ msec.

For attaining the above-described objects, still furthermore another gist of the present invention is a dissimilar material joint product of a steel product and an aluminum material, the dissimilar material joint product being formed by joining a galvanized steel product which has a sheet thickness $t_1$ of 0.3 to 3.0 mm and includes a galvanization layer having an average thickness of 3 to 19 μm, with an aluminum material having a sheet thickness $t_2$ of 0.5 to 4.0 mm by spot welding, wherein, at a joint interface of the dissimilar material joint product, the dissimilar material joint product has an Al$_5$Fe$_2$-based compound layer on the steel product side and an Al$_3$Fe-based compound layer on the aluminum material side, and a total area occupied in the plane direction at the joint interface on the aluminum material side by a portion where a total average thickness of these two layers in a nugget depth direction is from 0.5 to 10 μm accounts for 50% or more of an area occupied in the plane direction by a nugget at the joint interface on the aluminum material side; and wherein, in the cross-sectional SEM observation of the joint interface portion where the total average thickness of the Al$_5$Fe$_2$-based compound layer and the Al$_3$Fe-based compound layer in the nugget depth direction is from 0.5 to 10 μm, a total area occupied in the cross-sectional direction by Zn—Fe-based compound layers contained respectively in these two layers accounts for 10% or less of the sum total of the area occupied in the cross-sectional direction by a portion where the total average thickness of these two layers is from 0.5 to 10 μm and the total area occupied in the cross-sectional direction by Zn—Fe-based compound layers.

For more increasing the bonding strength, in addition to the gist above, it is preferred that the average diameter of the nugget at the joint interface on the aluminum material side is 7 mm or more and the total area occupied in the plane direction by a Zn layer at the joint interface in contact with the nugget is 30% or less of the area occupied in the plane direction by the nugget at the joint interface on the aluminum material side.

Also, the minimum residual sheet thickness of the aluminum material in the dissimilar material joint part is preferably 50% or more of the original sheet thickness of the aluminum material.

Furthermore, the sheet thickness ratio $t_1/t_2$ of the steel product to the aluminum material is preferably 1 or more.

Advantage of the Invention

According to the present invention constructed as above, at the dissimilar material joining of a steel product with an aluminum material by spot welding, an interface reaction layer having an optimal thickness range in a large area can be formed while obtaining a relatively large nugget area and the bonding strength of the dissimilar material joint product can be enhanced. Accordingly, when forming a dissimilar material joint product of a steel product and an aluminum material by spot welding, an existing spot welding apparatus can be used, unlike conventional techniques, without newly using other materials or newly adding a separate step and in turn, a great cost reduction can be realized.

Consequently, the joint product of the present invention am be very usefully applied as various structural members in a transit vehicle such as automobile and railway vehicle, a mechanical part, a building structure and the like. Therefore, the usage of a dissimilar material joint product of a steel product and an aluminum material can be greatly expanded by the present invention.

Also, the present inventors have found that in joining together dissimilar materials, that is, a steel product and an aluminum material, by spot welding, it is important to control the area or thickness distribution of the interface reaction layer formed and for obtaining high bonding strength, to effect suppression control of the time spent to form an interface reaction layer between the steel and the aluminum material. For the suppression control of the interface reaction layer-forming time, previous formation of a suppression layer on the material is found to be important.

In the present invention, a suppression layer not only effecting suppression control of the interface reaction layer-forming time but also enabling suppression of the dissimilar metal contact corrosion is selected as the suppression layer. As such a suppression layer, in the present invention, two films, that is, a Zn or Al metal film in the specific range and an organic resin adhesive film, are previously provided between a joining surface of the steel product and the aluminum material to be joined together.

In order to obtain high bonding strength by suppression control of the interface reaction layer-forming time, a metal film having a melting point close to that of the aluminum material is required so that the metal film can work out to an intermediate layer between the aluminum material and the steel product when put into contact with the molten aluminum. In this respect, the Zn or Al metal film in the specific range of the present invention has a melting point close to that of the aluminum material and exerts a function of effecting suppression control of the interface reaction layer-forming time at the spot welding to obtain high bonding strength.

Also, in order to suppress the dissimilar metal contact corrosion, the suppression layer after spot welding needs to become an electrically insulating layer intervening in a broad range or entirely between the steel product and the aluminum material. On the other hand, in order to enable spot welding and obtain high binding strength of the spot welded part, the suppression layer needs to allow for electrical conduction between the steel product and the aluminum material at the spot welding. In this respect, the organic resin adhesive film has a function of effecting suppression control of the interface reaction layer-forming time at the spot welding as an electrically insulating layer and further suppressing the dissimilar metal contact corrosion after the spot welding.

When the organic resin adhesive film is, for example, a thermosetting resin and is made to be easily discharged or removed from the welded portion between the steel product and the aluminum material to the periphery portion upon application of a stress (welding pressure) at the spot welding, electrical conduction between the steel product and the aluminum material can be established.

After the soot welding, this organic resin adhesive film intervenes in a broad range or entirely between the steel product and the aluminum material, except for the spot welded part from which the film is removed, and works out to an electrically insulating layer, whereby the dissimilar metal contact corrosion of the dissimilar material joint product is suppressed.

Of course, in order to allow each suppression layer to exert such a function, as described later, the metal film and the organic resin adhesive film are bound by the conditions such as optimal composition and film thickness range, and the spot welding has optimal conditions for the welding pressure, current pattern and the like.

Usually, in welding steel products to each other or similar metals to each other, a weld bond system of welding steel products to each other while allowing an adhesive to intervene between steel products is known. However, in the case of dissimilar material joining between a steel product and an aluminum material by spot welding, for obtaining high bonding strength, as described above, a high heat input needs to be added as compared with welding of similar metals to each other. In this regard, the intervention of an adhesive at the dissimilar material joining between a steel product and an aluminum material by spot welding is naturally predicted to disturb the control of the interface reaction layer formation and also inhibit the spot welding itself.

In fact, in the case of dissimilar material joining between a bare (not surface-treated) steel product and an aluminum material by spot welding, when an adhesive is allowed to intervene, the spot welding itself or the control of interface reaction layer formation becomes difficult and high bonding strength cannot be obtained.

On the other hand, in the case where a Zn or Al metal film is previously provided as another suppression layer between a joining surface of the steel product and the aluminum material to be joined together, even when an organic resin adhesive film is present, the spot welding itself or the control of interface reaction layer formation does not become difficult and the above-described function of the organic resin adhesive film is exerted.

This is considered to result because the amount of resistance heat generated increases at the spot welding due to the presence (intervention) of a Zn or Al metal film and the temperature at the interface between the steel product and the aluminum material, particularly the temperature of the steel product, significantly rises over the melting temperature of aluminum. Also, it is presumed that when the amount of resistance heat generated at the spot welding is increased, the diffusion speed at the interface between aluminum and steel becomes significantly high and aluminum diffuses to the steel side, as a result, a good joining state is rapidly ensured.

As described above, in the present invention, at the dissimilar material joining by spot welding, two films, that is, a Zn or Al metal film and an organic resin adhesive film, are previously provided between a joining surface of the steel product and the aluminum material to be joined together.

By virtue of this construction, contrary to the conventional wisdom, suspension control of the time spent to form an interface reaction layer between the steel and the aluminum material is effected, and the bonding strength of the dissimilar material joint product is enhanced. As for the spot welding conditions, the welding is performed by a current pattern appropriate therefore to ensure an increase in the bonding strength.

Also, in the present invention, a suppression layer (corrosion suppressing layer) not only being prevented from impairing the area or thickness distribution of the interface reaction layer formed but also enabling suppression of the dissimilar metal contact corrosion (electrical erosion) is selected as the suppression layer. Suppression of the dissimilar metal contact corrosion during use of the dissimilar material joint product leads to suppressing the reduction in the bonding strength of the dissimilar joint produce due to the corrosion and maintaining the bonding strength. As such a suppression layer, in the present invention, two films, that is, a Zn or Zn alloy film in the specific range and a phosphate film, are previously provided between a joining surface of the steel product and the aluminum material to be joined together.

In order to prevent impairing the control of the area or thickness distribution of the interface reaction layer formed and to suppress the dissimilar metal contact corrosion (electrical erosion), two films having respective characteristics are necessary. More specifically, for the former purpose, a metal film having a melting point close to that of the aluminum material is required so that the metal film can work out to an intermediate layer between the aluminum material and the steel product when put into contact with the molten aluminum. For the latter purpose, a film having a natural potential baser than that of steel and nobler than that of aluminum and reducing the potential difference between the steel and the aluminum material, or a film having a natural potential baser than that of the aluminum material and exerting a sacrificial anticorrosion effect, is required.

In this respect, the Zn or Zn alloy film in the specific range of the present invention does not inhibit the control of the time spent to form an interface reaction layer as an intermetallic compound of steel and aluminum or the control of the thickness range and distribution of the interface reaction layer even when a phosphate film is present at the spot welding. In addition, this film not only reduces the potential difference between steel and aluminum by having a natural potential baser than that of steel and nobler than that of aluminum but also depending on the environment, exerts a sacrificial anticorrosion effect by allowing the natural potential to become baser than that of the aluminum material which forms an oxide film, so that the film can exert a function of yielding high bonding strength even in a corrosive environment.

On the other hand, in order to more effectively suppress the dissimilar metal contact corrosion, the suppression layer needs to intervene in a broad range or entirely between the steel product and the aluminum material after the spot welding and thereby shield the space between the steel product and the aluminum material against the corrosive environment such as moisture and oxygen or form a corrosion suppressing layer for protecting the substrate by the sacrificial anticorrosive action. However, in order to enable spot welding and obtain high bonding strength of the spot welded part, this suppression layer needs to allow for electrical conduction between the steel product and the aluminum material at the spot welding.

In this respect, the phosphate film which is present together with the Zn or Zn alloy film in the specific range of the present invention is broken only in the spot welded portion at the spot welding and enables establishing electrical conduction between the steel product and the aluminum material in the spot welded part. If the phosphate film alone is allowed to intervene between the steel product and the aluminum material without the Zn or Zn alloy metal film for use in the present invention, on whichever side the phosphate film is present, the phosphate film can be hardly broken even in only the spot welded portion and inhibits the spot weldability. Control of the area or thickness distribution of the interface reaction layer of the joint product is also inhibited. Accordingly, a dissimilar material joint product with high bonding strength is not obtained. This is a phenomenon that does not occur when similar metals are spot-welded to each other with the intervention of a phosphate film, and can be said to be a problem peculiar to a dissimilar material joint product between a steel product and an aluminum material.

In the case where the phosphate film has an adequate thickness and is relatively thin, electrical conduction between the steel product and the aluminum material can be established through pinholes of the phosphate film upon application of a stress (welding pressure) at the spot welding. Also, the phosphate film when present together with the Zn or Zn alloy film in the specific range of the present invention is broken due to stress or electrical resistance at the spot welding and dissolves out into the molten aluminum material, whereby electrical conduction between the steel product and the aluminum material can be satisfactorily established in a broad range.

Incidentally, the boiling point of the (zinc) phosphate film is about 1,075° C. and relatively high. Even at a temperature lower than this boiling point, the phosphate film when present together with the Zn or Zn alloy film in the specific range of the present invention is broken at the spot welding, whereby electrical conduction between the steel product and the aluminum material can be established.

After the spot welding, the phosphate film intervenes in a broad range or entirely between the steel product and the aluminum material, except for the spot welded part from which the film is removed, and shields the space between the steel product and the aluminum material against the corrosive environment such as moisture and oxygen or forms a corrosion suppressing layer for protecting the substrate by the sacrificial anticorrosive action, whereby the dissimilar metal contact corrosion of the dissimilar material joint product is suppressed.

However, the above-described pinholes are present in the phosphate film and corrosive factors such as moisture and oxygen cannot be completely blocked. Accordingly, the composition of film components is controlled by the addition of Mg having a natural potential baser than that of aluminum, which is described later, to strengthen the sacrificial anticorrosive action, whereby the function of suppressing the dissimilar metal contact corrosion can be more successfully exerted.

Of course, in order to allow each suppression layer to exert such a function, as described later, the metal film and the phosphate film are bound by the conditions such as optimal composition and film thickness range, and the spot welding has optimal conditions for the welding pressure, current pattern and the like.

As described above, the present invention is characterized in that at the dissimilar material joining by spot welding, two films, that is, a Zn or Zn alloy metal film and a phosphate film, are previously provided between a joining surface of the steel product and the aluminum material to be joined together.

By virtue of this construction, the dissimilar metal contact corrosion during use of the dissimilar material joint product can be further suppressed without impairing the control of the area or thickness distribution of the interface reaction layer formed between the steel and the aluminum material, and high bonding strength can be maintained. In other words, reduction in the bonding strength due to dissimilar metal contact corrosion can be suppressed.

As a result, there are provided an effect that when forming a dissimilar material joint product of a steel product and an aluminum material, a dissimilar material joint product with high bonding strength is obtained by spot welding, unlike conventional techniques, without newly using other materials or newly adding a separate step and also an effect that after the spot welding, a dissimilar material joint product reduced in the dissimilar metal contact corrosion is obtained.

The present inventors have also investigated in detail the thickness of the interface reaction layer, which affects the dissimilar bonding strength particularly between a galvanized steel product and an aluminum material joined together by spot welding, and found that the behavior of the interface reaction layer greatly differs from the conventional knowledge, that is, the thinner, the better. More specifically, it has been found that when the relationship in terms of thickness or area between the $Al_5Fe_2$-based compound layer on the steel product side and the $Al_3Fe$-based compound layer on the aluminum material side, which constitutes the interface reaction layer, is controlled to an optimal range, even if the interface reaction layer is composed of an intermetallic compound of these two layers, the bonding strength increases to a practical level.

Furthermore, in dissimilar material joining of a galvanized steel product and an aluminum material by spot welding, on the other hand, production of a peculiar brittle Zn—Fe-based compound layer deriving from galvanization is suppressed to increase the bonding strength.

As a result, even a galvanized steel sheet (galvanized steel product) is enhanced in the dissimilar bondability or spot weldability to an aluminum material. Accordingly, sufficiently high joint strength or bonding strength of a dissimilar material joint product is obtained also in the spot welding by continuous welding with a large number of weld spots. Furthermore, the contacted state of electrodes with the steel product and aluminum material is stable in each welding, the electrode life is remarkably increased, and highly efficient spot welding by continuous welding with a large number of weld spots is ensured.

In addition, there is provided an effect that dissimilar joining with high bonding strength between a galvanized steel sheet (galvanized steel product) and an aluminum material can be achieved by spot welding, unlike conventional techniques, without newly using other materials or requiring a new step.

DESCRIPTION OF NUMERALS AND SIGNS

| | |
|---|---|
| 1: | Steel product |
| 2: | Aluminum material |
| 3: | Nugget |
| 4: | Interface reaction layer |
| 5: | Joint part center |
| $D_N$: | Nugget diameter |
| $D_C$: | Joint diameter |
| 11: | Steel sheet |
| 12: | Aluminum alloy sheet |
| 13: | Dissimilar material joint product |
| 14: | Suppression layer |
| 15: | Nugget |
| 16: | Interface reaction layer |
| 17, 18: | Electrode |
| 21: | Steel sheet |
| 22: | Aluminum alloy sheet |
| 23: | Dissimilar material joint product |
| 24: | Oxide film |
| 25: | Nugget |
| 26: | Interface reaction layer |
| 27, 28: | Electrode |

BEST MODE FOR CARRYING OUT THE INVENTION

The embodiments of the present invention are described below based on the reasons of limitation and the actions in each requirement.

The present invention is described in greater detail below by referring to Examples, but the present invention is of course not limited to these Examples. It will be apparent that various variations and modifications may be appropriately made without departing from the purports described above and below, and such variations and modification all are included within the technical scope of the present invention.

[1]
(Construction of Joint Product)

Figure 1:
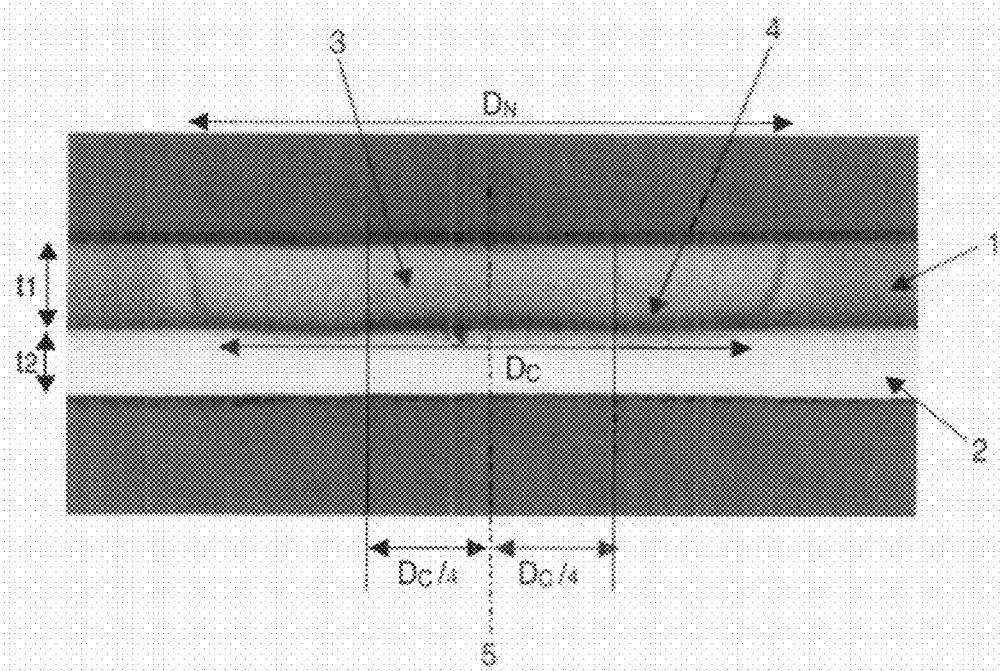
FIG. 1 is a cross-sectional photograph showing the cross-sectional state of the dissimilar material joint product, of the present invention.

For describing the construction of the joint product according to one embodiment of the present invention. FIG. 1 shows a cross-sectional photograph of the joint part in the joint product of the present invention. In the Figure, 1 denotes a steel product, 2 denotes an aluminum material, 3 denotes a nugget, 4 denotes an interface reaction layer, and 5 denotes the joint part center.

(Steel Product)

The sheet thickness $t_1$ of the steel product for use in the present invention is from 0.3 to 3.0 mm. If the sheet thickness $t_1$ of the steel product is less than 0.3 mm, the base material strength or rigidity required of a structural member or structural material as an assembly cannot be ensured, whereas if it exceeds 3.0 mm, other joining means are usually employed for the structural member or structural material and joining by spot welding is less needed.

Incidentally, in the present invention, the shape and material of the steel product used are not particularly limited, and according to the properties required of each structural member, a general-purpose steel product such as sheet material, shaped material, forged material or cast material may be appropriately selected.

(Aluminum Material)

The sheet thickness $t_2$ of the aluminum material for use in the present invention is from 0.5 to 4.0 mm. If the sheet thickness $t_2$ of the aluminum material is less than 0.5 mm, the base material strength as a structural material is insufficient, a nugget area in a predetermined size is not obtained, the melt of the aluminum material readily reaches the non-joining surface to cause surface flash, and in turn, high bonding strength is not obtained. On the other hand, if the sheet thickness $t_2$ of the aluminum material exceeds 4.0 mm, as in the case of the above-described sheet thickness of the steel product, other joining means are employed for the structural member or structural material and joining by spot welding is less needed.

Incidentally, in the present invention, the shape and material (kind of the alloy) of the aluminum material used are not particularly limited, and according to the properties required of each structural member, the aluminum material may be appropriately selected from general-purpose sheet materials, shaped materials, forged materials, cast materials and the like. The aluminum material preferably has high strength so as to suppress deformation due to pressure applied at the spot welding. In this respect, out of aluminum alloys, A5000-type and A6000-type alloys having high strength and being used for general purposes as such a kind of a structural member are best.

(Nugget Area)

The area of the nugget 3 formed by spot welding, shown in FIG. 1, is in a range from $20 \times t_2^{0.5}$ to $100 \times t_2^{0.5}$ mm$^2$ specified by the sheet thickness $t_2$ of the aluminum material 2. In other words, spot welding conditions need to be selected so that the nugget area can fall in a range from $20 \times t_2^{0.5}$ to $100 \times t_2^{0.5}$ mm$^2$.

In the spot welding of similar metal members, from both aspects of bonding strength and workability/profitability, the area of a nugget formed by spot welding is heretofore considered to be optimally about $20 \times t_2^{0.5}$ mm$^2$ with respect to the thickness t of the metal member.

On the other hand, in the present invention, dissimilar metal members are join with each other to form a nugget having an area larger than that in the above-described joining of similar metal members with each other. More specifically, spot welding is performed so that the area of a nugget 3 formed by spot welding can fall in a range from $20 \times t_2^{0.5}$ to $100 \times t_2^{0.5}$ mm² specified by the sheet thickness $t_2$ of the aluminum material 2. Such spot welding can ensure sufficiently high bonding strength even for a dissimilar material joint product and is excellent in the workability and profitability.

Joining of dissimilar metal members with each other as in the present invention is characterized in that the optimal nugget area is dependent on the sheet thickness $t_2$ on the aluminum material 2 side and the effect of the sheet thickness $t_1$ of the steel product 1 is negligibly small.

If the nugget area is less than $20 \times t_2^{0.5}$ mm², more strictly, less than $30 \times t_2^{0.5}$ mm², the nugget area is too small and the bonding strength is insufficient, whereas if the nugget area exceeds $100 \times t_2^{0.5}$ mm², this may be sufficient to obtain bonding strength, but since an extremely high current is required, the existing spot welding apparatus cannot be used and a special apparatus becomes necessary. For this reason, the nugget area is in a range from $20 \times t_2^{0.5}$ to $100 \times t_2^{0.5}$ mm², preferably from $30 \times t_2^{0.5}$ to $100 \times t_2^{0.5}$ mm².

In the present invention, the nugget area is determined by measuring the area of the joint interface between the steel product 1 and the aluminum material 2. The method for measuring the area of the joint interface includes decoupling the joint product at the joint interface by peeling or cutting, analyzing the image of the aluminum material 2 side, and measuring the area of the nugget 3. In the case where the nugget shape is nearly circular, the area may be determined by vertically (in the sheet thickness direction) cutting the joint part at the center 5 of the joint part, observing the cut surface through an optical microscope, and measuring the diameter (nugget diameter) $D_N$ of the nugget 3 at the joint interface. In this case, for example, nugget diameters $D_N$ of longitudinal sections in two orthogonal directions are measured, the area of an ellipsoid using these diameters as the long diameter and the short diameter is calculated, and the obtained value may be used as the nugget area.

(Thickness of Interface Reaction Layer)

The optimal thickness of the interface reaction layer 4 shown in FIG. 1 is from 0.5 to 3 µm and the area of a portion having the optimal thickness is $10 \times t_2^{0.5}$ mm² or more.

The area of the interface reaction layer 4 having an optimal thickness is specified in this way based on a technical idea that, as described above, the interface reaction layer 4 having an optimal thickness is formed broadly as much as possible so as to enhance the bonding strength.

If the area of a portion where the thickness of the interface reaction layer 4 is from 0.5 to 3 µm is less than $10 \times t_2^{0.5}$ mm², more strictly, less than $25 \times t_2^{0.5}$ mm², the range allowing for formation of an interface reaction layer 4 having an optimal thickness is narrow and the bonding strength decreases. Also, in the portion where the thickness of the interface reaction layer 4 is less than 0.5 µm, steel-aluminum diffusion is insufficient and bonding strength decreases. On the other hand, the portion where the thickness of the interface reaction layer 4 exceeds 3 µm is brittle and the bonding strength decreases. Accordingly, in order to increase the bonding strength of the joint part as a whole, the area of a portion where the thickness of the interface reaction layer 4 is from 0.5 to 3 µm needs to be $10 \times t_2^{0.5}$ mm² or more, preferably $25 \times t_2^{0.5}$ mm² or more.

Furthermore, the difference between the interface reaction layer thickness at the center 5 of the joint part and the interface reaction layer thickness at a point distant from the center 5 of the joint part by a distance of one-fourth of the joint diameter $D_C$ needs to be 5 µm or less, preferably 3 µm or less. The joint diameter $D_C$ as used herein indicates the diameter of the range where the interface reaction layer 4 is formed. In the joining using a normal dome-shaped electrode chip (hereinafter, the "electrode chip" is sometimes simply referred to as "chip"), the joint part center (hereinafter sometimes simply referred to as "center") 5 is a site where the interface reaction layer 4 is thickest and the interface reaction layer 4 becomes thin at a point distant from the center 5 by a distance of one-fourth of the joint diameter $D_C$. As the difference in the thickness between these two points is smaller, the bonding strength is higher. If the difference in the thickness exceeds 5 µm, the interface reaction layer 4 at the center 5 becomes excessively larger than the interface reaction layer 4 in the periphery, the bonding strength is reduced, the outer appearance is impaired due to generation of surface flash, and the thickness distribution of the interface reaction layer 4 is changed, giving rise to fluctuation of the strength.

The maximum thickness of the interface reaction layer 4 is preferably from 0.5 to 10 µm, more preferably from 1.5 to 5 µm. In the joining using a normal dome-shaped chip, the joint part center 5 corresponds to the position having the above-described maximum thickness. If the maximum thickness exceeds 10 µm, the strength of this site is low and not only the bonding strength of the entirety is reduced but also surface flash is generated to adversely affect the thickness distribution of the interface reaction layer 4 in the periphery, which causes strength fluctuation. On the other hand, if the maximum thickness is less than 0.5 µm, the above-described optimal thickness range of 0.5 to 3 µm is not obtained.

The thickness of the interface reaction layer 4 can be obtained, similarly to the nugget area, by measuring the area of the joint interface between the steel product 1 and the aluminum material 2 and can be determined by the image analysis or optical microscopic observation of the aluminum material 2 side.

Requirements of the spot welding are described below.
(Electrode Chip)

The electrode chip used for the spot welding is preferably an electrode chip which effects contact with a sheet as a material to be joined at two or more points or in a linear or planar manner. That is, by using a chip giving a maximum pressure part to the sheet, unlike conventional spot welding, not at only one point but at two or more points, or in a linear or planar manner, the above-described relatively large optimal nugget area and the optimal structure of the interface reaction layer can be obtained. Here, the linear manner indicates a continuous line of 3 mm or more, the planar manner indicates a continuous plane of 5 mm² or more, and those not satisfying these ranges are regarded as a point.

The maximum pressure part of the chip may be confirmed by interposing a commercially available pressure paper between the sheet and the chip under a welding pressure of 0.1 kN and then confirming the mark, remaining on the pressure paper. In the case of a normal dome-shaped chip, the mark remains only at one contact point.

As one preferred example of the electrode chip, an electrode chip where a recess of 2 mm or more in diameter is formed in the center (on the chip axis) of the tip of a dome-shaped chip is recommended. The tip of the chip is worn by continuous welding at the spot welding, and it is necessary to periodically maintain the tip of the chip by an abrasive paper, a grinder or the like. At this time, if the chip has a nonaxisymmetric tip shape, maintenance is difficult. By providing a recess on the chip axis (that is, concentrically to axis), not only working of the chip is facilitated but also maintenance can be easily performed by rotating the abrasive paper or grinder in the circumferential direction. A flat-type chip where the tip of the chip is completely flat abuts against the sheet in a planar manner and therefore, can reduce the current density, but when abutting against the sheet in a planar manner, the roughness of the chip greatly affects the current pathway and the maintenance frequency for the chip needs to be raised. Accordingly, in order to satisfy both the chip maintenance property and the effect of uniformizing the interface reaction layer 4, a dome-type chip in which a recess is provided on the tip is preferred, and the diameter of the recess is preferably 2 mm or more. If the diameter is less than 2 mm, concentration of the current on the center cannot be satisfactorily suppressed and the effect of uniformizing the interface reaction layer 4 is small. The upper limit of the diameter of the recess is not specified, but in view of the chip size and maintenance property, the maximum diameter is considered to be from 15 to 20 mm. The depth of the recess is preferably at least 0.5 mm or more but needs not be more than 3 mm, because if the depth of the recess is large, the chip becomes long and the efficiency of cooling with cooling water decreases. The tip diameter and tip R of the dome-type chip are not particularly specified but in order to ensure the nugget area, it is preferred that the tip diameter is 7 mm or more and the tip R is 75 mm or more.

In the case of using such a chip, the maintenance must be performed after previously confirming no occurrence of uneven contact by using pressure-sensitive paper.

The chip in which a recess is provided on the tip is employed for at least one of paired (two) electrode chips used in the spot welding, whereby a plurality of pathways are created for the welding current passing through the sheet and concentration of the current is suppressed. As a result, not only generation of surface flash or defect can be prevented but also the thickness of the interface reaction layer 4 can be made uniform. In the case of using the chip for only one electrode chip, heat generation may be more suppressed by using the chip on the steel product 1 side, but when the chip is used for both electrode chips, concentration of the current can be more suppressed and the thickness of the interface reaction layer 4 can be more unfailingly uniformized.

(Welding Temperature)

Furthermore, when at least either one of the steel product 1 and the aluminum material 2 is cooled to 5° C. or less, this also enables suppressing heat generation of both members, preventing occurrence of surface flash or defect, and uniformizing the interface reaction layer thickness. In the case of cooling only one member, heat generation may be more suppressed by cooling the steel, but when both members are cooled, the heat generation can be further suppressed and the thickness of the interface reaction layer 4 can be more unfailingly uniformized. In order to satisfactorily bring out this heat generation suppressing effect, the welding temperature (sheet temperature) is preferably 5° C. or less. As the welding temperature is lower, heat generation can be more suppressed. Therefore, the lower limit is not specified, but in view of workability, the welding temperature is suitably −5° C. or more.

The method for cooling the sheet may be either a method of previously cooling the sheet with a liquid or gas coolant and then performing the welding, or a method of cooling the sheet with a gas coolant while performing the welding. In the case of previously cooling the sheet, the welding must be performed after removing frost and the like adhering to the sheet.

Incidentally, when both of these means, that is, use of the chip having a devised tip shape and cooling of the sheet are applied, not only concentration of the current can be suppressed but also heat generation of the sheet can be more unfailingly prevented, so that generation of surface flash and defect can be more suppressed and the thickness of the interface reaction layer 4 can be more uniformized.

(Joining Conditions)

As for the joining conditions at the spot welding for use in the present invention, the welding pressure or current pattern is not particularly limited and may be appropriately selected according to the material or sheet thickness of the steel product 1 or aluminum material 2, the difference in the surface treatment the tip shape of the chip, and the like. However, the nugget area and the structure of the interface reaction layer 4 need to satisfy the ranges specified in the present invention. For ensuring the nugget area, relatively high welding pressure and current are necessary. For suppressing an increase in the thickness of the interface reaction layer 4, when a surface treatment layer is not present on the sheet, welding in a short time is required, and when the sheet has a surface treatment layer, it is required to evenly discharge the surface treatment layer in the joint part and then perform the welding in as a short time as possible.

Examples

As for the steel product, a steel product obtained as follows was used. That is, a test steel containing, in terms of mass %, 0.06% C-0.5% Si-1 2% Mn as chemical components, with the balance being substantially Fe except for inevitable impurities, was melted, and a slab of the test steel was rolled until the sheet thickness became 1.2 mm, whereby a thin steel sheet was obtained. The steel sheet was annealed at 500 to 1,000° C. by continuous annealing, cleaned by oil washing or water washing and then tempered to obtain a high-tensile steel sheet of 590 MPa grade.

As for the aluminum material, two kinds of commercially available A6022 (6000-type) aluminum alloy sheets having a sheet thickness of 1.0 mm and 1.6 mm were used.

These steel sheet (steel product) and aluminum alloy sheet (aluminum material) were worked into a cross tensile test specimen shape described in JIS A 3137, and the sheets were spot-welded to prepare a dissimilar material joint product. The welding was performed after previously cooling the steel sheet and aluminum alloy sheet with water or ice water to give each test temperature immediately before welding. In all welding tests, the temperature of the steel sheet was the same as the temperature of the aluminum alloy sheet. Also, liquid or frost adhering to the sheet surface was wiped off immediately before welding.

A dc resistance welding tester was used for the spot welding. The electrode chips used all were a dome-type chip (tip diameter: 12 mm, tip R: 150 mm) composed of Cu—Cr alloy, and chips of 5 shapes, that is, a non-worked chip (Chip A, Comparative Example; abuts at one point), a chip worked to have a groove with a width of 5 mm and a depth of 1 mm in the tip center (Chip B, abuts at two points), and chips worked to have a recess with a diameter of 1 mm, 2 mm and 5 mm and a depth of 1 mm in the tip center (Chips C, D and E, respectively; each abuts linearly at the circumference). The anode was assigned to the aluminum alloy sheet and the cathode was assigned to the steel sheet. In all welding tests, the paired electrode chips both had the same shape. In the case of using Chip B, the directions of worked grooves were aligned in a given direction.

TABLE 1

| | Aluminum Sheet | | | Spot Welding Conditions | | |
|---|---|---|---|---|---|---|
| Test No. | Thickness $t_2$ (mm) | Sheet Temperature (° C.) | Kind of Electrode Chip | Welding Pressure (kN) | Welding Current (kA) | Welding Time (ms) |
| 1 | 1.0 | 25 | A | 3 | 30 | 50 |
| 2 | 1.6 | 25 | A | 3 | 30 | 50 |
| 3 | 1.0 | 10 | A | 3 | 30 | 50 |
| 4 | 1.0 | 5 | A | 3 | 30 | 50 |
| 5 | 1.0 | 2 | A | 3 | 30 | 50 |
| 6 | 1.6 | 2 | A | 3 | 30 | 50 |
| 7 | 1.0 | 25 | B | 3 | 30 | 50 |
| 8 | 1.0 | 25 | C | 3 | 30 | 50 |
| 9 | 1.0 | 25 | D | 3 | 30 | 50 |
| 10 | 1.0 | 25 | E | 3 | 30 | 50 |
| 11 | 1.6 | 25 | E | 3 | 30 | 50 |
| 12 | 1.0 | 2 | E | 3 | 30 | 50 |
| 13 | 1.6 | 2 | E | 3 | 30 | 50 |
| 14 | 1.0 | 2 | E | 3 | 10 | 50 |
| 15 | 1.6 | 2 | E | 3 | 40 | 200 |
| 16 | 1.0 | 2 | E | 1.5 | 30 | 400 |

Test conditions (aluminum sheet thickness $t_2$, sheet temperature immediately before welding, kind of electrode chip, welding pressure and current pattern [welding current, welding time]) are shown in Table 1.

The joint product sample after spot welding was longitudinally cut at the joint part center and embedded in a resin, the cut surface, was polished and then observed through an optical microscope, and the diameter of the formed nugget at the joint interface was measured, whereby the nugget area was determined. Nugget diameters in two orthogonal directions were measured, the area of an ellipsoid using these diameters as the long diameter and the short diameter was calculated, and the obtained value was used as the nugget area.

In the case, of Chips A, C, D and E, three units of a joint product sample by spot welding were produced for one condition. Each sample was longitudinally cut at the joint part center and embedded in a resin and after polishing, the thickness of the interface reaction layer was determined by SEM observation. The thickness was measured in a visual field at a magnification of 2,000 when the thickness of the interface reaction layer was 1 μm or more and in a visual field at a magnification of 10,000 when it was less than 1 μm. The maximum thickness obtained by measuring three units of a sample was taken as the maximum thickness of the interface reaction layer. Also, each sample was measured for the thickness of the joint part center and the thickness of the interface reaction layer at two points (middle points) apart right and left from the joint part center each by a distance of one-fourth of the joint diameter, the difference in the thickness between the center and the middle point was determined, the values of six points in total, that is, two points in each of three units of a sample, were averaged, and the obtained value was taken as the difference in the thickness between the joint part center and a point distant from the joint part center by a distance of one-fourth of the joint diameter. Furthermore, the area of a figure drawn by connecting line portions of the portion having an interface reaction layer thickness of 0.5 to 3 μm in each cross section to make a full circle around the joint part center was calculated, and the areas of three units of a sample were averaged to determine the area of a portion where the thickness of the interface reaction layer is from 0.5 to 3 μm.

In the case of Chip B, the recess shape is not circular and the above-described measuring methods cannot be employed. Therefore, 6 units of a joint product sample by spot welding were produced for one condition, each sample was longitudinally cut at the joint part center along a direction inclined at 0°, 15°, 30°, 45°, 60°, 75° and 90° with respect to a straight line connecting two points at which the chip abutted against the sheet, and embedded in a resin and after polishing, SEM observation was performed. The thickness was measured in a visual field at a magnification of 2,000 when the layer thickness was 1 μm or more and in a visual field at a magnification of 10,000 when it was less than 1 μm. The maximum thickness obtained by measuring six units of a sample at respective angle directions was taken as the maximum thickness of the interface reaction layer. Also, each sample was measured for the thickness of the joint part center and the thickness of the interface reaction layer at two points (middle points) apart right and left from the joint part center each by a distance of one-fourth of the joint diameter, the difference in the thickness between the center and the middle point was determined, and the maximum value out of difference values determined was taken as the difference in the thickness between the joint part center and a point distant from the joint part center by a distance of one-fourth of the joint diameter. In the case of Chip B, the value when measured in a cross section inclined at 90° was the maximum difference. Furthermore, as for the area of a portion where the thickness of the interface reaction layer is from 0.5 to 3 μm, the range having an interface reaction layer thickness of 0.5 to 3 μm in each angle direction from 0 to 90° was plotted every angle direction, and the plots between respective angle directions were connected by a straight line, whereby the area of a portion having an interface reaction layer thickness of 0.5 to 3 μm in a range from 0 to 90° was calculated. Since two values can be obtained as the area in a range of 90° across a symmetric axis at the center, two area values determined in a portion having an interface reaction layer thickness of 0.5 to 3 μm in a range of 90° were added, and the value obtained was further doubled, whereby the area of a portion having an interface reaction layer thickness of 0.5 to 3 μm in the entirety was calculated.

As for the evaluation of bonding strength, a cross tensile test of the dissimilar material joint product was performed. In the cross tensile test, the sample was rated ⊚ when the bonding strength was 1.5 kN or more or the rupture mode was the aluminum base material rupture, rated ○ when the bonding strength was from 1.0 to 1.5 kN, rated Δ when the bonding strength was from 0.5 to 1.0 kN, and rated x when the bonding strength was less than 0.5 kN.

Incidentally, in this Example, a cross tensile test but not a shear tensile test was employed for the evaluation of the tending strength, because the relative difference in the bonding strength among test conditions was larger in the cross tensile test and this was more suited for the judgment of good or bad. The tendency in the shear tensile test is agreeing with the cross tensile test results, and all of samples rated ○ and ◎ in the cross tensile test exhibited high shear strength of 2.5 kN or more.

difference in the interface reaction layer thickness between the joint part center and a point distant by a distance of one-fourth of the joint diameter could be controlled to further more preferred ranges.

These results in Examples above clarify the critical meaning of each requirement specified in the present invention.

TABLE 2

| No. | Nugget Area ($\times t_2^{0.5}$ mm$^2$) | Area of Interface Reaction Layer Having Optimal Thickness ($\times t_2^{0.5}$ mm$^2$) | Difference in Thickness of Interface Reaction Layer Between Joint Part Center and a Point Distant from Joint Part Center by a Distance of One-Fourth of Joint diameter (μm) | Maximum Thickness of Interface Reaction Layer (μm) | Cross Tensile Test Results | Remarks |
|---|---|---|---|---|---|---|
| 1 | 45 | 22 | 14.5 | 18.2 | X | Comparative Example |
| 2 | 50 | 20 | 14.8 | 17.5 | X | Comparative Example |
| 3 | 47 | 21 | 15.0 | 18.1 | X | Comparative Example |
| 4 | 46 | 26 | 4.7 | 9.0 | ○ | Example |
| 5 | 45 | 25 | 4.9 | 8.3 | ○ | Example |
| 6 | 52 | 27 | 4.2 | 7.7 | ○ | Example |
| 7 | 54 | 26 | 5.0 | 10.0 | ○ | Example |
| 8 | 47 | 28 | 4.4 | 9.1 | ○ | Example |
| 9 | 49 | 32 | 2.9 | 4.9 | ◎ | Example |
| 10 | 51 | 35 | 1.3 | 4.1 | ◎ | Example |
| 11 | 55 | 36 | 2.4 | 5.0 | ◎ | Example |
| 12 | 50 | 38 | 2.2 | 3.3 | ◎ | Example |
| 13 | 56 | 39 | 1.8 | 4.1 | ◎ | Example |
| 14 | 19 | 11 | 3.9 | 5.2 | X | Comparative Example |
| 15 | 105 | 48 | 7.3 | 9.8 | X | Comparative Example |
| 16 | 76 | 33 | 5.5 | 10.3 | Δ | Comparative Example |

The cross tensile test results of the dissimilar material joint products obtained by spot welding under respective test conditions shown in Table 1 are shown in Table 2.

It is seen from comparison among Test Nos. 1 to 6 that as compared with Test Nos. 1 to 3 where the sheet temperature exceeds 5° C., in Test Nos. 4 to 6 where the sheet temperature is as low as 5° C. or less, the area of a portion with the thickness of the interface reaction layer being in the optimal range (0.5 to 3 μm) is large, the difference in the interface reaction layer thickness between the joint part center and a point distant by a distance of one-fourth of the joint diameter is small, and the bonding strength of the dissimilar material joint product is high.

Also, it is seen from comparison of Test Nos. 3 and 2 with Test Nos. 7 to 11 that as compared with Test Nos. 1 and 2 using a normal dome-type chip where the tip is not subjected to working in Test Nos. 7 to 11 where the chip specified in the present invention is applied, the area of a portion with the thickness of the interface reaction layer being in the optimal range (0.5 to 3 μm) is large, the difference in the interface reaction layer thickness between the joint part center and a point distant by a distance of one-fourth of the joint diameter is small, and the bonding strength of the dissimilar material joint product is high. Particularly, in Test Nos. 9 to 11 using an electrode chip where a recess of 2 mm or more in diameter is formed in the tip center of a dome-type chip, the area of a portion with the thickness of the interface reaction layer being in the optimal range (0.5 to 3 μm) and the difference in the interface reaction layer thickness between the joint part center and a point distant by a distance of one-fourth of the joint diameter could be controlled to more preferred ranges and therefore, the bonding strength of the dissimilar material joint product is remarkably high. Also, it is seen that in Test Nos. 12 and 13 where the sheet temperature is as low as 5° C. or less, the area of a portion with the thickness of the interface reaction layer being in the optimal range (0.5 to 3 μm) and the However, even when a chip specified as a suitable chip in the present invention is employed and a member at a low temperature of 5° C. or less is used, in Test Nos. 14 to 16 where the joining conditions are improper, at least one or more requirements out of the nugget area, the area of a portion with the thickness of the interface reaction layer being in the optimal range (0.5 to 3 μm), and the difference in the interface reaction layer thickness between the joint part center and a point distant by a distance of one-fourth of the joint diameter are not in the specified range and the bonding strength is low.

That is, the optimal joining conditions (welding pressure, current pattern) must be appropriately selected to satisfy the specified ranges of the present invention in terms of the nugget area and the interface reaction layer structure according to the material or sheet thickness of the steel sheet or aluminum alloy sheet, the difference in the surface treatment or the chip shape.

[2]
(Dissimilar Material Joint Product)

Figure 2:
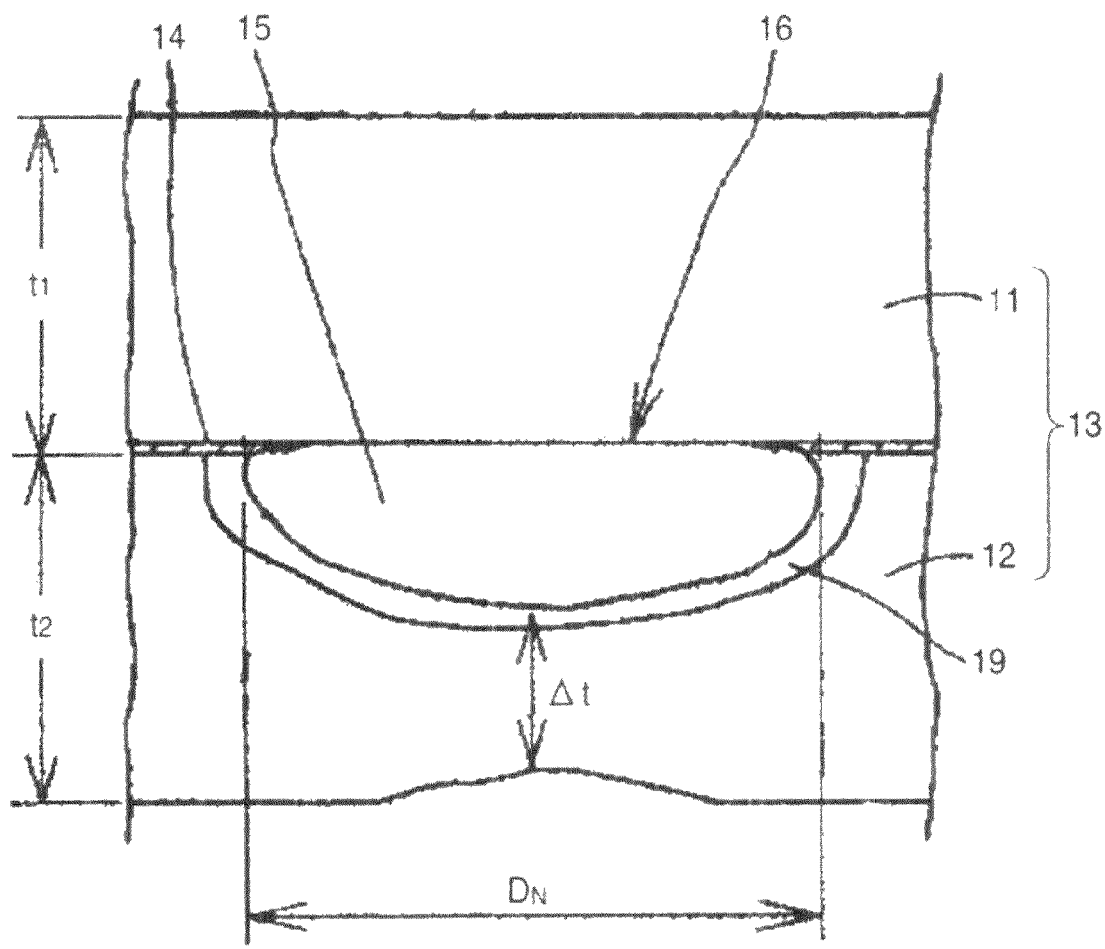
FIG. 2 is a cross-sectional view showing the dissimilar material joint product of the present invention.

FIG. 2 is a cross-sectional view showing the dissimilar material joint product specified in one embodiment of the present invention. In FIG. 2, 13 is a dissimilar material joint product obtained by joining a steel product (steel sheet) 11 and an aluminum material (aluminum alloy sheet) 12 together by spot welding, 15 is a nugget having an interface reaction layer 16 formed in spot welding, where the nugget has a nugget diameter shown by an arrow in the horizontal direction in the Figure, and 19 is a corona bond part in the periphery of the nugget. In the Figure, $t_1$ denotes the sheet thickness of the steel product, $t_2$ denotes the sheet thickness of the aluminum material 12, and Δt denotes the minimum residual sheet thickness of the aluminum material after joining by spot welding.

Here, 14 is a suppression layer and is a stack of a Zn or Al metal film and an organic resin adhesive film, which is previously provided between a joining surface of the steel product 11 and the aluminum material 12 to be joined together. In FIG. 2, the Zn or Al metal film and the organic resin adhesive film are shown integrally without distinguishing individual films, but this shows an embodiment where Zn plating is applied to the steel product 11 surface on the joining side and an organic resin adhesive is coated thereon to complete a suppression layer 14.

In FIG. 2, a good joining state of the dissimilar material joint product is shown, where the suppression layer 14 as a stack of a Zn or Al metal film and an organic resin adhesive film previously provided before spot welding is removed in the joint part of the dissimilar material joint product after spot welding and the steel product 11 is joined directly to the aluminum material 12. Furthermore, FIG. 2 snows that the suppression layer 14 previously formed is present as it is in the interface region other than the joint part of the dissimilar material joint product.

(Sheet Thickness of Steel Product)

In the present invention, the joint product needs to be a joint product where the sheet thickness $t_1$ of the steel product is from 0.3 to 3.0 mm. If the sheet thickness $t_1$ of the steel product is less than 0.3 mm, the strength or rigidity required of the above-described structural member or structural material cannot be ensured and this is improper. In addition, great deformation of the steel product occurs due to pressure applied during spot welding and this causes easy breaking of the oxide film and in turn, accelerates the reaction with aluminum, as a result, an intermetallic compound is readily formed.

On the other hand, if it exceeds 3.0 mm, other joining means are employed for the structural member or structural material and joining by spot welding is less needed. Accordingly, it is not necessary that the sheet thickness $t_1$ of the steel product is large over 3.0 mm.

(Steel Product)

In the present invention, the shape and material of the steel product used are not particularly limited, and an appropriate shape and an appropriate material, used for general purposes in a structural member or selected from those used for a structural member, such as steel sheet, steel shaped product and steel pipe, may be employed. However, in order to obtain a lightweight high-strength structural member (dissimilar material joint product) such as automotive member, the steel product is preferably a normal high-tension steel (high-tension) having a tensile strength of 400 MPa or more.

A low-strength steel having a tensile strength of less than 400 MPa is generally a low-alloy steel in many cases and since the oxide film is composed of iron oxide, Fe and Al are caused to readily diffuse and a brittle intermetallic compound is liable to be formed. For this reason, the steel product is preferably a high-tension steel (high-tension) having a tensile strength of 400 MPa or more, more preferably 500 MPa or more.

(Aluminum Material)

The aluminum material for use in the present invention is not particularly limited in its alloy type or shape, and according to the properties required of each structural member, a general-purpose aluminum material such as sheet material, shaped material, forged material or cast material may be appropriately selected. However, similarly to the steel product, the aluminum material preferably has high strength so as to suppress the deformation due to pressure applied at the spot welding. In this respect, out of aluminum alloys, A5000-type and A6000-type alloys having high strength and being used for general purposes as such a kind of a structural member are best.

The sheet thickness $t_2$ of the aluminum material for use in the present invention is from 0.5 to 4.0 mm. If the sheet thickness $t_2$ of the aluminum material is less than 0.5 mm, the strength as a structural material is disadvantageously insufficient, a sufficiently large nugget diameter is not obtained, the melt readily reaches the aluminum material surface to cause surface flash, and in turn, high bonding strength is not obtained. On the other hand, if the sheet thickness $t_2$ of the aluminum material exceeds 4.0 mm, as in the case of the above-described sheet thickness of the steel product, other joining means are employed for the structural member or structural material and joining by spot welding is less needed. Accordingly, it is not necessary that the sheet thickness $t_2$ of the aluminum material is large over 4.0 mm.

(Suppression Layer)

In the present invention, the area and thickness distribution of an interface reaction layer formed between the steel and the aluminum material at spot welding are controlled to obtain higher bonding strength. Therefore, in the present invention, suppression control of the time spent to form an interface reaction layer between the steel and the aluminum material is effected. For this suppression control of the interface reaction layer-forming time, a suppression layer is previously formed between the steel and the aluminum material (on the material).

In the present invention, for effecting the suppression control of the interface reaction layer-forming time and restraining the dissimilar metal contact corrosion, two films, that is, a Zn or Al metal film in the specific range and an organic resin adhesive film, are previously provided as the suppression layer between a joining surface of the steel product and the aluminum material to be joined together. To this end, as described below, a metal film and an organic resin adhesive film are stacked and provided on the joining surface on either the steel product side or the aluminum material side. The order of providing (stacking) the films is not limited but when the metal film is first provided, this makes it more easy to provide the organic resin adhesive film.

(Zn or Al Metal Film)

The Zn or Al metal film in the specific range, which is one of the suppression layer, is described below. In the present invention, spot welding is performed in a state of a Zn or Al metal film being previously provided between a joining surface of the steel product and the aluminum material to be joined together, and to this end, a Zn or Al metal film is previously provided on the surface at least on the joining surface side of the steel product or aluminum material. This Zn or Al metal film has a melting point close to that of the aluminum material to be joined, as described later regarding the specific melting point range, so that the time spent to form the interface reaction layer which is an intermetallic compound between steel and aluminum can be controlled at the spot welding and in turn, the thickness range and distribution of the interface reaction layer can be controlled.

In conventional spot welding using such a steel product and an aluminum material as are bare or have no Zn or Al metal film, the amount of resistance heat generated at spot welding is relatively small. Consequently, the temperature at the interface between the steel product and the aluminum material, particularly the temperature of the steel product, does not extremely rise over the melting temperature of aluminum and therefore, high bonding strength cannot be obtained. If an organic resin adhesive layer is allowed to intervene at the joint interface by employing a weld bond system, the spot welding itself or the control of an interface reaction layer formation becomes more difficult and high bonding strength cannot be obtained.

On the other hand, in the case where a Zn or Al meal film is previously provided as the suppression layer between a joining surface of the steel product and the aluminum material to be joined together, even when an organic resin adhesive film intervenes between joining surfaces, the spot welding itself or the control of the interface reaction layer formation does not become difficult and the above-described function of the organic resin adhesive film is exerted.

This is considered to result because, as described above, the amount of resistance heat generated increases at the spot welding due to the presence (intervention) of a Zn or Al metal film and the temperature at the interface between the steel product and the aluminum material, particularly the temperature of the steel product, significantly rises over the melting temperature of aluminum. Due to this increase in the amount of resistance heat generated, the organic resin adhesive film is made to be easily discharged or removed from the welded portion between the steel product and the aluminum material to the periphery portion, whereby electrical conduction between the steel product and the aluminum material can be established.

Also, as described above, when the amount of resistance heat generated increases at the spot welding due to the presence (intervention) of a Zn or Al metal film, the diffusion speed at the interface between aluminum and steel becomes significantly high and aluminum diffuses to the steel side, as a result, a good joint state is rapidly ensured. Furthermore, in the case of a galvanized steel sheet, the galvanization layer melts earlier because of difference in the melting point and this is presumed to produce an effect of uniformizing the heat distribution at the interface. By virtue of such a combined effect of the Zn or Al metal film, contrary to the conventional wisdom, the spot weldability is considered to be enhanced, despite the intervention of an organic resin adhesive film.

In order to bring out these effects, the melting point of the Zn or Al metal film is set to a narrow temperature range of 350 to 1,000° C., preferably from 400 to 950° C., more preferably a narrower temperature range from the melting point of the aluminum material to 900° C. The melting point of the aluminum material is about 660° C. (the melting point of pure Al) and the melting point of pure Zn is about 420° C. The expression "having a melting point close to that of the aluminum material" means to allow the above-described certain margin with respect to, for example, the melting point 660° C. of pure Al.

The thickness of the Zn or Al metal film is set to a narrow film thickness (average film thickness) range of 3 to 19 μm, preferably from 5 to 15 μm. The thickness of the Zn or Al metal film is determined as follows. A steel product or aluminum material sample after forming such a metal film is cut and embedded in a resin, and the metal film after polishing the cut surface is observed in its thickness direction through SEM. In this SEM observation, the thickness is measured at three points in a visual field at a magnification of 2,000, and the values are averaged to determine the thickness of the metal film.

If the thickness of the Zn or Al metal film is too small or its melting point is too low, the Zn or Al metal film is melted and discharged from the joint part in the early stage of joining at the spot welding and formation of the interface reaction layer cannot be suppressed.

On the other hand, in order to increase the bonding strength of the dissimilar material joint product, the steel product and the aluminum material to be joint together need to be put into direct contact at a joining surface with each other, and at the spot welding, the Zn or Al metal film previously intervening in the joint part needs to be melted and discharged from the joint part. If the thickness of the Zn or Al metal film is too large or the melting point is too high, a large amount of heat input is required to melt and discharge the Zn or Al metal film from the joint part. If this amount of heat input becomes large, the amount of the aluminum material melted increases to cause generation of surface flash and this brings out great decrease in the thickness of the aluminum material, as a result, the dissimilar material joint product cannot be used as a structural member.

As for the Zn or Al metal film, within the above-described melting point range, a usable alloy composition can be appropriately selected, such as pure Zn, pure Al, Zn alloy or Al alloy. The method for coating or forming a metal film on the surface at least on the joining surface side of the steel product or aluminum material may also be appropriately selected from known general-purpose methods such as plating and coating. Incidentally, the coating or formation on the steel product or aluminum material surface is applied at least to the surface on the joining surface side, but of course, for the corrosion prevention or the like, a Zn or Al metal film may be coated or formed on the steel product or aluminum material surface side which is not a joining surface.

However, considering the practical utility or efficiency, the Zn or Al metal film is preferably coated or formed by plating on the steel product side to which Zn or Al plating is usually applied for general purposes. The steel product is usually subjected to coating before use and in this case, even when the coat is scratched, Zn or Al is preferentially corroded and the steel product can be protected. Furthermore, the potential difference between the steel and the aluminum material is reduced, so that the dissimilar metal contact corrosion which is one of the problems to be solved in the field of dissimilar material joint products can also be suppressed. In the case of employing Zn or Al plating, the corrosion resistance of the steel product can be ensured and plating can be easily applied to either steel or aluminum.

On the premise of plating, in order to bring out the function of suppressing the interface reaction layer formation and the function of enabling welding even with the intervention of an organic resin adhesive film, the Zn or Al plating film is preferably pure Zn or pure Al. Even when a Zn alloy or an Al alloy is used, it is preferred that in the alloys such as Al—Zn, Al—Si and Zn—Fe, each contains 80 mass % or more of Zn or Al and the main component is Zn or Al. In the case of alloying the Zn or Al plating hint, this is performed not to allow deviation from the above-described melting point range or reduction in the corrosion resistance by selecting the alloy elements added or the contents thereof.

Out of these plating films, a pure Zn or Zn alloy plating film containing 88 mass % or more of Zn is recommended above all. When a Zn plating film containing 88 mass % or more of Zn is applied to the steel product surface, particularly the corrosion resistance of the steel product is increased. Also, the melting point of this Zn plating film is easy to control to the above-described range of 350 to 1,000° C. Furthermore, the corrosion resistance is high, so that the dissimilar metal contact corrosion can also be suppressed. From the standpoint of preventing the dissimilar metal contact corrosion, a pure Zn plating film is most preferred.

In the present invention, the plating method is not limited and an existing wet or dry plating method can be used. In particular, the galvanization is preferably performed, for example, by electroplating, hot-dip plating or a method of performing an alloying treatment after hot-dip plating.

(Organic Resin Adhesive Film)

The organic resin adhesive film as another suppression layer is described below.

As described above, the organic resin adhesive film has a function of effecting suppression control of the interface reaction layer-forming time as an electrically insulating layer at the spot welding and intervening in a broad range or entirely between the steel product and the aluminum material after the spot welding, thereby suppressing the dissimilar metal contact corrosion.

In the present invention, spot welding is performed after coating or forming the organic resin adhesive film between a joining surface of the steel product and the aluminum material (on either one joining surface). Accordingly, the organic resin adhesive film functions as a so-called weld bond at the spot welding. That is, the organic resin adhesive film makes large the contact resistance in the steel-aluminum material interface and allows the amount of heat generated at the interface to uniformly increase over a wide range, thereby enabling formation of the interface reaction layer in a wide range and facilitating the control of the interface reaction layer thickness.

The organic resin adhesive is not particularly limited in its kind or coating thickness, and those generally employed for the production of a car body of automobiles, such as mastic adhesive, adhesive for weld bonding, adhesive for hemming, and sealing agent for spot welding, can be applied, as well as their kind and coating thickness.

Examples of the kind of the organic resin adhesive are described. As for the water-soluble adhesive, urea type, phenol type, PVA and the like are applicable. As for the solution-type adhesive. CR type, nitrite rubber type, vinyl acetate, nitrite cellulose and the like are applicable. As for the emulsion-type adhesive, vinyl acetate, acryl, EVA type, CR type, SBR type, nitrile rubber type and the like are applicable. As for the solventless-type adhesive, epoxy, acrylate, polyester and the like are applicable. Also, depending on the case, an organic resin adhesive in a shape of solid, tape or the like may be used.

In the weld bonding, it is preferred to extrude the adhesive to the outside at the spot welding and reduce the residual amount of the adhesive in the joint part, so that spot welding can be performed by establishing electrical conduction between the steel product and the aluminum material and the bonding strength can be thereby increased. However, the adhesive need not be completely eliminated from the joint part but may remain to an extent not inhibiting the spot welding in the joint part, for example, to an extent not allowing the adhesive to form a layer.

In this respect, a thermosetting resin adhesive film such as epoxy and acryl has a property that due to its flexibility, when a stress (welding pressure) is applied at the spot welding from two electrode chips sandwiching the steel product and the aluminum material, the film is easily discharged or removed from the welded portion between the steel product and the aluminum material to the periphery portion. By virtue of this property, use of a thermosetting resin adhesive enables establishing electrical conduction between the steel product and the aluminum material at the spot welding.

Also, even a thermoplastic resin adhesive film has a property that due to its flexibility, when heated at the spot welding, the film is easily discharged or removed from the welded portion between the steel product and the aluminum material to the periphery portion. Even if the film under heating or pressure is not discharged or removed from the welded portion between the steel product and the aluminum material to the periphery portion, when the film is splashed or burned out by heat generation at the spot welding, electrical conduction between the steel product and the aluminum material can be established.

After the spot welding, the organic resin adhesive film intervenes in a broad range or entirely between the steel product and the aluminum material, except for only the spot welded part from which the film is removed, and works out to an electrically insulating layer, whereby the dissimilar metal contact corrosion of the dissimilar material joint product is suppressed.

Incidentally, the thickness of the organic resin adhesive coated does not substantially affect the spot weldability, because the thickness of the organic resin adhesive in the welded part is essentially governed by the contact surface pressure at the spot welding, though this may slightly vary depending on the composition or kind of the organic resin adhesive. Accordingly, as described later, control of the contact surface pressure is important. In view of corrosion resistance, the thickness of the organic resin adhesive coated is sufficient if it is 0.1 µm or more where pinholes are not easily allowed to be present, and the adhesive needs to be coated thinly to an extent not causing expulsion of the adhesive due to pressure at the joining. Also, the final adhesive thickness after the spot welding is sufficient if it is approximately from 0.1 to 10 µm as a thickness after curing or thermosetting of the adhesive.

On the other hand, in the case where a Zn or Al metal film is previously provided as one more suppression layer between a joining surface of the steel product and the aluminum material to be joined together, even when the organic resin adhesive film is present the spot welding itself or the control of interface reaction layer formation does not become difficult and the above-described function of the organic resin adhesive film is exerted.

This is considered to result because the amount of resistance heat generated increases at the spot welding due to the presence (intervention) of a Zn or Al metal film and the temperature at the interface between the steel product and the aluminum material, particularly the temperature of the steel product, significantly rises over the melting temperature of aluminum. By this increase in the amount of resistance heat generated, the organic resin adhesive film is made to be easily discharged or removed from the welded portion between the steel product and the aluminum material to the periphery portion, and electrical conduction between the steel product and the aluminum material can be established.

Also, it is presumed that when the amount of resistance heat generated increases at the spot welding due to the presence (intervention) of a Zn or Al metal film, the diffusion speed at the interface between aluminum and steel becomes significantly high and aluminum diffuses to the steel side, as a result, a good joint state is rapidly ensured. Furthermore, in the case of a galvanized steel sheet the galvanization layer melts earlier because of difference in the melting point and this is presumed to produce an effect of uniformizing the heat distribution at the interface. By virtue of such a combined effect of the Zn or Al metal film, contrary to the conventional wisdom, the spot wettability is considered to lie enhanced, despite the intervention of an organic resin adhesive film.

(Interlace Reaction Layer)

In the present invention, the area of a portion where the interface reaction layer thickness of the dissimilar material joint product is from 0.5 to 5 µm is $10 \times t_2^{0.5}$ mm$^2$ or more in relation to the sheet thickness $t_2$ of the aluminum material. This area definition of the interface reaction layer having an optimal thickness is to control the interface reaction layer to the optimal range, contrary to the conventional wisdom that the interface reaction layer is preferably thinner (even not present), and the intention thereof is rather directed to aggressively allow the presence of the interface reaction, layer. The area definition above is based on the technical idea that for enhancing the bonding strength, an interface reaction layer having an optimal thickness range is formed in a large area, in other words, is allowed to be present in a broad range.

Accordingly, if the area of a portion where the interface reaction layer thickness is from 0.5 to 5 μm is less than $10 \times t_2^{0.5}$ mm$^2$, more strictly less than $50 \times t_2^{0.5}$ mm$^2$, in relation to the sheet thickness $t_2$ of the aluminum material, the interface reaction layer having an optimal thickness range cannot be present in a broad range and the bonding strength rather decreases. In the portion where the thickness of the interface reaction layer is less than 0.5 μm, steel-aluminum diffusion is insufficient and bonding strength decreases. On the other hand, the interface reaction layer becomes more brittle as the thickness is larger, and in particular, the portion where the thickness of the interface reaction layer exceeds 5 μm is brittle and low in the bonding strength. Accordingly, as the area of such an interface reaction layer increases, the bonding strength of the joint part as a whole decreases.

For this reason, in order to increase the bonding strength of the joint part as a whole, the area of a portion where the thickness of the interface reaction layer is from 0.5 to 5 μm needs to be $10 \times t_2^{0.5}$ mm$^2$ or more, preferably $50 \times t_2^{0.5}$ mm$^2$ or more, in relation to the sheet thickness $t^2$ of the aluminum material.

Incidentally, in the case of using a dome-shaped chip generally employed for the electrode chip, the interface reaction layer becomes thickest in the center part, and the thickness of the interface reaction layer decreases with distance from the center. Accordingly, the thickness of the interface layer in the center part may exceed 5 μm. The thickness of the interface reaction layer can be determined by measuring the area of the interface of the steel product-aluminum material joining by means of the image analysis or SEM observation of the aluminum material side at a magnification of 2,000.

(Spot Welding)

Figure 3:
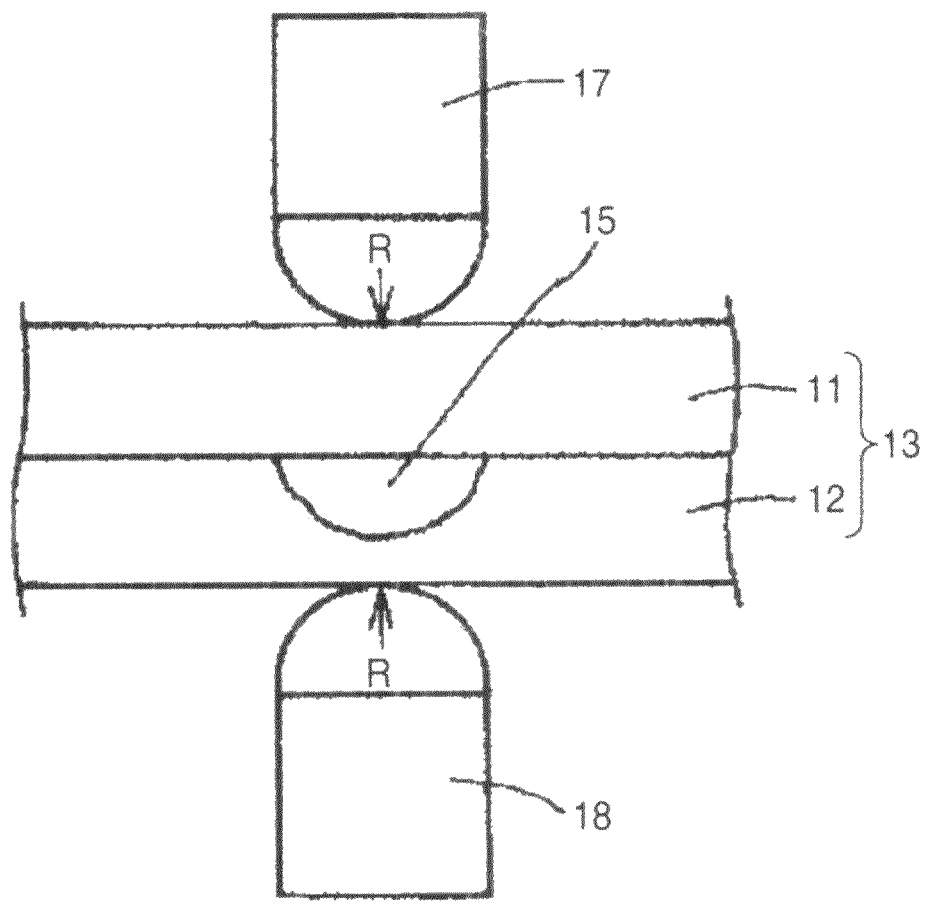
FIG. 3 is an explanatory view showing the embodiment of spot welding for obtaining a dissimilar material joint product.

Requirements of the spot welding method for obtaining a dissimilar material joint product are described below. FIG. 3 shows one embodiment of the spot welding as a premise for obtaining a dissimilar material joint product. The fundamental embodiment of the spot welding method of the present invention is the same as the embodiment of normal spot welding. In FIG. 3, 11 is a steel sheet, 12 is an aluminum alloy sheet, 15 is a nugget, 17 and 18 are electrodes, and 13 is a dissimilar material joint product.

In the spot welding method of the present invention, at the time of obtaining the above-described dissimilar material joint product between a steel product having a sheet thickness $t_1$ and an aluminum material having a sheet thickness $t_2$, the spot welding is performed in a state of a Zn or Al metal film and an organic resin adhesive film being previously provided between a joining surface of the steel product and the aluminum material to be joined together.

At this fame, as described above, it is preferred in view of both control of the interface reaction layer thickness and suppression of the dissimilar metal contact corrosion that an organic resin adhesive is coated on the steel product-aluminum material joining surface side and after performing spot welding, the coated organic resin adhesive is cured.

(Welding Pressure)

In such spot welding, a welding pressure by electrode chips 17 and 18, with the electrode chap 18 on the aluminum material 12 side having a tip diameter of 7 mmφ or more, is applied to satisfy the relationship of $(R \times W)^{1/3}/R > 0.05$ between the tip curvature radius R mm and the welding pressure W kN. The welding pressure is preferably larger because the adhesive can be more extruded, but in view of capacity limitation of the spot welding, the welding pressure is practically up to 10 kN.

The contact surface pressure in the point contact is almost proportional to $(R \times W)^{1/3}/R$. If the contact surface pressure imposed on the joint part is excessively small, this allows for remaining of a large amount of the adhesive and the growth of the interface reaction layer is inhibited. Therefore, a contact surface pressure large enough to extrude the adhesive to the outside is necessary. If $(R \times W)^{1/3}/R$ is 0.05 or less, the adhesive remains as a layer and the interface reaction layer does not grow.

Also, when such a relatively large welding pressure is applied, irrespective of the shape of the electrode chip or the like, electrical contact between dissimilar materials or between the electrode and the material can be stabilized, the molten metal inside the nugget can be supported by the unmelted part in the periphery of the nugget, and the above-described relatively large requisite area of the nugget and the requisite area of the above-described optimal interface reaction layer can be obtained. Furthermore, generation of surface flash can be suppressed. If the welding pressure is too small, these effects cannot be obtained.

(Electrode Chip)

In order to allow an interface reaction layer having a thickness in the above-described optimal range to be formed in a broad range, the electrode chip particularly on the aluminum material side is an R-type chip having a tip diameter of 7 mmφ or more and a large tip curvature radius R, such as dome type. The electrode chip on the steel product side also preferably has a large curvature radius R, but in view of capacity limitation of the spot welding, the curvature radius is practically up to 250 mm.

The electrode shape is not specified, but the electrode preferably raises the current efficiency in the early stage of electrification. The polarity is also not specified, but in the case of using a dc spot, it is preferred to assign the anode to aluminum and the cathode to steel.

(Current)

For obtaining the relatively large nugget area and the requisite area of the optimal interface reaction layer, the current needs to be passed with a current pattern having a step of passing a current of $15 \times t_2^{0.5}$ to $30 \times t_2^{0.5}$ kA for $100 \times t_2^{0.5}$ to $1,000 \times t_2^{0.5}$ msec in relation to the sheet thickness $t_2$ of the aluminum material and not having a step of passing a current higher than that in the step above.

By using such a current pattern, a large amount of heat input is obtained when the suppression layer of the present invention is previously formed, and as described above, high bonding strength can be obtained by controlling the interface reaction layer on the joining surface of the steel and the aluminum material. Also, electrical contact between dissimilar materials or between the electrode and the material can be stabilized, the molten metal inside the nugget can be supported by the unmelted pan in the periphery of the nugget, and the above-described relatively large requisite area of the nugget and the requisite area of the above-described interface reaction layer can be obtained. Furthermore, generation of surface flash can be suppressed.

In the step above of the current pattern, if the current is less than $15 \times t_2^{0.5}$ kA or the time is less than $100 \times t_2^{0.5}$ msec, the surface treatment layer and the aluminum material are not melted in a broad range and the area of the interlace reaction layer having a thickness in the optimal range is small, whereas if the current exceeds $30 \times t_2^{0.5}$ kA or the time exceeds $1,000 \times t_2^{0.5}$ msec, the interface reaction layer grows to a large thickness and the area of the interface reaction layer having a thickness in the optimal range decreases.

The current pattern may have a plurality of the steps in this current range, but it is important that the total time of these steps is in the above-described range of $100 \times t_2^{0.5}$ to $1{,}000 \times t_2^{0.5}$ msec. In the case of joining of similar metals, almost the same joint structure is obtained with the same amount of heat input, but in the joining between steel and an aluminum material, the area of the interface reaction layer having a thickness in the optimal range cannot be obtained in a broad range, for example, with a current pattern of more than $30 \times t_2^{0.5}$ kA and less than $100 \times t_2^{0.5}$ msec or with a current pattern of less than $15 \times t_2^{0.5}$ kA and more than $1{,}000 \times t_2^{0.5}$ msec. A different pattern may be added before and after this current condition to create a current pattern in a plurality of stages, but it is necessary that a step of passing a current higher than that in the step above is not present, because the interface reaction layer grows to a large thickness.

In a preferred current pattern, a step of passing a current of $1 \times t_2^{0.5}$ to $10 \times t_2^{0.5}$ kA for $100 \times t_2^{0.5}$ to $1{,}000 \times t_2^{0.5}$ msec is added to thereby suppress cracking of the nugget.

Examples

A dissimilar material joint product was produced by overlapping a commercially available high-tension steel sheet of 590 MPa grade as the steel product on a commercially available A6061 (6000-type) aluminum alloy sheet as the aluminum material and spot-welding the stack and evaluated for the bonding strength and corrosion resistance.

TABLE 3

(Sheet thickness $t_2$ of aluminum material: 1 mm)

| | Spot Welding Conditions | | | | | | | | Dissimilar material joint product | | | |
|---|---|---|---|---|---|---|---|---|---|---|---|---|
| | Conditions of Electrode Chip | | | | Welding Step 1 | | Welding Step 2 | | Area of Interface | Characteristics | | |
| Mark | Tip Diameter (mm) | Tip Curvature Radius R (mm) | Welding Pressure W (kN) | $(R \times W)^{1/3}/R$ | Welding Current × $t_2^{0.5}$ (kA) | Welding Time × $t_2^{0.5}$ (msec) | Welding Current × $t_2^{0.5}$ (kA) | Welding Time × $t_2^{0.5}$ (msec) | Reaction Layer with Optimal Thickness × $t_2^{0.5}$ (mm²) | Cross Tensile Test Results | Corrosion Resistance Test Results | Remarks |
| A | 5 | 150 | 5 | 0.061 | 25 | 100 | — | — | 0 | X | ◉ | Comparative Example |
| B | 12 | 150 | 2.5 | 0.048 | 25 | 100 | — | — | 2 | X | ◉ | Comparative Example |
| C | 12 | 200 | 3 | 0.042 | 25 | 100 | — | — | 4 | X | ◉ | Comparative Example |
| D | 12 | 150 | 5 | 0.061 | 12 | 1000 | — | — | 6 | X | ◉ | Comparative Example |
| E | 12 | 150 | 5 | 0.061 | 20 | 50 | — | — | 8 | X | ◉ | Comparative Example |
| F | 12 | 150 | 5 | 0.061 | 35 | 200 | — | — | 4 | X | ◉ | Comparative Example |
| G | 12 | 150 | 5 | 0.061 | 18 | 2000 | — | — | 7 | Δ | ◉ | Comparative Example |
| H | 12 | 150 | 5 | 0.061 | 20 | 200 | 32 | 40 | 8 | Δ | ◉ | Comparative Example |
| I | 7 | 40 | 5 | 0.061 | 20 | 200 | — | — | 14 | ○ | ◉ | Example |
| J | 15 | 75 | 2 | 0.108 | 20 | 200 | 12 | 100 | 25 | ○ | ◉ | Example |
| K | 12 | 200 | 4 | 0.089 | 15 | 1000 | — | — | 38 | ○ | ◉ | Example |
| L | 12 | 150 | 6 | 0.053 | 15 | 60 | 25 | 60 | 31 | ○ | ◉ | Example |
| M | 12 | 150 | 6 | 0.064 | 6 | 400 | 25 | 200 | 40 | ○ | ◉ | Example |
| N | 12 | 150 | 6 | 0.064 | 25 | 100 | 6 | 400 | 68 | ◉ | ◉ | Example |
| O | 12 | 150 | 7.5 | 0.069 | 25 | 100 | 9 | 100 | 72 | ◉ | ◉ | Example |
| P | 12 | 200 | 7 | 0.056 | 30 | 100 | 2 | 1000 | 65 | ◉ | ◉ | Example |

TABLE 4

(Sheet thickness $t_2$ of aluminum material: 2 mm)

| | Spot Welding Conditions | | | | | | | | Dissimilar material joint product | | | |
|---|---|---|---|---|---|---|---|---|---|---|---|---|
| | Conditions of Electrode Chip | | | | Welding Step 1 | | Welding Step 2 | | Area of Interface | Characteristics | | |
| Mark | Tip Diameter (mm) | Tip Curvature Radius R (mm) | Welding Pressure W (kN) | $(R \times W)^{1/3}/R$ | Welding Current × $t_2^{0.5}$ (kA) | Welding Time × $t_2^{0.5}$ (msec) | Welding Current × $t_2^{0.5}$ (kA) | Welding Time × $t_2^{0.5}$ (msec) | Reaction Layer with Optimal Thickness × $t_2^{0.5}$ (mm²) | Cross Tensile Test Results | Corrosion Resistance Test Results | Remarks |
| A | 5 | 150 | 5 | 0.061 | 25 | 100 | — | — | 2 | X | ◉ | Comparative Example |

TABLE 4-continued (Sheet thickness $t_2$ of aluminum material: 2 mm)

| | Spot Welding Conditions | | | | | | | | Dissimilar material joint product | | | |
|---|---|---|---|---|---|---|---|---|---|---|---|---|
| | Conditions of Electrode Chip | | | | Welding Step 1 | | Welding Step 2 | | Area of Interface | Characteristics | | |
| Mark | Tip Diameter (mm) | Tip Curvature Radius R (mm) | Welding Pressure W (kN) | $(R \times W)^{1/3}/R$ | Welding Current × $t_2^{0.5}$ (kA) | Welding Time × $t_2^{0.5}$ (msec) | Welding Current × $t_2^{0.5}$ (kA) | Welding Time × $t_2^{0.5}$ (msec) | Reaction Layer with Optimal Thickness × $t_2^{0.5}$ (mm²) | Cross Tensile Test Results | Corrosion Resistance Test Results | Remarks |
| B | 12 | 150 | 2.5 | 0.048 | 25 | 100 | — | — | 0 | X | ◉ | Comparative Example |
| C | 12 | 200 | 3 | 0.042 | 25 | 100 | — | — | 2 | X | ◉ | Comparative Example |
| D | 12 | 150 | 5 | 0.061 | 12 | 1000 | — | — | 5 | X | ◉ | Comparative Example |
| E | 12 | 150 | 5 | 0.061 | 20 | 50 | — | — | 6 | X | ◉ | Comparative Example |
| F | 12 | 150 | 5 | 0.061 | 35 | 200 | — | — | 9 | Δ | ◉ | Comparative Example |
| G | 12 | 150 | 5 | 0.061 | 18 | 2000 | — | — | 8 | Δ | ◉ | Comparative Example |
| H | 12 | 150 | 5 | 0.061 | 20 | 200 | 32 | 40 | 6 | X | ◉ | Comparative Example |
| I | 7 | 40 | 5 | 0.061 | 20 | 200 | — | — | 17 | ○ | ◉ | Example |
| J | 15 | 75 | 2 | 0.108 | 20 | 200 | 12 | 100 | 19 | ○ | ◉ | Example |
| K | 12 | 200 | 4 | 0.089 | 15 | 1000 | — | — | 28 | ○ | ◉ | Example |
| L | 12 | 150 | 6 | 0.053 | 15 | 60 | 25 | 60 | 35 | ○ | ◉ | Example |
| M | 12 | 150 | 6 | 0.064 | 6 | 400 | 25 | 200 | 46 | ○ | ◉ | Example |
| N | 12 | 150 | 6 | 0.064 | 25 | 100 | 6 | 400 | 59 | ◉ | ◉ | Example |
| O | 12 | 150 | 7.5 | 0.069 | 25 | 100 | 9 | 100 | 60 | ◉ | ◉ | Example |
| P | 12 | 200 | 7 | 0.056 | 30 | 100 | 2 | 1000 | 55 | ◉ | ◉ | Example |

(Weld-Bond Product Changed in Spot Welding Conditions)

A weld-bond product where the steel sheet above having applied to the joining surface side thereof hot-dip pure Zn plating to an average thickness of 10 μm and the aluminum material above were overlapped after coating an epoxy-based thermosetting adhesive between joining surfaces, was spot-welded to produce a dissimilar material joint product, and the results are shown hi Tables 3 and 4.

The results when the sheet thickness of the aluminum sheet is 1 mm are shown in Table 3, and the results when the sheet thickness of the aluminum sheet is 2 mm are shown in Table 4. In Tables 3 and 4, dissimilar material joint products were produced by variously changing the electrode conditions or current conditions in the spot welding but setting constant the plating conditions and thermosetting adhesive conditions on the joining surface side of the steel sheet. Also, in common among Examples in Tables 3 to 4, an epoxy-based thermosetting adhesive was uniformly and thinly coated by a brush to a thickness of approximately from 0.5 to 1 μm (to an extent not causing expulsion of the adhesive due to pressure at the spot bonding).

TABLE 5

| | Zn or Al Metal Film (Plating) Layer | | | | | | Dissimilar material joint product | | | |
|---|---|---|---|---|---|---|---|---|---|---|
| | | | | | | | Area of Interface | Characteristics | | |
| Mark | Kind and Composition of Plating | Plating Method | Material to be Plated | Thickness of Plating Film (μm) | Melting Point of Plating (° C.) | Resin Adhesive Film | Reaction Layer with Optimal Thickness × $t_2^{0.5}$ (mm²) | Cross Tensile Test Results | Corrosion Resistance Test Results | Remarks |
| 1 | — | — | — | — | — | — | 42 | ○ | X | Comparative Example |
| 2 | — | — | — | — | — | epoxy | 0 | X | ○ | Comparative Example |
| 3 | pure Ni | electroplating | steel product | 10 | 1450 | epoxy | 0 | X | ○ | Comparative Example |
| 4 | Zn—10% Ni | electroplating | steel product | 10 | 1050 | epoxy | 0 | X | ○ | Comparative Example |

TABLE 5-continued

| | Zn or Al Metal Film (Plating) Layer | | | | | Dissimilar material joint product | | | |
| | | | | | | Area of Interface | Characteristics | | |
| Mark | Kind and Composition of Plating | Plating Method | Material to be Plated | Thickness of Plating Film (μm) | Melting Point of Plating (°C.) | Resin Adhesive Film | Reaction Layer with Optimal Thickness × $t_2^{0.5}$ (mm$^2$) | Cross Tensile Test Results | Corrosion Resistance Test Results | Remarks |
|---|---|---|---|---|---|---|---|---|---|---|
| 5 | Zn—10% Ni | electroplating | aluminum | 10 | 1050 | epoxy | 0 | X | ○ | Comparative Example |
| 6 | pure Zn | electroplating | steel product | 10 | 420 | epoxy | 58 | ⊚ | ⊚ | Example |
| 7 | pure Zn | electroplating | aluminum | 10 | 420 | epoxy | 72 | ⊚ | ⊚ | Example |
| 8 | pure Al | hot-dip | steel product | 10 | 650 | epoxy | 19 | ○ | ○ | Example |
| 9 | Al—9% Si | hot-dip | steel product | 10 | 600 | epoxy | 35 | ○ | ○ | Example |
| 10 | pure Zn | hot-dip | steel product | 10 | 420 | — | 15 | ○ | Δ | Comparative Example |
| 11 | pure Zn | hot-dip | steel product | 10 | 420 | epoxy | 68 | ⊚ | ⊚ | Example |
| 12 | Zn—5% Fe | hot-dip | steel product | 10 | 550 | epoxy | 65 | ⊚ | ○ | Example |
| 13 | Zn—10% Fe | hot-dip | steel product | 10 | 850 | epoxy | 50 | ⊚ | ○ | Example |
| 14 | Zn—12% Fe | hot-dip | steel product | 10 | 950 | — | 18 | ○ | X | Comparative Example |
| 15 | Zn—12% Fe | hot-dip | steel product | 10 | 950 | epoxy | 41 | ○ | ○ | Example |
| 16 | Zn—16% Fe | hot-dip | steel product | 10 | 1050 | epoxy | 0 | X | ○ | Comparative Example |
| 17 | pure Zn | hot-dip | steel product | 1 | 420 | epoxy | 8 | Δ | ○ | Comparative Example |
| 18 | pure Zn | hot-dip | steel product | 3 | 420 | epoxy | 56 | ⊚ | ⊚ | Example |
| 19 | pure Zn | hot-dip | steel product | 15 | 420 | epoxy | 51 | ⊚ | ⊚ | Example |
| 20 | pure Zn | hot-dip | steel product | 19 | 420 | epoxy | 25 | ○ | ⊚ | Example |
| 21 | pure Zn | hot-dip | steel product | 20 | 420 | epoxy | 5 | Δ | ⊚ | Comparative Example |
| 22 | pure Zn | hot-dip | steel product | 10 | 420 | polyurethane | 53 | ⊚ | ⊚ | Example |

(Weld-Bond Product Changed in Plating Conditions or Thermosetting Adhesive Conditions)

The results when dissimilar material joint products were produced from a weld-bond product of a steel sheet and an aluminum sheet by variously changing the plating conditions on the joining surface side of the steel sheet or aluminum alloy sheet or the thermosetting adhesive conditions but setting constant the electrode conditions and current conditions at the spot welding are shown in Table 5. In Table 5, in common among Examples where an adhesive was coated, an epoxy-based or polyurethane-based adhesive was uniformly and thinly coated between joining surfaces by a brush to a thickness of approximately from 0.5 to 1 μm.

(Materials Used)

As for the materials, a steel sheet having a sheet thickness of 1 mm and having a composition containing 0.07 mass % C-18 mass % Mn and A6061 aluminum alloy sheets having a sheet thickness of 1 mm and 2 mm were prepared. The steel sheet and the aluminum alloy sheet both were worked into a cross tensile test specimen shape described in JIS A 3137 and then spot-welded.

(Adhesive)

The epoxy-based adhesive used was a commercially available epoxy-based thermosetting adhesive for structure (Penguin #1086, produced by Sunstar Engineering Inc.), and the polyurethane-based adhesive, used was a commercially available polyurethane-based then-resetting adhesive for structure (Penguin Seal 980, produced by Sunstar Engineering Inc.).

(Plating)

In the case of applying plating to the steel product, various platings were performed in common after subjecting the steel product to a pretreatment including pickling and activation with 10% sulfuric acid for 5 minutes, in Zn electroplating, pure Zn plating was applied to a thickness 10 μm by passing a current of 20 A/dm$^2$ in a bath where sulfuric acid was added to 400 g/l of zinc sulfate, 30 g/l of aluminum sulfate, 15 g/l of sodium chloride and 30 g/l of boric acid and the pH was thereby adjusted to 3. In the case of Zn-10% Ni alloy plating, a current of 10 A/dm$^2$ was passed in a bath prepared by adding nickel sulfate and nickel chloride to the galvanization bath, in the pure Zn platting above, whereby Zn-10% Ni plating was applied to a thickness of 10 μm.

Hot-dip plating was applied only to the steel product. Using various molten metals, Al plating, Al-9 mass % Si plating, Zn plating and Zn—Fe plating (Fe amount: 5, 10, 12 or 16%) each was applied to a thickness of 10 μm. In the hot-dip Zn plating, the film thickness was adjusted to 1, 3, 10, 15, 19 or 20 μm by changing the temperature and the withdrawal temperature.

Also, Ni plating of Comparative Example (Comparative Example 3 in Table 5) was applied to a thickness of 10 μm by passing a current of 10 A/dm$^2$ in a Watt bath.

In the case of applying plating to the aluminum material, Zn plating or Zn electroplating was performed after subjecting the aluminum material to pickling with 10% nitric acid for 30 seconds and then to zinc displacement for 30 seconds in a treating solution containing 500 g/l sodium hydroxide, 100 g/l of zinc oxide, 5 g/l of ferric chloride and 10 g/l of Rochelle salt. Also, a current of 10 A/dm$^2$ was passed in a bath prepared by adding nickel sulfate and nickel chloride to the galvanization bath above, whereby Zn-10% Ni plating was applied to a thickness of 10 μm.

(Measurement of Film Thickness)

The thickness of the plating film was determined as follows. The sample after plating was cut and embedded in a resin, the cut surface was polished, and the joint interface before spot welding was then observed through SEM. The thickness was measured at three points in a visual field at a magnification of 2,000, and the values obtained was averaged.

(Spot Welding)

A dc resistance welding tester was used for the spot welding. Dome-type chips each composed of Cu—Cr alloy were used and connected to aluminum as the anode and to steel as the cathode. In Tables 3 and 4, dissimilar material joint product samples for a cross tensile test were produced by performing welding under the electrode chip conditions [tip diameter, tip curvature radius R, welding pressure W and $(R \times W)^{1/3}/R$] and current pattern [welding current and welding time in welding steps 1 and 2] shown in Tables 3 and 4.

At this time, in Examples of the Invention in Tables 3 and 4, the spot welding was performed by a current pattern having a step of applying a welding pressure by electrode chips, with the electrode chip on the aluminum material side having a tip diameter of 7 mmφ or more, to satisfy the relationship of $(R \times W)^{1/3}/R > 0.05$ between the tip curvature radius R mm and the welding pressure W kN while passing a current of $15 \times t_2^{0.5}$ to $30 \times t_2^{0.5}$ kA for $100 \times t_2^{0.5}$ to $1,000 \times t_2^{0.5}$ msec.

In Table 5, in common among Examples, samples for the cross tensile test were produced by performing the welding under the spot welding conditions shown by N as Example of the Invention in Table 3 and setting the conditions constant.

With respect to each of these conditions, 5 units for the evaluation of bonding strength, 3 units for the evaluation of joint interface and 3 units for the corrosion test were produced. In this test electrode chips having the same shape were used for the steel side and the aluminum material side. As for the sample for the interface evaluation, the adhesive was completely cured by performing a heat treatment at 180° C. for 30 minutes after the spot welding.

(Measurement of Thickness of Interface Reaction Layer)

The sample after spot welding was cut at the joint part center and embedded in a resin and after polishing, the thickness of the interface reaction layer was measured by SEM observation. The thickness was measured in a visual held at a magnification 2,000 when the layer thickness was 1 μm or more and in a visual field at a magnification 10,000 when it was less than 1 μm. The interface reaction layer as used herein indicates a compound layer containing both Fe and Al, and this is a layer where the amounts of both Fe and Al detected by EDX are 1 wt % or more. That is, a layer where both Fe and Al are not detected in an amount of 1 wt % or more is regarded as a plating layer or a residual adhesive and is not included in the interface reaction layer.

Incidentally, the interface reaction layer is thickest in the center part and as closer to the edge part (peripheral part), the interface reaction layer becomes thinner. Therefore, in this test, the diameter of the interface reaction layer having a thickness exceeding 10 μm and the diameter of the interface reaction layer having a thickness of 0.5 μm or more were determined and converted into areas. The measurement, was performed for 3 units of the joint product, and nugget diameters in two orthogonal directions were measured and averaged.

(Evaluation of Bonding Strength)

In the evaluation of the strength, for measuring the strength of spot welding, 5 units in the state of the adhesive being not cured were subjected to a cross tensile test under each condition, and the values obtained were averaged. The sample was rated ⊚ when the bonding strength was 1.5 kN or more or the rupture mode was the aluminum base material rupture, rated ○ when the bonding strength was from 1.0 to 1.5 kN, rated Δ when the bonding strength was from 0.5 to 1.0 kN, and rated x when the bonding strength was less than 0.5 kN. Here, unless the bonding strength is not lower than the range of 1.0 to 1.5 kN (○), the joint product cannot be used as a material for structures such as automobile.

(Evaluation of Dissimilar Metal Contact Corrosion)

Joint products obtained by joining under various conditions each was alkali-degreased and after water washing, subjected to a surface conditioning treatment for 30 seconds by using a 0.1% aqueous solution of Surffine 5N-10 produced by Nippon Paint Co., Ltd. Subsequently, each joint product was treated with zinc phosphate for 2 minutes in a bath at 50° C. containing 1.0 g/l of zinc ion, 1.0 g/l of nickel ion, 0.8 g/l of manganese ion, 15.0 g/l of phosphate ion, 6.0 g/l of nitrate ion and 0.12 g/l of nitrite ion and having a toner value of 2.5 pt, a total acid degree of 22 pt and a free acid degree of 0.3 to 0.5 pt. These joint products each was then coated with a cationic electrodeposition coating material (Powertop V50, gray, produced by Nippon Paint Co., Ltd.) and baked at 170° C. for 25 minutes to form a 30 μm-thick film.

Thereafter, a composite corrosion test was performed to evaluate the property of preventing the dissimilar metal contact corrosion. In the corrosion test, the test was performed for 90 cycles, where one cycle includes A: salt spray (35° C., 5% NaCl) for 2 hours, B: drying (60° C., 20 to 30% RH) for 4 hours, and C: wetting (50° C., 95% RH or more) for 2 hours. After the test, the joint part was separated and observed, and the corrosion resistance (maximum depth of corrosion of Al) was evaluated.

The corrosion resistance was evaluated by measuring the maximum depth of corrosion in the aluminum material for 3 units of the dissimilar material joint product and rated ⊚ when the maximum depth was less than 0.01 mm on average, rated ○ when from 0.01 to 0.02 mm, rated Δ when from 0.02 to 0.1 mm, and rated x when 0.1 mm or more. Unless the maximum depth of corrosion is less than the range of 0.01 to 0.02 mm (○), the joint product cannot be used as a material for structures such as automobile.

(Results in Tables 3 and 4)

As seen from Tables 3 and 4, very high corrosion resistance was obtained in the dissimilar material joint products of I to P as Examples of the Invention, which were obtained by spot welding in the suitable range. This was yielded by virtue of the effects of the hot-dip galvanization and thermosetting adhesive provided between joining surfaces. However, also in Comparative Examples A to H where spot welding was performed under the conditions out of the suitable range, similarly to Examples of the Invention, zinc galvanization and thermosetting adhesive were provided between joining surfaces and the corrosion resistance was likewise high.

On the other hand, as for the boding strength, high bonding strength was not obtained in Comparative Examples A to C where, the spot welding conditions were out of the suitable range, for example, the tip diameter of the electrode chip was small or the welding pressure in relation to the tip curvature radius was low. In addition, the bonding strength was low in Comparative Examples D to H where the suitable range of the present invention for the current conditions was also not satisfied.

Except for Comparative Example H where the welding step 2 was performed, in Comparative Examples A to G, the spot welding was effected only by the welding step 1 without performing the welding step 2. Out of these Comparative Examples, in Comparative Example A, the tip diameter of the electrode chip was too small, and in Comparative Examples B and C, the welding pressure in relation to the tip curvature radius was too low.

In Comparative Example D, the welding current in the welding step 1 was too low in relation to the sheet thickness of the aluminum material, and in Comparative Example E, the welding time in the welding step 1 was too short in relation to the sheet thickness of the aluminum material. Furthermore, in Comparative Example F, the welding current in the welding step 1 is too high in relation to the sheet thickness of the aluminum material; in Comparative Example G, the welding time in the welding step 1 was too long in relation to the sheet thickness of the aluminum material; and in Comparative Example H, a welding step 2 of passing a current significantly higher than that in the welding step 1 was present.

That is, in Examples I to P of the Invention, the spot welding was performed by the preferred welding step 1 of applying a welding pressure by electrode chips, with the electrode chip on the aluminum material side having a tip diameter of 7 mmφ or more, to satisfy the relationship of $(R \times W)^{1/3}/R > 0.05$ between the tip curvature radius R mm and the welding pressure W kN while passing a current of $15 \times t_2^{0.5}$ to $30 \times t_2^{0.5}$ kA for $100 \times t_2^{0.5}$ to $1,000 \times t_2^{0.5}$ msec. In Examples I and K of the Invention, the spot welding was effected only by this welding step 1 without performing the welding step 2. Therefore, in each of Examples of the Invention, the interface reaction layer having an optimal thickness could be controlled and the bonding strength was high.

Out of these Examples of the Invention, in Examples N, O and P of the Invention where the spot welding was performed by a current pattern having the above-described welding step 1 and not having a step of passing a current higher than that in the welding step 1, combined with a welding step 2 performed later under preferred conditions of passing a current of $1 \times t_2^{0.5}$ to $10 \times t_2^{0.5}$ kA for $100 \times t_2^{0.5}$ to $1,000 \times t_2^{0.5}$ msec, the bonding strength was highest. On the other hand, in Examples L and M of the Invention where the spot welding was performed by a current pattern having a welding step 2 of passing a current higher than that in the welding step 1, the bonding strength was lower than in Examples N, O and P of the Invention.

(Results of Table 5)

As seen from Table 5, the corrosion resistance was poor in Comparative Examples 1, 10 and 14 where a resin adhesive was not provided. Also, in Comparative Example 2 where plating was not applied and in Comparative Examples 3, 4 and 5 where the plating condition (melting point) was out of the range, the cross tensile test results were bad and the bonding strength was low. Incidentally, under this condition, the cross tensile test results were rather bad also in Comparative Example 2 where plating was not applied and an adhesive was provided. Furthermore, in Comparative Example 21 where the plating thickness was too large, the cross tensile test results were rather bad, despite pure zinc plating.

On the other hand, Examples 6 to 9, 11 to 13, 15, 18, 19, 20 and 22 of the Invention where a resin adhesive was provided and the plating condition (melting point) was within the range, the interface, reaction layer having an optimal thickness could be controlled and excellent corrosion resistance and high bonding strength were obtained. Out of these Examples, the bonding strength was highest in Examples 6 to 7, 11, 18, 19, 20 and 22 where pure zinc plating was applied. As seen from these results, by the control to the components, melting point and film thickness of the present invention, the interface reaction layer having an optimal thickness can be controlled and high bonding strength and high corrosion resistance can be obtained. In particular, it is understood that when a weld bond of 5 to 15 μm in thickness is formed by pure Zn plating, both remarkably high bonding strength and remarkably excellent corrosion resistance can be obtained.

These results in Examples above clarify the critical meaning of each requirement specified in the present invention, which enables a dissimilar material joint product to be enhanced in the bonding strength and at the same time, reduced in the contact corrosion.

[3]
(Dissimilar Material Joint Product)

FIG. 2 shows a cross-sectional view of the dissimilar material joint product specified in one embodiment of the present invention. In FIG. 2, 13 is a dissimilar material joint product obtained by joining a steel product (steel sheet) 11 and an aluminum material (aluminum alloy sheet) 12 together by spot welding, 15 is a nugget having an interface reaction layer 16 formed in the spot welding, where the nugget has a nugget diameter shown by an arrow in the horizontal direction in the Figure, and 19 is a corona bond part in the periphery of the nugget. In the Figure, $t_1$ denotes the sheet thickness of the sleet product, $t_2$ denotes the sheet thickness of the aluminum material 12, and Δt denotes the minimum residual sheet thickness of the aluminum material after joining by spot welding.

Here, 14 is a suppression layer (corrosion suppressing layer) and is a stack of a metal film of Zn (that means pure Zn) or Zn alloy and a phosphate film, which is previously provided between a joining surface of the steel product 11 and the aluminum material 12 to be joined together, in FIG. 2, the Zn or Zn alloy film and the phosphate film are shown integrally without distinguishing individual films, but this shows an embodiment where a Zn or Zn alloy film is provided by plating or the like on the steel product 11 surface on the joining side and a zinc phosphate film is applied thereon to complete a suppression layer 14 (corrosion suppressing layer).

In FIG. 2, a good joint state of the dissimilar material joint product is shown, where the suppression layer (corrosion suppressing layer) 14 as a stack of a Zn or Zn alloy him and a phosphate film previously provided before spot welding is removed in the joint part of the dissimilar material joint product after spot welding and the steel product 11 is joined directly to the aluminum material 12. Furthermore, FIG. 2 shows that the suppression layer (corrosion suppressing layer) 14 previously formed is present as it is in the interface region other man the joint part of the dissimilar material joint product.

(Sheet Thickness of Steel Product)

In the present invention, the joint product needs to be a joint product where the sheet thickness $t_1$ of the steel product is from 0.3 to 3.0 mm. If the sheet thickness $t_1$ of the steel product is less than 0.3 mm, the strength or rigidity required of the above-described structural member or structural material cannot be ensured and this is improper. In addition, great deformation of the steel product occurs due to pressure applied during spot welding and this causes easy breaking of the oxide film and in turn, accelerates the reaction with aluminum, as a result, an intermetallic compound is readily formed.

On the other hand, if it exceeds 3.0 mm, other joining means are employed for the structural member or structural material and joining by spot welding is less needed. Accordingly, it is not necessary that the sheet thickness $t_1$ of the steel product is large over 3.0 mm.

(Steel Product)

In the present invention, the shape and material of the steel product used are not particularly limited, and an appropriate shape and an appropriate material, used for general purposes in a structural member or selected from those used for a structural member, such as steel sheet, steel shaped product and steel pipe, may be employed. However, in order to obtain a lightweight high-strength structural member (dissimilar material joint product) such as automotive member, the steel product is preferably a normal high-tension steel (high-tension) having a tensile strength of 400 MPa or more.

A low-strength steel having a tensile strength of less than 400 MPa is generally a low-alloy steel in many cases and since the oxide film is composed of iron oxide, Fe and Al are caused to readily diffuse and a brittle intermetallic compound is liable to be formed. For this reason, the steel product is preferably a high-tension steel (high-tension) having a tensile strength of 400 MPa or more, more preferably 500 MPa or more.

(Aluminum Material)

The aluminum material for use in the present invention is not particularly limited in its alloy type or shape, and according to the properties required of each structural member, a general-purpose aluminum material such, as sheet material, shaped material, forged material or cast material may be appropriately selected. However, similarly to the steel product, the aluminum material preferably has high strength so as to suppress the deformation due to pressure applied at the spot welding. In this respect out of aluminum alloys, A5000-type and A6000-type alloys having high strength and being used for general purposes as such a kind of a structural member are best.

The sheet thickness $t_2$ of the aluminum material for use in the present invention is from 0.5 to 4.0 mm. If the sheet thickness $t_2$ of the aluminum material is less than 0.5 mm, the strength as a structural material is disadvantageously insufficient, a sufficiently large nugget diameter is not obtained, the melt readily reaches the aluminum material surface to cause surface flash, and in turn, high bonding strength is not obtained. On the other hand, if the sheet thickness $t_2$ of the aluminum material exceeds 4.0 mm, as in the case of the above-described sheet thickness of the steel product, other joining means are employed for the structural member or structural material and joining by spot welding is less needed. Accordingly, it is not necessary that the sheet thickness $t_2$ of the aluminum material is large over 4.0 mm.

(Suppression Layer)

In the present invention, for obtaining higher bonding strength, suppressing the dissimilar metal contact corrosion and preventing reduction in the bonding strength, a suppression layer (corrosion suppressing layer) is previously formed between the steel and the aluminum material (on the material). This suppression layer is required not to impair the control of the area or thickness distribution of the interface reaction layer formed between the steel and the aluminum material in the spot welding.

In the present invention, two films, that is, a metal film of Zn or Zn alloy and a zinc phosphate film, are previously provided as the suppression layer (corrosion suppressing layer) having such a function, between a joining surface of the steel product and the aluminum material to be joined together. To this end, as described below, a metal film and a phosphate film are stocked and provided on the joining surface on either the steel product side or the aluminum material side. The order of providing (stacking) the films is not limited but when the metal film is first provided, this makes it more easy to provide the zinc phosphate film.

(Zn or Zn Alloy Film)

The metal film of Zn (pure Zn) or Zn alloy, which is one of the suppression layer (corrosion suppressing layer), is described below. In the present invention, spot welding is performed in a state of a metal film of Zn or Zn alloy being previously provided between a joining surface of the steel product and the aluminum material to be joined together, and to this end, a metal film of Zn or Zn alloy is previously provided on the surface at least on the joining surface side of the steel product or aluminum material. This Zn or Zn alloy film has a melting point close to that of the aluminum material and therefore, has a property ensuring that, even when a phosphate film is present, the control of the time spent to form the interface reaction layer which is an intermetallic compound between steel and aluminum or the control of the thickness range and distribution of the interface reaction layer is not inhibited at the spot welding.

In conventional spot welding using such a steel product and an aluminum material as are bare or have no Zn or Zn alloy film, when a phosphate film is present at the joint interface, the spot welding itself or the control of the interface reaction layer formation becomes difficult and high bonding strength cannot be obtained.

On the other hand, in the case, where a Zn or Zn alloy film is previously provided as the suppression layer between a joining surface of the steel product and the aluminum material to be joined together, even when a phosphate film intervenes as another suppression layer between joining surfaces, the spot welding itself or the control of the interface reaction layer formation does not become difficult, and the above-described function of the phosphate film is exerted. This is considered to result because the amount of resistance heat generated increases at the spot welding due to the presence (intervention) of a Zn or Zn alloy film and the temperature at the interface between the steel product and the aluminum material, particularly the temperature of the steel product significantly rises over the melting temperature of aluminum. Due to this increase in the amount of resistance heat generated, the phosphate film is easily broken and dissolves out into the molten aluminum, whereby electrical conduction between the steel product and the aluminum material can be established.

In other words, the phosphate film as another suppression layer, when present together with the Zn or Zn alloy film, is broken only its the spot-welded portion and enables establishing electrical conduction between the steel product and the aluminum material in the spot-welded part. On whichever side the phosphate film is present, if the phosphate film is caused to intervene between the steel product, and the aluminum material, by itself without the Zn or Zn alloy film in the specific range of the present invention, as described above, the control of the area or thickness distribution of the interface reaction layer formed in the joint product is inhibited.

Also, as described above, when the amount of resistance heat generated increases at the spot welding due to the presence (intervention) of a Zn or Zn alloy film, the diffusion speed at the interface between aluminum and steel becomes significantly high and aluminum diffuses to the steel side, as a result, a good joint state is rapidly ensured. Furthermore, in the case of a galvanized steel sheet, the galvanization layer melts earlier because of difference in the melting point and this is presumed to produce an effect of uniformizing the heat distribution at the interface. It is considered that by virtue of such a combined effect of the Zn or Zn alloy film, the spot weldability is not impaired, despite the intervention of a phosphate film.

In order to bring out these effects, the melting point of the metal film of Zn or Zn alloy is set to a narrow temperature range of 350 to 1,000° C., preferably from 400 to 950° C. more preferably a narrower temperature range from the melting point of the aluminum material to 900° C. The melting point of pure Al is about 660° C. and the melting point of pure Zn is about 420° C. The expression "having a melting point close to that of the aluminum material to be joined" means to allow the above-described certain margin with respect to, for example, the melting point 660° C. of pure Al.

The thickness of the Zn or Zn alloy film is set to a film thickness (average film thickness) range of 3 to 19 µm, preferably from 5 to 15 µm. The thickness of the Zn or Zn ahoy film is determined as follows. A steel product or aluminum material sample after forming such a film is cut and embedded in a resin, and the metal film after polishing the cut surface is observed in its thickness direction through SEM. In this SEM observation, the thickness is measured at three points in a visual field at a magnification of 2,000, and observation results at about 5 different sites are average to determine the thickness of the metal film.

If the thickness of the Zn or Zn alloy film is too small or its melting point is too low, the Zn or Zn alloy film is melted and discharged from the joint part in the early stage of joining at the spot welding and formation of the interface reaction layer cannot be suppressed. Also, the amount of resistance heat generated less increases, the phosphate film is hardly broken, and establishment of electrical conduction between the steel product and the aluminum material in the spot-welded part becomes difficult.

On the other hand, in order to increase the bonding strength of the dissimilar material joint product, the steel product and the aluminum material to be joint together need to be put Into direct contact at a joining surface with each other, and at the spot welding, the Zn or Zn alloy film previously intervening in the joint part needs to be melted and discharged from the joint part. If the thickness of the Zn or Zn alloy film is too large or the melting point is too high, a large amount of heat input is required to melt and discharge the Zn or Zn alloy film from the joint part. If this amount of heat input becomes large, the amount of the aluminum material melted increases to cause generation of surface flash and this brings out great decrease in the thickness of the aluminum material, as a result, the dissimilar material joint product cannot be used as a structural member.

As for the Zn or Zn alloy film, Zn, a Zn alloy or the like in the above-described melting point range can be appropriately selected. The method for coating or forming a metal film on the surface at least on the joining surface side of the steel product or aluminum material may also be appropriately selected from known general-purpose methods such as plating and coating. Incidentally, the coating or formation on the steel product or aluminum material surface is applied at least to the surface on the joining surface side, but of course, for the corrosion prevention or the like, a Zn or Zn alloy film may be coated or formed on the steel product or aluminum material surface side which is not a joining surface.

However, considering the practical utility or efficiency, the Zn or Zn alloy film is preferably coated or formed by plating on the steel product side to which Zn or Zn alloy plating is usually applied for general purposes. The steel product is usually subjected to coating before use and in this case, even when the coat is scratched, Zn or a Zn alloy is preferentially corroded and the steel product can be protected. Furthermore, the potential difference between the steel and the aluminum material is reduced, so that the dissimilar metal contact corrosion which is one of foe problems to be solved in, the field of dissimilar material joint products can also be suppressed. In the case of employing Zn or Zn alloy plating, the corrosion resistance of the steel product can be ensured and plating can be easily applied to either steel or aluminum.

On the premise of plating, in order to bring out the function of suppressing the interface reaction layer formation and the function of enabling welding even with the intervention of a phosphate film, the Zn or Zn alloy plating film is preferably pure Zn. Even when a Zn alloy is used, it is preferred that in the alloys such as Al—Zn and Zn—Fe, each contains 80 mass % or more of Zn and the main component is Zn. In the case of alloying the Zn or Zn alloy plating film, this is performed not to allow deviation from the above-described melting point range or reduction in the corrosion resistance by selecting the alloy elements added or the con rents thereof.

Out of these plating films, a pure Zn or Zn alloy plating film containing 88 mass % or more of Zn is recommended above all. When a Zn alloy plating film containing 88 mass % or more of Zn is applied to the steel product surface, particularly the corrosion resistance of the steel product is increased. Also, the melting point of this Zn plating film is easy to control to the above-described range of 350 to 1,000° C. Furthermore, the corrosion resistance is high, so that the dissimilar metal contact corrosion can also be suppressed. From the standpoint of preventing the dissimilar metal contact corrosion, a pure Zn plating film is most, preferred.

In the present invention, the plating method is not limited and an existing wet or dry plating method can be used. In particular, the galvanization is preferably performed, for example, by electroplating, hot-dip plating or a method of performing an alloying treatment after hot-dip plating.

(Phosphate Film)

The phosphate film as another suppression layer is described below. As described above, the phosphate film causes film breaking through pinholes or due to electrical resistance when present together with the Zn or Zn alloy film in the specific range of the present invention and allows for electric conduction between the steel product and the aluminum material, whereby the area or thickness distribution of the interface reaction layer of the joint product can be controlled at the spot welding. However, in order to establish electric conduction between the steel product and the aluminum material the phosphate film need not be completely eliminated from the joint part. In other words, the phosphate film may remain in the joint part in the spot welding if electrical conduction is established between the steel product and the aluminum material.

After the spot welding, as described above, the phosphate film intervenes in a broad range or entirely between the steel product and the aluminum material, except for only the spot-welded portion in which the film is broken, and exerts a function of blocking the corrosive environment and suppressing the dissimilar metal contact corrosion.

Selection of this phosphate film is meaningful from the standpoint of practical utility as well as in view of the above-described operational effects. For example, not only a phosphate film but also a film other than phosphate, if it is a thin film, seem to cause hint breaking through pinholes or due to electrical resistance and allow for electric conduction between the steel product and the aluminum material. However, the dissimilar material joint product by spot welding, which is an object of the present invention, is typically used (produced) in an existing car-body production line for automobiles, and the phosphate treatment applied to the steel product or aluminum material also has an experience of being used as a surface preparation treatment for car body coating of automobiles in the car-body production line for automobiles. In this respect, the phosphate film has the advantage unobtainable by other films that even when intervenes in a broad range or entirely between the steel product and the aluminum material, the phosphate, film does not inhibit other various properties required of the dissimilar material joint product, such as workability and coatability. Also, the phosphate treatment has the advantage unobtainable by other films that the phosphate treatment including spot welding can be perforated by employing the existing equipment, apparatus aid conditions, such as car-body production line for automobiles. Furthermore, the phosphate film (treatment) as a surface preparation treatment for coating can enhance the coatability of the dissimilar material joint product, such as coat adherence.

(Side on which Phosphate Film is Formed)

In the present invention, spot welding is performed after coating or forming the phosphate film between a joining surface of the steel product and the aluminum material (on either one joining surface). In order to increase the bonding strength of the dissimilar material joint product. It is preferred to form a phosphate film on the steel product-side surface and further form a phosphate film on the surface of the Zn or Zn alloy film provided on the steel product-side surface.

The aluminum material has a problem that the phosphate treatability is low as compared with the steel product, and this problems occurs on the aluminum material side also in phosphate-treating the dissimilar material joint product. However, as in the present invention, when a phosphate treatment is previously applied at least to the aluminum material side of the dissimilar material joint product to form a phosphate film, the phosphate film provides the advantage as a surface preparation treatment for coating that the phosphate treatability can be enhanced. And, when the phosphate treatment is previously applied not only to the aluminum material side but also to the steel product side of the dissimilar material joint product to form a phosphate film, this is advantageous in that the phosphate treatment as a surface preparation treatment for coating can be omitted in the car-body production line for automobiles.

(Thickness of Phosphate Film)

The average thickness of fee phosphate film formed is preferably from 0.1 to 5 µm. Within this range, the action of the phosphate film can be successfully exerted. If the thickness of the phosphate film is too small, that is, less than 0.1 µm, many macroscopic film defects are generated and the corrosive environment cannot be sufficiently blocked, failing in bringing out the above-described effects of the phosphate film, for example, the dissimilar metal contact corrosion cannot be suppressed. On the other hand, the thickness of the phosphate film need not be increased over 5 µm. If the thickness of the phosphate exceeds this range, electrical resistance at the spot welding becomes excessive and surface flash is vigorously generated to cause, particularly, great reduction in the sheet thickness of the aluminum material joint part, as a result, the bonding strength rather decreases. Also, the phosphate film becomes difficult to break and electrical conduction between the steel product and the aluminum material can be hardly established in the spot-welded part.

The average thickness of the phosphate film is determined as follows. A sample section cut out from a steel product or aluminum material naturally dried after forming the film by phosphate treatment is embedded in a resin, the sample is polished and then subjected to SEM (scanning electron microscope) observation of the phosphate film section in the sheet thickness direction in a visual field at a magnification of 2,000 or 10.000, the thickness is measured at three points, and observation results at about 5 different sites are averaged.

(Kind of Phosphate)

As for the kind of phosphate, a zinc phosphate film comprising zinc as the main component, such as zinc phosphate, which is most widely used as a surface preparation treatment for coating (coat) on a galvanized steel sheet or the like for automobiles, is preferred, because the film formation (treatment) is easy. In order to control the crystallinity, orientation and the like of the zinc phosphate film, for example, Fe, Ni, Mn or Ca may be incorporated in addition to zinc (Zn) and in view of the purpose, addition of Ni is recommended. Incidentally, the film structure of zinc phosphate may be hopeite, phosphophyllite or a mixed structure thereof. As for the phosphate film, other than this zinc phosphate, known phosphate treatments such as calcium phosphate, iron phosphate and manganese phosphates may be used alone or as a mixture or a composite.

(Formation Method of Phosphate Film)

As regards the phosphate film forming method, known methods such as the above-described surface preparation treatment for coating may be employed. That is, the steel product or aluminum material is dipped in an aqueous phosphoric, acid solution having added thereto a metal which becomes a salt, such as zinc, calcium, iron and manganese, Mg and the like. The dipping conditions such as concentration and temperature of the aqueous phosphoric acid and clipping time are adjusted to give the above-described average thickness of the phosphate film.

(Sacrificial Anticorrosive Action of Phosphate Film)

As described above, the phosphate film has a function of blocking the corrosive environment and suppressing the dissimilar metal contact corrosion but cannot complete block the corrosive environment such as moisture and oxygen, because pinholes are present in the film. However, when a Zn or Zn alloy film is previously provided as another suppression layer between a joining surface of the steel product and the aluminum material to be joined together, the aluminum alloy is restrained from being preferentially corroded through pinholes. Accordingly, this effect of reducing the potential difference by the Zn or Zn alloy film enables suppressing the dissimilar metal contact corrosion.

The phosphate film can be made to have a higher effect of suppressing the dissimilar metal contact corrosion by intensifying the sacrificial anticorrosive action of the phosphate film itself, for example, by incorporating Mg into the phosphate film. In order to intensify the sacrificial anticorrosive action of the phosphate film, it is preferred to contain from 0.01 to 10 mass % of Mg in the phosphate film. If the Mg content in the film is too small, that is, less than 0.01 mass %, the effect of Mg cannot be brought out. On the other hand, Mg can be hardly incorporated to have a content exceeding 10 mass % in the film. Accordingly, in the case of selectively contacting Mg in the phosphate film, the content thereof is from 0.01 to 10 mass %.

The Mg content in the phosphate film is determined as follows. Similarly to the measurement of the phosphate film thickness, a sample section cut out from the steel product or aluminum material naturally dried after forming the film by phosphate treatment is embedded in a resin, the sample is polished and then determined for the Mg intensity in the phosphate film by fluorescent X-ray, the value is converted into mass %, and measurement results at about 5 different, sites are averaged.

(Interface Reaction Layer)

In the present invention, the area of a portion where the interface reaction layer thickness of the dissimilar material joint product is from 0.5 to 5 µm is $10 \times t_2^{0.5}$ mm$^2$ or more in relation to the sheet thickness $t_2$ of the aluminum material. This area definition of the interface reaction layer having an optimal thickness is to control the interface reaction layer to the optimal range, contrary to the conventional wisdom that the interface reaction layer is preferably thinner (even not present), and the intention thereof is rather directed to aggressively allow the presence of the interface reaction layer. The area definition above is based on the technical idea that for enhancing the bonding strength, an interface reaction layer having an optimal thickness range is formed in a large area, in other words, is allowed to be present in a broad range.

Accordingly, if the area of a portion where the interface reaction layer thickness is from 0.5 to 5 µm is less the $10 \times t_2^{0.5}$ mm$^2$, more strictly less than $50 \times t_2^{0.5}$ mm$^2$, in relation to the sheet thickness $t_2$ of the aluminum material, the interface reaction layer having an optimal thickness range cannot be present in a broad range and the bonding strength rather decreases. In the portion where the thickness of the interface reaction layer is less than 0.5 µm, steel-aluminum diffusion is insufficient and bonding strength decreases. On the other hand, the interface reaction layer becomes more brittle as the thickness is larger, and in particular, the portion where the thickness of the interlace reaction layer exceeds 5 µm is brittle and low in the bonding strength. Accordingly, as the area of such an interface reaction layer increases, the bonding strength of the joint part as a whole decreases.

For this reason, in order to increase the bonding strength of the joint part as a whole, the area of a portion where the thickness of the interface reaction layer is from 0.5 to 5 µm needs to be $10 \times t_2^{0.5}$ mm$^2$ or more, preferably $50 \times t_2^{0.5}$ mm$^2$ or more, in relation to the sheet thickness $t_2$ of the aluminum material.

Incidentally, in the ease of using a dome-type chip generally employed for the electrode chip, the interface reaction layer becomes thickest in the center part, and the thickness of the interface reaction layer decreases with distance from the center. Accordingly, the thickness of the interface layer in the center part may exceed 5 µm. The thickness of the interface reaction layer can be determined by measuring the area of the interface of the steel product-aluminum material joining by means of the image analysis or SEM observation of the aluminum material side at a magnification of 2,000.

(Spot Welding)

Requirements of the spot welding method for obtaining a dissimilar material joint product are described below. FIG. 3 shows one embodiment of the spot welding as a premise for obtaining a dissimilar material joint product. The fundamental embodiment of the spot welding method of the present invention is the same as the embodiment of normal spot welding, in FIG. 3, 11 is a steel sheet, 12 is an aluminum alloy sheet, 13 is a dissimilar material joint product 15 is a nugget and 17 and 18 are electrodes.

In the spot welding method of the present invention, at the time of obtaining the above-described dissimilar material joint product between a steel product having a sheet thickness $t_1$ and an aluminum material having a sheet thickness $t_2$; the spot welding is performed in a state of a Zn or Zn alloy film and a phosphate him being previously provided between a joining surface of the steel product and the aluminum material to be joined together.

(Welding Pressure)

In such spot welding, a welding pressure by electrode chips 17 and 18, with the electrode chip 18 on the aluminum material 12 side having a tip diameter of 7 mm$\phi$ or more, is applied to satisfy the relationship of $(R \times W)^{1/3}/R > 0.05$ between the tip curvature radius R mm and the welding pressure W kN. The welding pressure is preferably larger because the adhesive can be more extruded, but in view of capacity limitation of the spot welding, the welding pressure is practically up to 10 kN.

The contact surface pressure in the point contact is almost proportional to $(R \times W)^{1/3}/R$. If the contact surface pressure imposed on the joint part is excessively small, this allows for remaining of a large amount of the adhesive and the growth of the interface reaction layer is inhibited. Therefore, a contact surface pressure large enough to extrude the adhesive to the outside is necessary. If $(R \times W)^{1/3}/R$ is 0.05 or less, the phosphate film remains as a layer and the interface reaction layer does not grow.

Also, when such a relatively large welding pressure is applied, irrespective of the shape of the electrode chip or the like, electrical contact between dissimilar materials or between the electrode and the material can be stabilized, the molten metal inside the nugget can be supported by the unmelted part in the periphery of the nugget, and the above-described relatively large requisite area of the nugget and the requisite area of the above-described optimal interface reaction layer can be obtained. Furthermore, generation of surface flash can be suppressed. If the welding pressure is too small, these effects cannot be obtained.

(Electrode Chip)

In other to allow an interface reaction layer having a thickness in the above-described optimal range to be formed in a broad range, the electrode chip particularly on the aluminum material side is an R-type chip having a tip diameter of 7 mm$\phi$ or more and a large tip curvature radius R, such as dome type. The electrode chip on the steel product side also preferably has a large curvature radius R, but in view of capacity limitation of the spot welding, the curvature radius R is practically up to 250 mm.

The electrode shape is not specified, but the electrode preferably raises the current efficiency in the early stage of electrification. The polarity is also not specified, but in the case of using a dc spot, it is preferred to assign the anode to aluminum and the cathode to steel.

(Current)

For obtaining the relatively large nugget area and the requisite area of the optimal interface reaction layer, the current needs to be passed with a current pattern having a step of passing a current of $15 \times t_2^{0.5}$ to $30 \times t_2^{0.5}$ kA for $100 \times t_2^{0.5}$ to $1,000 \times t_2^{0.5}$ msec in relation to the sheet thickness $t_2$ of the aluminum material and not having a step of passing a current higher than that in the step above.

By using such a current pattern, a large amount of heat input is obtained when the suppression layer of the present invention is previously formed, and as described above, high bonding strength can be obtained by controlling the interface reaction layer on the joining surface of the steel and the aluminum material. Also, electrical contact between dissimilar materials or between the electrode and the material can be stabilized, the molten metal inside the nugget can be supported by the unmelted part in the periphery of the nugget, and the above-described relatively large requisite area of the nugget and the requisite area of the above-described interface reaction layer can be obtained. Furthermore, generation of surface flash can be suppressed.

In the step above of the current pattern, if the current is less than $15 \times t_2^{0.5}$ kA or the time is less than $100 \times t_2^{0.5}$ msec, the surface treatment layer and the aluminum material are not melted in a broad range and the area of the interface reaction layer having a thickness in the optimal range is small, whereas if the current exceeds $30 \times t_2^{0.5}$ kA or the time exceeds $1,000 \times t_2^{0.5}$ msec, the interface reaction layer grows to a large thickness and the area of the interface reaction layer having a thickness in the optimal range decreases.

The current pattern may have a plurality of the steps in this current range, but it is important that the total time of these steps is in the above-described range of $100 \times t_2^{0.5}$ to $1,000 \times t_2^{0.5}$ msec. In the case of joining of similar metals, almost the same joint, structure is obtained with the same amount of heat input, but in the joining between steel and an aluminum material, the area of the interface reaction layer having a thickness in the optimal range cannot be obtained in a broad range, for example, with a current pattern of more than $30 \times t_2^{0.5}$ kA and less than $100 \times t_2^{0.5}$ msec or with a current pattern of less than $15 \times t_2^{0.5}$ kA and more than $1{,}000 \times t_2^{0.5}$ msec. A different pattern may be added before and after this current condition to create a current pattern in a plurality of stages, but it is necessary that a step of passing a current higher than that in the step above is not present, because the interface reaction layer grows to a large thickness.

In a preferred current pattern, a step of passing a current of $1 \times t_0^{0.5}$ to $10 \times t_2^{0.5}$ kA for $100 \times t_2^{0.5}$ to $1{,}000 \times t_2^{0.5}$ msec is added to thereby suppress cracking of the nugget.

Examples

TABLE 6

(Sheet thickness $t_2$ of aluminum material: 1 mm)

| | Spot Welding Conditions | | | | | | | | Dissimilar material joint product | | | |
|---|---|---|---|---|---|---|---|---|---|---|---|---|
| | Conditions of Electrode Chip | | | | Welding Step 1 | | Welding Step 2 | | Area of Interface | | | |
| Mark | Tip Diameter (mm) | Tip Curvature Radius R (mm) | Welding Pressure W (kN) | $(R \times W)^{1/3}/R$ | Welding Current × $t_2^{0.5}$ (kA) | Welding Time × $t_2^{0.5}$ (msec) | Welding Current × $t_2^{0.5}$ (kA) | Welding Time × $t_2^{0.5}$ (msec) | Reaction Layer with Optimal Thickness × $t_2^{0.5}$ (mm²) | Bonding Strength After Composite Corrosion Test 45 Cycles | 90 Cycles | Remarks |
| A | 5 | 150 | 5 | 0.061 | 25 | 100 | — | — | 0 | X | X | Comparative Example |
| B | 12 | 150 | 2.5 | 0.048 | 25 | 100 | — | — | 0 | X | X | Comparative Example |
| C | 12 | 200 | 3 | 0.042 | 25 | 100 | — | — | 2 | X | X | Comparative Example |
| D | 12 | 150 | 5 | 0.061 | 12 | 1000 | — | — | 3 | X | X | Comparative Example |
| E | 12 | 150 | 5 | 0.061 | 20 | 50 | — | — | 3 | X | X | Comparative Example |
| F | 12 | 150 | 5 | 0.061 | 35 | 200 | — | — | 1 | X | X | Comparative Example |
| G | 12 | 150 | 5 | 0.061 | 18 | 2000 | — | — | 4 | X | X | Comparative Example |
| H | 12 | 150 | 5 | 0.061 | 20 | 200 | 32 | 40 | 5 | X | X | Comparative Example |
| I | 7 | 40 | 5 | 0.061 | 20 | 200 | — | — | 11 | ○ | ○ | Example |
| J | 15 | 75 | 2 | 0.108 | 20 | 200 | 12 | 100 | 17 | ○ | ○ | Example |
| K | 12 | 200 | 4 | 0.089 | 15 | 1000 | — | — | 25 | ○ | ○ | Example |
| L | 12 | 150 | 6 | 0.053 | 15 | 60 | 25 | 60 | 25 | ○ | ○ | Example |
| M | 12 | 150 | 6 | 0.064 | 6 | 400 | 25 | 200 | 30 | ○ | ○ | Example |
| N | 12 | 150 | 6 | 0.064 | 25 | 100 | 6 | 400 | 50 | ◎ | ◎ | Example |
| O | 12 | 150 | 7.5 | 0.069 | 25 | 100 | 9 | 100 | 54 | ◎ | ◎ | Example |
| P | 12 | 200 | 7 | 0.056 | 30 | 100 | 2 | 1000 | 52 | ◎ | ◎ | Example |

TABLE 7

(Sheet thickness $t_2$ of aluminum material: 2 mm)

| | Spot Welding Conditions | | | | | | | | Dissimilar material joint product | | | |
|---|---|---|---|---|---|---|---|---|---|---|---|---|
| | Conditions of Electrode Chip | | | | Welding Step 1 | | Welding Step 2 | | Area of Interface | | | |
| Mark | Tip Diameter (mm) | Tip Curvature Radius R (mm) | Welding Pressure W (kN) | $(R \times W)^{1/3}/R$ | Welding Current × $t_2^{0.5}$ (kA) | Welding Time × $t_2^{0.5}$ (msec) | Welding Current × $t_2^{0.5}$ (kA) | Welding Time × $t_2^{0.5}$ (msec) | Reaction Layer with Optimal Thickness × $t_2^{0.5}$ (mm²) | Bonding Strength After Composite Corrosion Test 45 Cycles | 90 Cycles | Remarks |
| A | 5 | 150 | 5 | 0.061 | 25 | 100 | — | — | 1 | X | X | Comparative Example |

TABLE 7-continued (Sheet thickness $t_2$ of aluminum material: 2 mm)

| | Spot Welding Conditions | | | | | | | | Dissimilar material joint product | | | |
|---|---|---|---|---|---|---|---|---|---|---|---|---|
| | Conditions of Electrode Chip | | | | Welding Step 1 | | Welding Step 2 | | Area of Interface | | | |
| Mark | Tip Diameter (mm) | Tip Curvature Radius R (mm) | Welding Pressure W (kN) | (R × W)$^{1/3}$/R | Welding Current × $t_2^{0.5}$ (kA) | Welding Time × $t_2^{0.5}$ (msec) | Welding Current × $t_2^{0.5}$ (kA) | Welding Time × $t_2^{0.5}$ (msec) | Reaction Layer with Optimal Thickness × $t_2^{0.5}$ (mm$^2$) | Bonding Strength After Composite Corrosion Test | | Remarks |
| | | | | | | | | | | 45 Cycles | 90 Cycles | |
| B | 12 | 150 | 2.5 | 0.048 | 25 | 100 | — | — | 0 | X | X | Comparative Example |
| C | 12 | 200 | 3 | 0.042 | 25 | 100 | — | — | 1 | X | X | Comparative Example |
| D | 12 | 150 | 5 | 0.061 | 12 | 1000 | — | — | 3 | X | X | Comparative Example |
| E | 12 | 150 | 5 | 0.061 | 20 | 50 | — | — | 3 | X | X | Comparative Example |
| F | 12 | 150 | 5 | 0.061 | 35 | 200 | — | — | 6 | X | X | Comparative Example |
| G | 12 | 150 | 5 | 0.061 | 18 | 2000 | — | — | 3 | X | X | Comparative Example |
| H | 12 | 150 | 5 | 0.061 | 20 | 200 | 32 | 40 | 4 | X | X | Comparative Example |
| I | 7 | 40 | 5 | 0.061 | 20 | 200 | — | — | 10 | ○ | ○ | Example |
| J | 15 | 75 | 2 | 0.108 | 20 | 200 | 12 | 100 | 13 | ○ | ○ | Example |
| K | 12 | 200 | 4 | 0.089 | 15 | 1000 | — | — | 18 | ○ | ○ | Example |
| L | 12 | 150 | 6 | 0.053 | 15 | 60 | 25 | 60 | 22 | ○ | ○ | Example |
| M | 12 | 150 | 6 | 0.064 | 6 | 400 | 25 | 200 | 25 | ○ | ○ | Example |
| N | 12 | 150 | 6 | 0.064 | 25 | 100 | 6 | 400 | 36 | ○ | ○ | Example |
| O | 12 | 150 | 7.5 | 0.069 | 25 | 100 | 9 | 100 | 38 | ○ | ○ | Example |
| P | 12 | 200 | 7 | 0.056 | 30 | 100 | 2 | 1000 | 37 | ○ | ○ | Example |

A dissimilar material joint product was produced by overlapping a commercially available high-tension steel sheet of 590 MPa grade as the steel product on a commercially available A6061 (6000-type) aluminum alloy sheet as the aluminum material and spot-welding the stack and evaluated for the bonding strength and corrosion resistance. The results are shown in Tables 6 and 7.

On the joining surface side of the steel sheet above, hot-dip pure Zn plating was previously applied to an average thickness of 10 μm and a phosphate film containing 1.0 mass % of Mg was further applied thereon to an average thickness of 2 μm.

The results when the sheet thickness of the aluminum sheet is 1 mm are shown in Table 6, and the results when the sheet thickness of the aluminum sheet is 2 mm are shown in Table 7. In Tables 6 and 7, dissimilar material joint products were produced by variously changing the electrode conditions or current conditions in the spot welding but setting constant the plating conditions and phosphate film conditions on the joining surface side of the steel sheet.

TABLE 8

| | Metal Film (Plating Film) | | | | Phosphate Film | | | Dissimilar material joint product | | | |
|---|---|---|---|---|---|---|---|---|---|---|---|
| Mark | Kind and Composition of Plating | Plating Method | Material to be Applied with Plating Film | Thickness of Plating Film (μm) | Melting Point of Plating (° C.) | Material to be Applied with Phosphate Film | Film Thickness (μm) | Mg Content (mass %) | Area of Interface Reaction Layer with Optimal Thickness × $t_2^{0.5}$ (mm$^2$) | Bonding Strength After Composite Corrosion Test | | Remarks |
| | | | | | | | | | | 45 Cycles | 90 Cycles | |
| 1 | — | — | — | — | — | — | — | — | 42 | Δ | X | Comparative Example |
| 2 | — | — | — product | — | — | steel | 2 | 1.0 | 35 | Δ | Δ | Comparative Example |

TABLE 8-continued

| | Metal Film (Plating Film) | | | | Phosphate Film | | | Dissimilar material joint product | | | |
|---|---|---|---|---|---|---|---|---|---|---|---|
| Mark | Kind and Composition of Plating | Plating Method | Material to be Applied with Plating Film | Thickness of Plating Film (µm) | Melting Point of Plating (°C.) | Material to be Applied with Phosphate Film | Film Thickness (µm) | Mg Content (mass %) | Area of Interface Reaction Layer with Optimal Thickness × $t_2^{0.5}$ (mm²) | Bonding Strength After Composite Corrosion Test 45 Cycles | 90 Cycles | Remarks |
| 3 | pure Ni | electroplating | steel product | 10 | 1450 | steel product | 2 | 1.0 | 0 | X | X | Comparative Example |
| 4 | Zn—10% Ni | electroplating | steel product | 10 | 1050 | steel product | 2 | 1.0 | 0 | X | X | Comparative Example |
| 5 | pure Zn | electroplating | steel product | 10 | 420 | aluminum | 1 | 1.0 | 50 | ◎ | ◎ | Example |
| 6 | pure Zn | electroplating | aluminum | 10 | 420 | aluminum | 1 | 1.0 | 52 | ◎ | ◎ | Example |
| 7 | Al—10% Si | hot-dip | steel product | 10 | 650 | steel product | 2 | 1.0 | 45 | Δ | X | Comparative Example |
| 8 | pure Zn | hot-dip | steel product | 10 | 420 | — | — | — | 51 | ○ | Δ | Comparative Example |
| 9 | pure Zn | hot-dip | steel product | 10 | 420 | steel product | 2 | 1.0 | 50 | ◎ | ◎ | Example |
| 10 | Zn—5% Fe | hot-dip | steel product | 10 | 550 | steel product | 2 | 1.0 | 38 | ○ | ○ | Example |
| 11 | Zn—10% Fe | hot-dip | steel product | 10 | 850 | steel product | 2 | 1.0 | 35 | ○ | ○ | Example |
| 12 | Zn—12% Fe | hot-dip | steel product | 10 | 950 | — | — | — | 18 | Δ | Δ | Comparative Example |
| 13 | Zn—12% Fe | hot-dip | steel product | 10 | 950 | steel product | 2 | 1.0 | 19 | ○ | ○ | Example |
| 14 | Zn—16% Fe | hot-dip | steel product | 10 | 1050 | steel product | 2 | 1.0 | 0 | X | X | Comparative Example |
| 15 | pure Zn | hot-dip | steel product | 1 | 420 | steel product | 2 | 1.0 | 15 | Δ | X | Comparative Example |
| 16 | pure Zn | hot-dip | steel product | 3 | 420 | steel product | 2 | 1.0 | 48 | ○ | ○ | Example |
| 17 | pure Zn | hot-dip | steel product | 15 | 420 | steel product | 2 | 1.0 | 56 | ◎ | ◎ | Example |
| 18 | pure Zn | hot-dip | steel product | 19 | 420 | steel product | 2 | 1.0 | 45 | ○ | ○ | Example |
| 19 | pure Zn | hot-dip | steel product | 20 | 420 | steel product | 2 | 1.0 | 5 | Δ | Δ | Comparative Example |
| 20 | pure Zn | hot-dip | steel product | 10 | 420 | steel product | 0.05 | 1.0 | 52 | ○ | Δ | Comparative Example |
| 21 | pure Zn | hot-dip | steel product | 10 | 420 | steel product | 0.1 | 1.0 | 50 | ◎ | ○ | Example |
| 22 | pure Zn | hot-dip | steel product | 10 | 420 | steel product | 5 | 1.0 | 46 | ◎ | ◎ | Example |
| 23 | pure Zn | hot-dip | steel product | 10 | 420 | steel product | 7 | 1.0 | 16 | Δ | Δ | Comparative Example |
| 24 | pure Zn | hot-dip | steel product | 10 | 420 | steel product | 2 | 0.005 | 50 | ○ | ○ | Example |
| 25 | pure Zn | hot-dip | steel product | 10 | 420 | steel product | 2 | 0.01 | 52 | ◎ | ○ | Example |
| 26 | pure Zn | hot-dip | steel product | 10 | 420 | steel product | 2 | 0.1 | 53 | ◎ | ◎ | Example |
| 27 | pure Zn | hot-dip | steel product | 10 | 420 | steel product | 2 | 7.7 | 50 | ◎ | ◎ | Example |

The results when dissimilar material joint products between a steel sheet and an aluminum sheet were produced by variously changing the plating conditions or phosphate film conditions on the joining surface side of the steel sheet or aluminum alloy sheet hut setting constant the electrode conditions and current conditions in the spot welding are also shown in Table 8.

(Materials Used)

As for the materials, a high-tension steel sheet having a sheet thickness of 1 mm and having a composition containing 0.07 mass % C-1.8 mass % Mn and A6061 aluminum alloy sheets having a sheet thickness of 1 mm and 2 mm were prepared. The steel sheet and the aluminum alloy sheet both were worked into a cross tensile test specimen shape described in JTS A 3137 and then spot-welded.

(Zn or Zn Alloy Film: Plating Film)

In the case of applying electroplating to the steel product, various electroplatings were performed in common after subjecting the steel product to a pretreatment including pickling and activation with 10% sulfuric acid for 5 minutes. In Zn electroplating, pure Zn plating was applied to a thickness of 10 μm by passing a current of 20 A/dm$^2$ in a bath where sulfuric acid was added to 400 g/l of zinc sulfate, 30 g/l of aluminum sulfate, 15 g/l of sodium chloride and 30 g/l of boric acid and the pH was thereby adjusted to 3. In the case of Zn-10 mass % Ni alloy plating, a current of 10 A/dm$^2$ was passed in a bath prepared by adding nickel sulfate and nickel chloride to the galvanization bath in the pure Zn plating above, whereby Zn-10 mass % Ni plating was applied to a thickness of 10 μm. Also, pure Ni plating of Comparative Examples was applied to a thickness of 10 μm by passing a current of 10 A/dm$^2$ in a Watt bath.

Hot-dip plating was applied only to the steel product, and Zn plating and Zn—Fe plating (Fe amount: 5, 10, 12 and 16 mass %) each was applied to a thickness of 10 μm by using various molten metals. In the hot-dip Zn plating, the film thickness was adjusted to 1, 3, 10, 15, 19 or 20 μm by changing the temperature and the withdrawal temperature. As Comparative Examples, hot-dip Al-10% Si alloy plating was applied to the steel product.

In the case of applying plating to the aluminum material, the aluminum material was subjected to pickling with 10% nitric acid for 30 seconds and then to zinc displacement or electroplating for 30 seconds in a treating solution containing 500 g/l sodium hydroxide, 100 g/l of zinc oxide, 1 g/l of ferric chloride and 10 g/l of Rochelle salt. Also, a current of 10 A/dm$^2$ was passed in a bath prepared by adding nickel sulfate and nickel chloride to the galvanization bath above, whereby Zn-10% Ni plating was applied to a thickness of 10 μm.

The thickness of the plating film was determined as follows. The sample naturally dried after plating was, as described above, cut and embedded in a resin, the cut surface was polished, and the joint interface before spot welding was observed through SEM. In the SEM observation, the thickness was measured at three points in a visual held at a magnification of 2,000, and the observation results at about 5 different sites were averaged.

(Phosphate Film)

The phosphate film was formed by dipping the steel product or aluminum material in an aqueous solution at 40° C. having concentrations of 1 g/l of Zn ion, 15 g/l of phosphate ion, 2 g/l of Ni ion, 0.2 g/l of F ion and from 0 to 30 g/l of Mg ion. The Mg content in the phosphate film was adjusted by the Mg ion amount in the aqueous solution above, and the thickness of the phosphate film was adjusted by varying the dipping time in a range of 3 to 300 seconds.

The average thickness of the phosphate film was determined as follows. The sample naturally dried alter phosphate treatment was, as described above, cut and embedded in a resin, the sample was polished and observed in the sheet thickness direction of the phosphate film section (interface) before spot welding; through SEM in a visual field at a magnification of 2,000, the thickness was measured at three points, and the observation results at about 5 different sites were averaged.

As for the Mg content in the phosphate film, the polished sample above for the measurement of the average thickness of the phosphate film was analyzed by fluorescent X-ray to determine the Mg intensity in the phosphate film, the value was converted into mass %, and measurement results at about 5 different sites were averaged.

(Spot Welding)

A dc resistance welding tester was used for the spot welding. Dome-type chips each composed of Cu—Cr alloy were used and connected to aluminum as the anode and to steel as the cathode. In Tables 6 and 7, dissimilar material joint product samples for a cross tensile test were produced by performing welding under the electrode chip conditions [tip diameter, tip curvature radius R, welding pressure W and (R×W)$^{1/3}$/R] and current pattern [welding current and welding time in welding steps 1 and 2] shown in Tables 6 and 7.

At this time, in Examples of the Invention in Tables 6 and 7, the spot welding was performed by a current pattern having a step of applying a welding pressure by electrode chips, with the electrode chip on the aluminum material side having a tip diameter of 7 mmφ or more, to satisfy the relationship of (R×W)$^{1/3}$/R between the tip curvature radius R mm and the welding pressure W kN while passing a current of $15\times t_2^{0.5}$ to $30\times t_2^{0.5}$ kA for $100\times t_2^{0.5}$ to $1,000\times t_2^{0.5}$ msec. In this test, electrode clips having the same shape were used for the steel side and the aluminum material side.

In Table 8, in common among Examples, samples for the cross tensile test were produced by performing the welding under the spot welding conditions shown by N as Example of the Invention in Table 6 and setting the conditions constant.

With respect to each of these conditions, 10 units for the evaluation of bonding strength, and 3 units for the evaluation of joint interface were produced.

(Measurement of Thickness of Interface Reaction Layer)

The sample after spot welding was cut at the joint part center and embedded in a resin and after polishing, the thickness of the interface reaction layer was measured by SEM observation. The thickness was measured in a visual field at a magnification of 2,000 when the layer thickness was 1 μm or more and in a visual field at a magnification of 10,000 when it was less than 1 μm. The interface reaction layer as used herein indicates a compound layer containing both Fe and Al, and this is a layer where the amounts of both Fe and Al detected by EDX are 1 wt % or more. That is, a layer where both Fe and Al are not detected in an amount of 1 wt % or more is regarded as a plating layer or a residual adhesive and is not included in the interface reaction layer.

Incidentally, in this test, the interface reaction layer was thickest in the center part and as closer to the edge part (peripheral part), the interface reaction layer became thinner. Therefore, the diameter of the interface reaction layer having a thickness exceeding 10 μm and the diameter of the interface reaction layer having a thickness of 0.5 μm or more were determined and converted into areas. The measurement was performed for 3 units of the joint product, and nugget diameters in two orthogonal directions were measured and averaged.

(Evaluation of Dissimilar Metal Contact Corrosion)

Dissimilar material joint products obtained by joining under various conditions were subjected to coating and then to a test for the evaluation of dissimilar metal contact corrosion. A specimen sampled from each dissimilar material joint product was alkali-degreased and after water washing, subjected to a surface conditioning treatment for 30 seconds by using a 0.1% aqueous solution of Surffine 5N-10 produced by Nippon Paint Co., Ltd. Subsequently, each dissimilar material joint product was treated with zinc phosphate for 2 minutes in a bath at 50° C. containing 1.0 g/l of zinc ion, 1.0 g/l of nickel ion, 0.8 g/l of manganese ion, 15.0 g/l of phosphate ion, 6.0 g/l of nitrate ion and 0.12 g/l of nitrite ion and having a toner value of 2.5 pt, a total acid degree of 22 pt and a free acid degree of 0.3 to 0.5 pt. These joint products each was then coated with a cationic electrodeposition coating material (Powertop V50, gray, produced by Nippon Paint Co., Ltd.) and baked at 170° C. for 25 minutes to form a 30 μm-thick coating film.

Thereafter, a composite corrosion test of these coated dissimilar material joint product specimens was performed to evaluate the property of preventing the dissimilar metal contact corrosion. In the corrosion test the test was performed for a predetermined number of cycles, where one cycle includes A: salt spray (35° C., 5% NaCl) for 2 hours, B: drying (60° C., 20 to 30% RH) for 4 hours, and C: wetting (50° C., 95% RH) for 2 hours. 5 Units of the coated dissimilar material joint product specimens were tested for 45 cycles, and another 5 units of the coated dissimilar material joint product specimen were tested for 90 cycles.

(Evaluation of Bonding Strength)

In the evaluation of the bonding strength of the coated dissimilar material joint product specimen, for measuring the strength of spot welding after the composite corrosion test above, 5 units after each of the composite corrosion tests for 45 cycles and 90 cycles were subjected to a cross tensile test, and the values obtained were averaged.

As a result of the cross tensile test, the sample was rated ⊚ when the bonding strength was 1.5 kN or more or the rupture mode was the aluminum base material rupture, rated ○ when the bonding strength was from 0.8 to 1.0 kN, rated Δ when the bonding strength was from 0.5 to 0.8 kN, and rated x when the bonding strength was less than 0.5 kN. Here, unless the bonding strength is 0.8 kN (○) or more, the dissimilar material joint product cannot be used as a material for structures such as automobile.

(Results in Tables 6 and 7)

As seen from Tables 6 and 7, in the dissimilar material joint products of I to P as Examples of the invention, which were, obtained by spot welding in the suitable range, very high corrosion resistance was obtained and fee spot welding strength after the composite corrosion test was high. This was yielded by virtue of the effects of the hot-dip galvanization and phosphate film provided between joining surfaces.

On the other hand, in Comparative Examples A to H where the spot welding conditions were out of the suitable range, the original bonding strength at the spot welding was low and therefore, the bonding strength after the composite corrosion test was also low. In Comparative Examples A to C, the spot welding conditions were out of the suitable range, for example, the welding pressure in relation to the tip curvature diameter was low. In Comparative Examples D to H, the suitable range of the present invention for the current conditions was also not satisfied.

Except for Comparative Example H where the welding step 2 was performed, in Comparative Examples A to G, the spot welding was effected only by the welding step 1 without performing the welding step 2. Out of these Comparative Examples, in Comparative Example A, the tip diameter of the electrode chip was too small, and in Comparative Examples B and C, the welding pressure in relation to the tip curvature radius was too low.

In Comparative Example D, the welding, current in the welding step 1 was too low in relation to the sheet thickness of the aluminum material, and in Comparative Example E, the welding time in the welding step 1 was too short in relation to the sheet thickness of the aluminum material. Furthermore, in Comparative Example F, the welding current hi the welding step 1 is too high in relation to the sheet thickness of the aluminum material; in Comparative Example G, the welding time in the welding step 1 was too long in relation to the sheet thickness of the aluminum material; and in Comparative Example H, a welding step 2 of passing a current significantly higher man mat in the welding step 1 was present.

That is, in Examples I to P of the Invention, the spot welding was performed by the preferred welding step 1 of applying a welding pressure by electrode chips, with the electrode chip on the aluminum material side having a tip diameter of 7 mmφ or more, to satisfy the relationship of $(R \times W)^{1/3}/R > 0.05$ between the tip curvature radius R mm and the welding pressure W kN while passing a current of $15 \times t_2^{0.5}$ to $30 \times t_2^{0.5}$ kA for $100 \times t_2^{0.5}$ to $1,000 \times t_2^{0.5}$ msec. In Examples I and K of the invention, the spot welding was effected only by this welding step 1 without performing the welding step 2. Therefore, in each of Examples of the Invention, the interface reaction layer having an optimal thickness could be controlled and the bonding strength was high.

Out of these Examples of the Invention, in Examples N, O and P of the Invention where the spot welding was performed by a current pattern having the above-described welding step 1 and not having a step of passing a current higher than that in the welding step 1, combined with a welding step 2 performed later under preferred conditions of passing a current of $1 \times t_2^{0.5}$ to $10 \times t_2^{0.5}$ kA for $100 \times t_2^{0.5}$ to $1,000 \times t_2^{0.5}$ msec, the bonding strength was highest.

On the other hand, in Example L of the Invention where the spot welding was performed by a current pattern having a welding step 2 of passing a current higher than that in the welding step 1, the bonding strength was lower than in Examples N, O and P of the Invention.

(Results of Table 8)

As seen from Table 8, in Comparative Examples 1 and 2 where plating was not applied and in Comparative Examples 1, 8 and 12 where the phosphate film was not provided, an interface reaction layer having an optimal thickness was formed at the spot welding, nevertheless, the corrosion resistance was poor and therefore, the bonding strength after the composite corrosion test was low.

In Comparative Examples 3, 4 and 14 where the metal film conditions (kind and melting point) were out of the range, an interface reaction layer having an optimal strength was scarcely formed. Accordingly, the original bonding strength at the spot welding was low and in turn, the bonding strength after the composite corrosion test was low.

In Comparative Example 7 where Al-10% Si alloy plating but not a Zn or Zn alloy film was applied, an interface reaction layer having an appropriate thickness was formed, nevertheless, the corrosion resistance was poor and therefore, the bonding strength after the composite corrosion test was low.

Furthermore, even if the film was a Zn or Zn alloy film, in Comparative Example 15 where the plating thickness was too small and in Comparative Example 19 where the plating thickness was too large, an interface reaction layer having an optimal thickness was not formed, despite pure zinc plating. Accordingly, the original bonding strength at the spot welding was low and in turn, the bonding strength alter the composite corrosion test was low. Accordingly, the original bonding strength at the spot welding was low and in turn, the bonding strength after the composite corrosion test was low.

Also, ever if a Zn alloy film was provided, in Comparative Example 20 where the phosphate film was too thin, the corrosion resistance was poor and therefore, the bonding strength after the composite corrosion test was low, though an interface reaction layer having an optimal thickness was formed at the spot welding. On the contrary, in Comparative Example 23 where the phosphate film was too thick, an interface reaction, layer having an optimal thickness was not formed. Accordingly, the original bonding strength at the spot welding was low and in turn, the bonding strength after the composite corrosion test was low.

On the other hand, in Examples 5, 6, 9 to 11, 13, 16 to 18, 21, 22 and 24 to 27 of the Invention where a phosphate film was provided and the plating conditions (melting point, components) were within the range, it is seen that the interface reaction layer having air optimal thickness was suppressed and by virtue of very high corrosion resistance, the spot welding strength after the composite corrosion test was high. This was brought about by the effects of the hot-dip galvanization and phosphate film provided between joining surfaces.

In particular, out of Examples of the Invention where pure zinc plating was applied, in Examples 5, 6,9, 17, 21 and 24 to 27, it is seen that the area of the interface reaction layer having an optimal thickness could be controlled to a very large area of $50 \times t_t^{0.5}$ mm$^2$ or more. Furthermore, in Examples 5, 6, 9, 17, 22, 26 and 27 where the thickness of pure zinc plating film was from 5 to 15 μm and the phosphate film has an Mg content of 0.1 mass % or more and a thickness of 1 μm or more, it is seen that the corrosion resistance was very high and therefore, the spot welding strength after the composite corrosion test was high. These results reveal that by the control to the components, melting point and film thickness of the present invention, the interface reaction layer having an optimal thickness can be controlled and high bonding strength and high corrosion resistance are obtained.

The results in Examples above clarify the critical meaning of each requirement specified in the present invention to enable increasing the bonding strength of a dissimilar material joint product and suppressing the contact corrosion and reduction in the bonding strength due to the contact corrosion.

[4]
(Dissimilar Material Joint Product)

Figure 4:
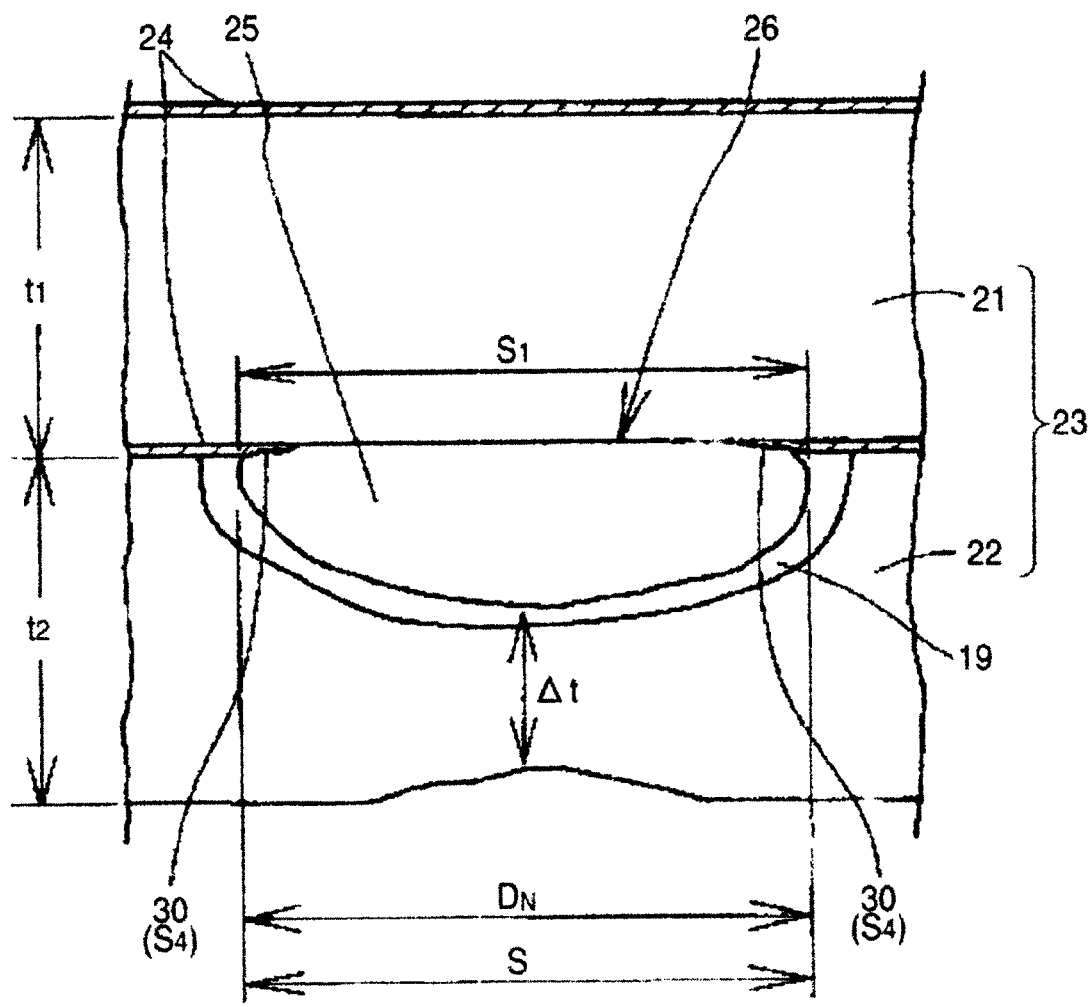
FIG. 4 is a cross-sectional view showing the joint part interface of the dissimilar material joint product of the present invention.

FIG. 4 shows a cross-sectional view of the dissimilar material joint product (joint part) specified in one embodiment of the present invention. In FIG. 4, 23 is a dissimilar material joint product obtained by joining a galvanized steel product (galvanized steel sheet) 21 and an aluminum, material (aluminum alloy sheet) 22 together by spot welding, and 24 is a galvanization film or oxide film on the steel product 21 surface.

In the joint part center, 25 is a nugget having a joint interface (interface reaction layer) 26 formed in the spot welding, where the nugget has a nugget diameter shown by an arrow in the horizontal direction in the Figure. This nugget 25 also has an area denoted by S (hereafter simply referred as a nugget area S), which occupies in the plane direction (right/left direction in the Figure) at the joint interface on the aluminum material side.

In the Figure, $t_1$ denotes the sheet thickness of the galvanized steel product 21, $t_2$ denotes the sheet thickness of the aluminum material 22, Δt denotes the minimum residual sheet thickness of the aluminum material after joining by spot welding, and 29 is a corona bond part in the periphery of the nugget.

FIG. 4 shows a joint state where the minimum residual sheet thickness is maintained by suppressing the generation of surface flash while ensuring the nugget diameter and the melting of the steel product is minimized. The joint product of the present invention enters such, a joint state as in this Figure.

The reasons of limitation and the actions in each requirement of the present invention are described below.
(Sheet Thickness of Galvanized Steel Product)

In the present invention, the sheet thickness $t_1$ of the galvanized steel product to be joined needs to be a relatively large sheet thickness selected from the range of 0.3 to 3.0 mm according to the sheet thickness on the aluminum material side. When rite sheet thickness of a single steel product is made large or the sheet thickness on the steel product 21 side is made large, for example, by directly laminating overlapping steel products to each other, the heat input due to resistance heating of the steel product increases without increasing the current value or electrification time in the spot welding conditions. Furthermore, the heat input distribution in the radius direction of the nugget changes and by a composite effect of these, the temperature on the nugget end side is also liable to rise while preventing decrease in the residual sheet thickness Δt of the aluminum material 22. Therefore., the Zn layer 30 deriving from galvanization at the joint interface (corona bond part) 29 in contact with the nugget 25 is effectively melted and discharged. As a result, production of a peculiar brittle Zn—Fe-based compound layer deriving from galvanization is suppressed and the proportion of the remaining Zn layer 30 decreases. Consequently, the direct joining region, between the steel product 21 and the aluminum material 22 is increased and the bonding strength is intensified.

If the sheet thickness $t_1$ of the steel product is less than 0.3 mm, the strength or rigidity required of the above-described structural member or structural material cannot be ensured and this is improper. In addition, great deformation of the steel product occurs due to pressure applied during spot welding and this causes easy breaking of the oxide film and in turn, accelerates the reaction with aluminum, as a result, an intermetallic compound is readily formed. On the other hand, if it exceeds 3.0 mm, other joining means are employed for the structural member or structural material and joining by spot welding is less needed. Accordingly, it is not necessary that the sheet thickness $t_1$ of the steel product is large over 3.0 mm.
(Sheet Thickness Ratio Between Steel Product, and Aluminum Material)

Here, in order to more increase the bonding strength, in FIG. 4, the sheet thickness ratio $t_1/t_2$ of the steel product 21 to the aluminum material 22 is preferably 1 or more. When the sheet thickness on the steel product 21 side is made large, the heat input due to resistance heating of the steel product increases without increasing the amount of heat input in the spot welding conditions. Furthermore, the heat input distribution in the radius direction of the nugget changes and as a described above, by virtue of a composite effect of these, the direct joining region between the steel product 21 and the aluminum material 22 is increased, whereby it is ensured that the total area $S_4$ of the Zn layer 30 in the joint interface part in contact with the nugget 25 is 30% or less of the area S of the nugget 25. As a result, the bonding strength can be increased.

If, in FIG. 4, the sheet thickness ratio $t_1/t_2$ of the steel product 21 to the aluminum material 22 is less than 1, the amount of heat input in the spot welding conditions needs to be increased to reduce the proportion of the residual Zn layer 30 and increase the direct joining region between the steel product 21 and the aluminum material 22, but even if the proportion of the residual Zn layer 30 can be thereby reduced, decrease in the residual sheet thickness Δt of the aluminum material cannot be prevented, as a result, the residual sheet thickness Δt of the aluminum material seriously decreases and in turn, the bonding strength decreases.

In this respect, the minimum residual sheet thickness Δt of the aluminum material in the dissimilar material joint part is preferably 50% or more of the original sheet thickness $t_2$ of the aluminum material.

(Galvanized Steel Product)

In the present invention, a two-side or one-side galvanized steel product where the average thickness of the galvanization layer is from 3 to 19 μm is employed for the joint product. In the case of a one-side galvanized steel product, a non-galvanized surface may be partially present on the side to be joined by spot welding. The present invention excludes a steel product where the thickness of the galvanization layer is less than the range above or a galvanization layer is not present.

(Galvanization Layer)

The galvanization layer itself of the steel product may be formed by hot-dip plating or electroplating and may be formed by plating of zinc or an alloy with iron. However, the thickness of the galvanization layer is from 3 to 19 μm. If the average thickness of the galvanization layer is less than 3 μm, the effect by the galvanization layer itself, such as corrosion prevention, cannot be exerted and the galvanized steel product does not make much difference from a bare steel product, which is meaningless. On the other hand, if the average thickness of the galvanization layer exceeds 19 μm, the production of a brittle Zn—Fe-based compound layer or Zn layer deriving driving from galvanization cannot be suppressed and the area of such a layer cannot be restrained to the range specified in the present invention, as a result, the bonding strength becomes weak.

(Tensile Strength of Steel Product)

In the present invention, the shape and material of the steel product used are not particularly limited, and an appropriate shape and an appropriate, material, used for general purposes in a structural member or selected from those used for a structural member, such as steel sheet, steel shaped product and steel pipe, may be employed. However, in the case where a high-strength steel product for a structural member is required, the steel product is preferably a high-tension steel product having a tensile strength of 400 MPa or more.

A low-strength steel is generally a low-alloy steel in many cases and since the oxide film is almost composed of iron oxide, Fe and Al are caused to readily diffuse and a brittle intermetallic compound is liable to be formed. For this reason, the tensile strength is preferably 400 MPa or more, more preferably 500 MPa or more.

In the present invention, the steel product is not limited in its components, but in order to obtain the above-described strength, the steel product is preferably a high-tension steel (high-tension). As regards the components of steel, for elevating the quenching property and bringing about precipitation hardening, steel selectively containing Cr, Mo, Nb, V, Ti and the like in addition to C may also be applied. The elements Cr, Mo and Nb elevate the quenching property and thereby enhance the strength, and V and Ti enhance the strength by precipitation hardening. However, addition of such an element in a large amount gives rise to reduction in the toughness in the periphery of the welded part and causes easy occurrence of nugget cracking.

Accordingly, as the steel component it is preferred to fundamentally contain, in mass %, C: 0.05 to 0.5%, Mn: 0.1 to 2.5% and Si: 0.001 to 1.5% and if desired, further selectively contain one member or two or more members of Cr: 0 to 1%, Mo: 0 to 0.4%, Nb: 0 to 0.1%, V: 0 to 0.1% and Ti: 0 to 0.1%. The balancing composition of the steel product is preferably composed of Fe and inevitable impurities.

(Aluminum Material)

The aluminum material for use in the present invention is not particularly limited in its alloy type or shape, and according to the properties required of each structural member, a general-purpose aluminum material such as sheet material, shaped material, forged material or cast material is appropriately selected. However, similarly to the steel product, the aluminum material preferably has high strength so as to suppress the deformation due to pressure applied at the spot welding. In this respect, out of aluminum alloys, A5000-type and A6000-type alloys having high strength and being used for general purposes as such a kind of a structural member are best.

The sheet thickness $t_2$ of the aluminum material for use in the present invention is from 0.5 to 4.0 mm. If the sheet thickness $t_2$ of the aluminum material is less than 0.5 mm, the strength as a structural material is disadvantageously insufficient, a sufficiently large nugget diameter is not obtained, the melt readily reaches the aluminum material surface to cause surface flash, and in turn, high, bonding strength is not obtained. On the other hand, if the sheet thickness $t_2$ of the aluminum material exceeds 4.0 mm, as in the case of the above-described sheet thickness of the steel product, other joining means are employed for the structural member or structural material and joining by spot welding is less needed. Accordingly, it is not necessary that the sheet thickness $t_2$ of the aluminum material is large over 4.0 mm.

(Compound in Interface Reaction Layer)

On the premise of a dissimilar material joint product between these steel product and aluminum material, in the present invention, the intermetallic compound in the dissimilar material joint product (at the joint interface 26 of FIG. 4) after spot welding is specified.

Figure 5:
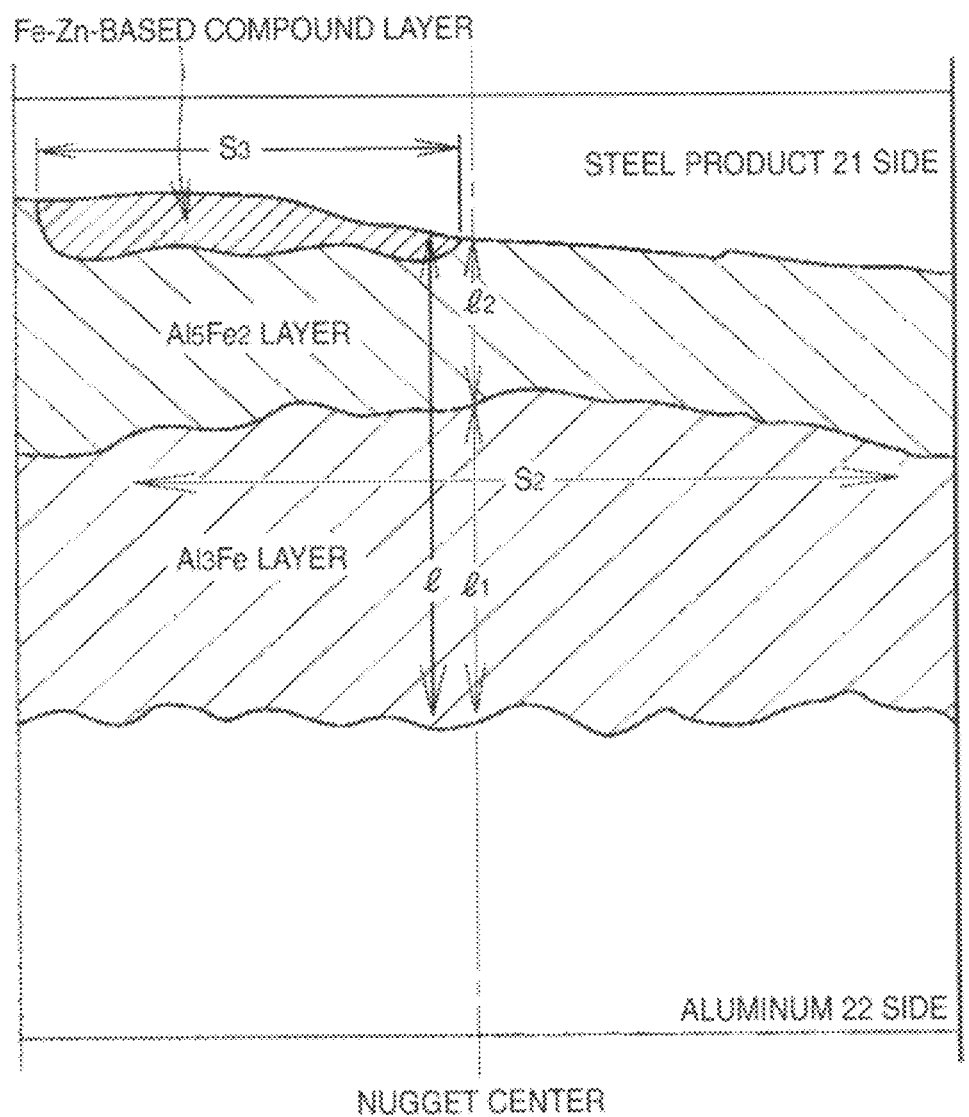
FIG. 5 is an explanatory view schematically showing an enlarged cross-sectional texture (FIG. 6) in the joint part interface of the dissimilar material joint product of the present invention.
Figure 6:
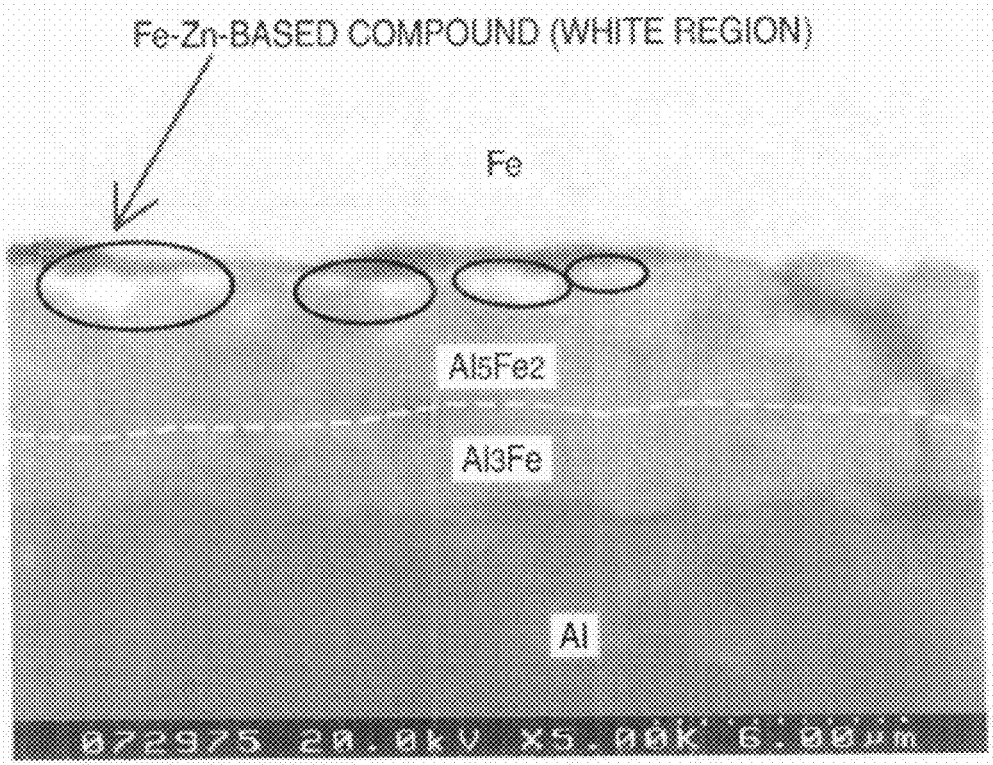
FIG. 6 is a drawing-substituting SEM photograph showing the cross-sectional texture in the joint part interface of the dissimilar material joint product of the present invention.
Figure 7:
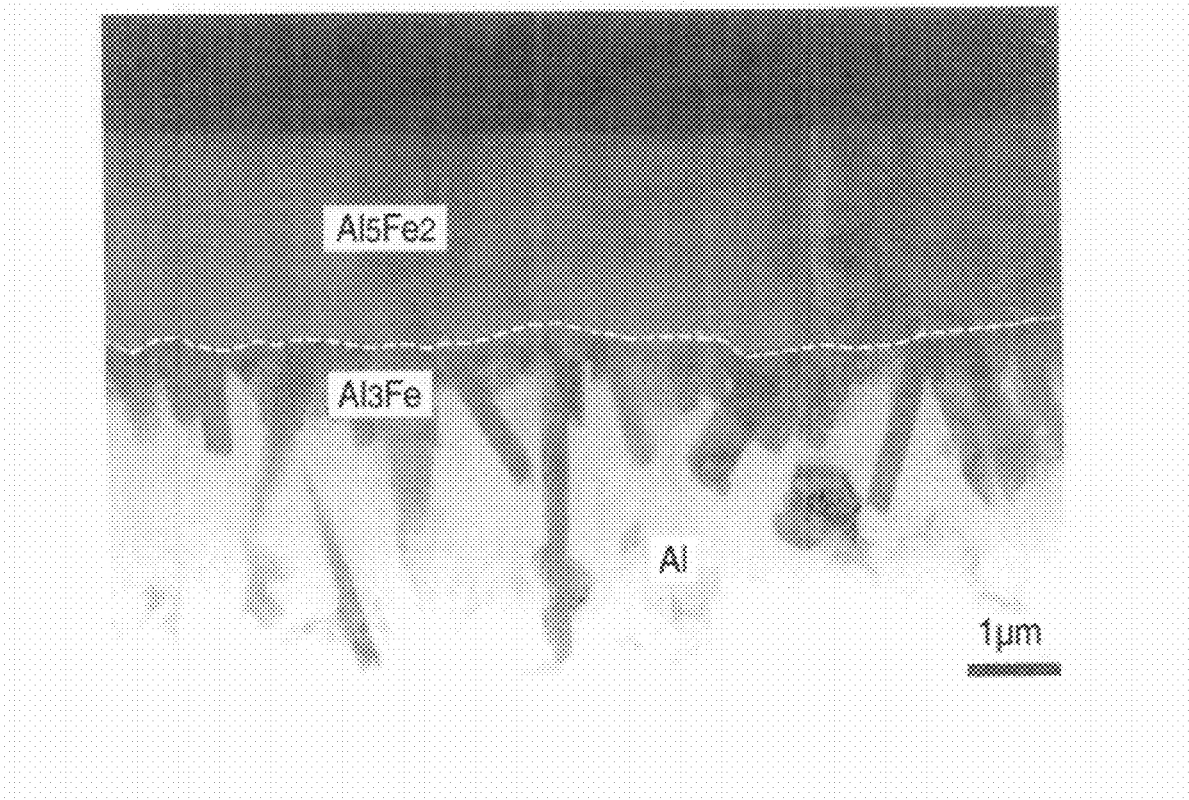
FIG. 7 is a drawing-substituting TEM photograph showing the cross-sectional texture in the joint part interface of the dissimilar material joint product of the present invention.

The intermetallic compound specified in the present invention is described below by referring to FIGS. 5, 6 and 7 each showing the cross-section of the joint interface 4 in the nugget center in the joint part of the dissimilar material joint product. FIG. 5 is a schematized view of the SEM photograph at a magnification of 5,000 of the joint interface 26 in FIG. 6. Incidentally, FIG. 7 is a TEM photograph of the same joint interface 26 at a magnification of 5,000. FIGS. 6 and 7 each shows the dissimilar material joint product of Example 8 of the Invention.

As shown in these Figures, the joint interface 26 has a layered $Al_5Fe_2$-based compound layer on the steel product side and a wedge-shaped (or bar- or needle-like) $Al_3Fe$-based compound layer on the aluminum material side.

(Compound Layer Definition of the Invention)

Describing based on FIGS. 4 and 5, the gist of the compound layer definition in the present invention is to have (produce) an $Al_5Fe_2$-based compound layer on the steel product 21 side and an $Al_3Fe$-based compound layer on the aluminum material 22 side at the joint interface 26 of the dissimilar material joint product 23 having the above-described premise conditions such, as galvanization layer and sheet thickness.

(Thickness of Compound Layer)

In FIG. 5, the total average thickness l in the nugget depth direction (the joint interface cross-sectional direction; the up/down direction in the Figure) of these two compounds layers at the joint interface is a total of the average thickness $l_2$ in the nugget depth direction at respective measuring points of the $Al_5Fe_2$-based compound layer on the steel product 21 side and the average thickness $l_1$ in the nugget depth direction at respective measuring points of the $Al_3Fe$-based compound layer on the aluminum material 22 side.

(Area Definition of Compound Layer Portion—Plane Direction)

First, the nugget area in the plate direction and the area definition of the compound layer portion having a given thickness at the joint interface, which are employed in the present invention, are described by referring to FIG. 4. As shown in FIG. 4, the total area occupied in the plane direction at the joint interface on the aluminum material 22 side by the compound layer portion where the total thickness l ($l_1+l_2$) of the $Al_5Fe_2$-based compound layer on the steel product 21 side and the $Al_3Fe$-based compound layer on the aluminum material 22 side is from 0.5 to 10 μm is defined as $S_1$ ($mm^2$). As shown later in FIGS. 9 and 10, assuming that the nugget area occupied in the plane direction by the nugget 25 at the joint interface on the aluminum material 22 side is S ($mm^2$), the area ratio of the total area $S_1$ occupied in the plane direction by the above-described joint interface compound layer portion having a given thickness at the joint interface on the aluminum material 22 side to the nugget area S is determined. In the present invention, this total area $S_1$ is defined to account for 50% or more of the nugget area S.

(Area Definition of Compound Layer Portion—Cross-Sectional Direction)

Next, the area definition in the cross-sectional direction of particularly a Zn—Fe-based compound layer, which is employed in the present invention, is described by referring to FIGS. 5 and 7. FIGS. 5 and 7 each partially shows the sectional observation results of the joint interface portion where the total average thickness l of the $Al_5Fe_2$-based compound layer and the $Al_3Fe$-based compound layer is from 0.5 to 10 μm by SEM at a magnification of 5,000.

Here, the total area occupied in the cross-sectional direction by the Zn—Fe-based compound layer contained (produced) in each of these two layers, that is, $Al_5Fe_2$-based compound layer and $Al_3Fe$-based compound layer, is denoted by $S_3$ ($μm^2$). Also, the area occupied in the cross-sectional direction by the compound layer portion where the total average thickness of these two layers is from 0.5 to 10 μm is denoted by $S_2$ ($μm^2$). In the present invention, the total area $S_3$ of the Zn—Fe-based compound layer is defined to account for 10% or less of the area $S_2+S_3$ occupied in the cross-sectional direction by the specific thickness portions of these three compound layers.

(Zn Layer)

The Zn layer is described below. The Zn layer is a residual portion of the galvanization layer on the steel product surface. Therefore, when the Zn layer remains, as shown in FIG. 4, this layer is present at the joint interface 26 in the edge part (peripheral part) of the nugget. This Zn layer has a thickness equal to or smaller than the thickness of the relatively thick galvanization layer present in the peripheral part thereof. When the Zn layer remains (is remaining) at the joint interface 26, this means that the steel product 21 and the aluminum material 22 are not in direct contact in that portion. In the present invention, the total area $S_4$ ($mm^2$) occupied in the plane direction by the Zn layer 30 at the joint interface 26 in contact with the nugget is defined to account for 30% or less of the area S ($mm^2$) occupied in the plane direction by the nugget. The total area $S_4$ occupied in the plane direction by the Zn layer 30 is, similarly to the nugget area S and the like described later, an area occupied in the plane direction by the layer at the joint interface on the aluminum material 22 side.

($Al_3Fe$-Based Compound Layer)

In the present invention, for increasing the bonding strength, the average thickness $l_1$ in the nugget direction in the nugget center of the $Al_3Fe$-based compound layer on the aluminum material 22 side in FIG. 5 is preferably from 0.5 to 10 μm.

The $Al_3Fe$-based compound layer is an intermetallic compound $Al_3Fe$ formed on the aluminum material 22 side and is formed in the wedge shape as shown in FIGS. 5, 6 and 7. The size of individual compound particles (or the length of wedge-shaped or needle-like compound particles) is large in the center part (nugget center part) and the thickness (size and distribution of particles or needles) gradually decreases as approaches to the edge part (right/left direction in FIGS. 5, 6 and 7) of the nugget.

Such an $Al_3Fe$-based compound has a wedge (anchor) effect including the effect by the shape above and yields increase in the adherence between the aluminum material 22 and the $Al_5Fe_2$-based compound layer as well as in the bonding strength. This effect is not exerted if the $Al_3Fe$-based compound layer is too thin. In particular, if $l_1$ is less than 0.20 μm, the wedge effect is insufficient and the adherence to the $Al_5Fe_2$-based compound layer is bad, as a result, interlayer rupture readily occurs and the rupture may occur at the smooth interface. For this reason, the average thickness $l_1$ in the nugget depth direction in the nugget center part of the $Al_3Fe$-based compound layer on the aluminum material 22 side is preferably 0.20 μm or more.

On the other hand, if the $Al_3Fe$-based compound excessively grows to form a layer having a too large thickness, individual compound particles rather work out to a starting point for breaking. In particular, if $l_1$ exceeds 10 μm, this tendency is outstanding. For this reason, the upper limit of the average thickness $l_1$ in the nugget direction in the nugget center part of the $Al_3Fe$-based compound layer is preferably 10 μm or less.

($Al_5Fe_2$-Based Compound Layer)

In the present invention, for more increasing the bonding strength the average thickness $l_2$ in the nugget depth direction of the $Al_5Fe_2$-based compound layer as an intermetallic compound $Al_5Fe_2$ on the steel product 21 side is also preferably from 0.20 to 5 μm. The thickness of this $Al_5Fe_2$-based compound layer also gradually decreases as approaches to the edge part (right/left direction in FIGS. 5, 6 and 7) of the nugget. If the average thickness $l_2$ of the $Al_5Fe_2$-based compound layer is less than or exceeds this range, the bonding strength may decrease, and the reasons therefor are the same as in the $Al_3Fe$-based compound layer on the aluminum material 22 side.

(Areas of Two Compound Layers)

In FIG. 4, the above-described total average thickness l of the average thickness $l_1$ in the nugget depth direction of the $Al_3Fe$-based compound layer and the average thickness $l_2$ in the nugget depth direction of the $Al_5Fe_2$-based compound layer is the total average thickness in the nugget depth direction of these two layers.

Figure 9:
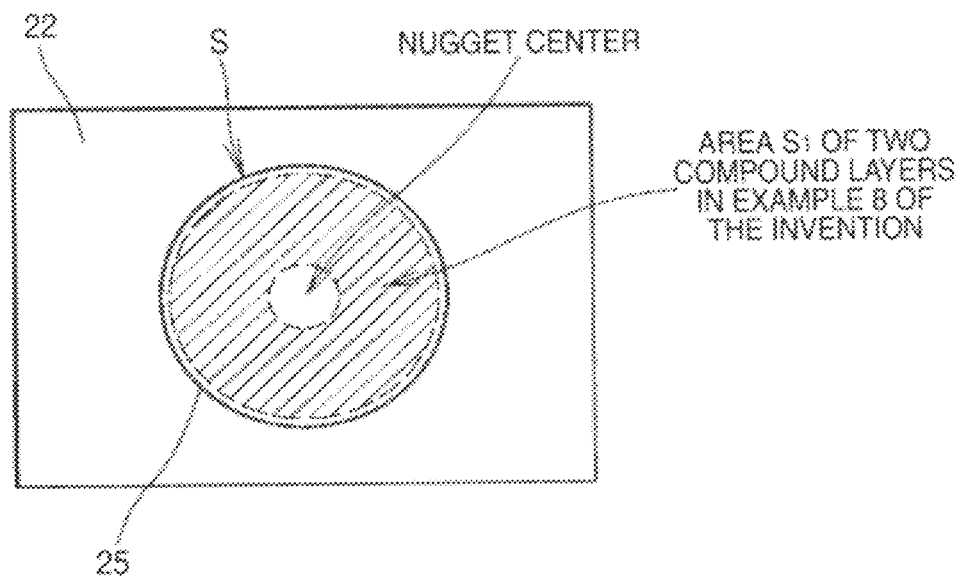
FIG. 9 is an explanatory view showing a given thickness distribution in the plane direction of the interface reaction layer in the joint part of the dissimilar material joint product of the present invention.

In the present invention, for increasing the bonding strength, as shown in FIG. 9, the area $S_1$ (the area $S_1$ occupied in the plane direction at the joint interface on the aluminum material 22 side) of a portion where the above-described total average thickness l is from 0.5 to 10 μm is large, more specifically, is defined to account for 50% or more of the nugget area S (the area S occupied in lire plane direction at the joint interface on the aluminum material 22 side, shown in FIG. 4).

Figure 10:
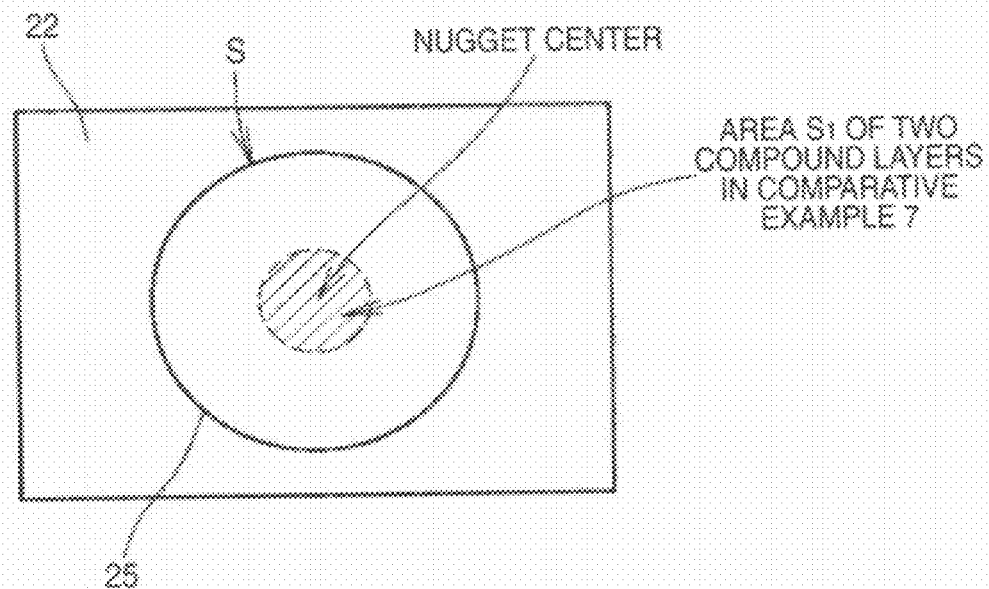
FIG. 10 is an explanatory view showing a given thickness distribution in the plane direction of the interface reaction layer in the joint part of the dissimilar material joint product of Comparative Example.

That is, as the area $S_1$ occupied in the plane direction at the interface of the joint part by a specific thickness portion of the $Al_3Fe$-based compound layer and $Al_5Fe_2$-based compound layer is larger, the bonding strength becomes higher. If the area $S_1$ is small as shown in FIG. 10 and is less than 50% of the nugget area S, when the strength is the same, as the nugget area S is larger, the possibility of causing reduction in the rupture load (bonding strength) of the joint part is higher. On the other hand, if the nugget area S is small, breaking of the joint part is similarly liable to occur with a lower load.

When the area $S_1$ of the $Al_3Fe$-based compound layer and $Al_5Fe_2$-based compound layer is large as shown in FIG. 9, the area of the joint part (joint interface) having high joining force is sufficiently large to ensure a larger rupture load and in turn, the joint interface is endowed with sufficiently higher rupture load than that of the aluminum substrate, as a result, the aluminum material side is ruptured without causing interfacial rupture.

The above-described area definition of the interface reaction layer having an optimal thickness is made from the standpoint of bonding strength but is to control the compound layer on the aluminum material side and the compound layer on the steel product side to the optimal range. Unlike the conventional wisdom that thinner is better, the intention of the present invention is rather directed to aggressively allow the presence of the interface reaction layer. The area definition above is based on the technical idea that for enhancing the bonding strength, an interface reaction layer having an optimal thickness range is formed in a large area, in other words, is allowed to be present in a broad range.

(Zn—Fe-Based Compound)

In the present invention, on the other hand, the Zn—Fe-based compound which is an impurity as a compound or compound layer and inhibits the bonding strength is regulated. Specifically, the Zn—Fe-based compound contained (produced) in each of these two layers, that is, $Al_3Fe$-based compound layer and $Al_5Fe_2$-based compound layer.

As shown in FIG. 5, the total area occupied in the cross-sectional direction (the up/down direction in the Figure) by the Zn—Fe-based compound layer contained (produced) in each of the two layers, that is, $Al_3Fe$-based compound layer and $Al_5Fe_2$-based compound layer, is denoted by $S_3$. Also, the area occupied in the cross-sectional direction by the compound layer portion where the total average thickness of these two layers is from 0.5 to 10 μm is denoted by $S_2$. In the present invention, the total area $S_3$ of the Zn—Fe-based compound layer is defined to account for 10% or less of the area $S_2$ occupied in the cross-sectional direction by the specific thickness portion of those two compound layers.

If the total area $S_3$ of the brittle Zn—Fe-based compound layer exceeds 10% of the total $S_2+S_3$ of the areas $S_2$ and $S_3$, the bonding strength of the joint part significantly decreases. Incidentally, the Zn—Fe-based compound is sometimes referred to as an Fe—Zn-based compound.

(Area of Zn Layer)

In the present invention, as a preferred condition, the total area $S_4$ occupied its the plane direction by the Zn layer 30 at the joint interface 26 in contact with the nugget is defined, as described above, to account for 30% or less of the area S occupied in the plane direction by the nugget.

The Zn layer is, as described above, a residual portion of the galvanization layer on the steel product surface and when the Zn layer remains, as shown in FIG. 4, at the joint interface 26 in the edge part (peripheral part) of the nugget, this means that the steel product 21 and the aluminum material 22 are not in direct contact in that portion. If the total area $S_4$ of the brittle Zn layer exceeds 30% of the nugget area S in the plane direction observed above, the possibility of causing extreme reduction in the bonding strength of the joint part is high.

The total area $S_4$ occupied in the plane direction by the Zn layer 30 at the joint interface 26 in contact with the nugget can be measured from the results of observation in the cross-sectional direction of respective sites where the Zn layer 30 is present, through an optical microscope at a magnification of 200 on the assumption that, as shown in FIGS. 4 and 9, the Zn layer 30 is present at the joint interface 26 in contact with the nugget to have a symmetric configuration in the circumferential direction of the nugget.

(Bonding Strength and Rupture Mode)

In the present invention, when the bonding strength is high, the joint interface is not ruptured and the joint part is ruptured like a plug (at the outer side of the range where the $Al_3Fe$-based compound layer is present, the aluminum material is internally ruptured in the sheet thickness direction). In other words, such a rupture mode of the joint part is revealing high bonding strength of the present invention.

On the other hand, when the bonding strength is low as in conventional techniques, the joint part is ruptured at the joint interface and is ruptured between the $Al_5Fe_2$-based compound layer and the $Al_2Fe$-based compound layer or in the inside of either compound layer. In other words, such a rupture mode of the joint part is revealing low bonding strength.

(Method for Identifying Intermetallic Compound)

In the present invention, the $Al_3Fe$-based compound layer or $Al_5Fe_2$-based compound layer is identified by performing a semi-quantitative analysis of the cross-section of the joint part by the method of EDX (energy dispersive X-ray spectroscopy) point analysis of HAADF-STEM image (at a magnification of 5,000 to 10,000). In other words, unless the joint part interface is measured using the HAADF-STEM method described later, it may be difficult to distinguish the intermetallic compound defined in the present invention or exactly measure the thickness or area of the intermetallic compound layer.

The intermetallic compounds are differentiated (distinguished) from each other by using the composition when in the semi-quantitative analysis, the joint part interface is measured for the composition at a plurality (as many as possible) of measuring points and Fe, Al and Zn (at %) are expressed in percentage. That is, as shown in Table 10, the composition of the "$Al_5Fe_2$-based compound" must have an Fe amount of 24.0 to 29.0 at % and an Al amount of 70.0 to 74.0 at %. The composition of the "$Al_3Fe$-based compound" must have an Fe amount of 18.0 to 24.0 at % and an Al amount of 74.5 to 81.0 at %. Furthermore, the composition of the Zn—Fe-based compound, in terms of the composition of representative $Fe_3Zn_7$, must have an Fe amount of 31.0 to 40.0 at % and a Zn amount of 60.0 to 69.0 at %.

Here, the criteria for judging (distinguishing) the composition of each interface reaction layer are as follows. That is, the "$Al_5Fe_2$-based compound" and "$Al_3Fe$-based compound" must be a layer where both Fe and Al are detected in an amount of 10 mass % or more by the EDX point analysis. In other words, a layer where both the Fe and Al amounts are less than 10 mass % is not included in the interface reaction layer specified in the present invention.

The Zn—Fe-based compound layer must be a layer where similarly by the EDX point analysis, Fe is detected in an amount of 27.7 mass % or more and Zn is detected in an amount of 72.3 mass % or less. A layer where evert when Zn is detected, Fe is not detected in an amount of 27.7 mass % or more is judged as the originally existing Zn plating layer or the Zn layer 30 and not included in the interlace reaction layer.

The composition of the Zn—Fe-based compound must be a composition composed only of representative $Fe_3Zn_7$ [Fe: from 27.7 to 36.3 mass % (Fe: from 31.0 to 40.0 at %)] and is differentiated from other phases contained in the Zn plating layer. Other phases are a ζ phase [$FeZn_{13}$, Fe: from 5.8 to 6.2 mass % (Fe: from 6.7 to 7.2 at %)], a δ1 layer [$FeZn_7$, Fe: from 7.3 to 11.3 mass % (Fe: from 8.5 to 13.0 at %)], a Γ1 phase

[$Fe_3Zn_{21}$, Fe: from 16.2 to 20.8 mass % (Fe: from 18.5 to 23.5 at %)] and a Γ phase [$Fe_3Zn_{10}$, Fe: front 21.2 to 27.7 mass % (Fe: from 24.0 to 31.0 at %)] (see, *Zn Mekia-So no Sosei ni Kansuru Shutten* (Presentation Regarding Zn Plating Layer Composition), compiled by ISU, 138th and 139th Nisbiyama Memorial Lectures, "*Hyomen-shori Gijutsu no Shinpo to Kongo no Doko* (Progress and Future Trend of Surface Treatment Technology)", page 15 (May 1, 1991)).

Also, $Al_5Fe_2$, $Al_3Fe$ and $Fe_3Zn_7$ are acknowledged as the interface reaction layer phase but the composition is not always composed as a stoichiometric composition and has a compositional latitude to a certain extent. In this regard, the phases were identified from the crystal structure by the electron beam diffraction through TEM and the Fe, Al, Si, Mn and Zn elements were measured by EDX for each phase. As a result, it was found that in practice, the composition was shifted to the smaller Fe percentage side than the stoichiometric composition with respect to the $Al_5Fe_2$ and $Al_3Fe$ phases and to the larger Fe percentage side than the stoichiometric composition with respect to the $Fe_3Zn_7$ phase. Based on these results, the phases satisfying the percentages of Fe, Al and Zn shown in Table 10 are judged as respective reaction layers.

The HAADF-STEM (high angle annular dark field-scanning transmission electron microscope) method is a method of obtaining an image signal by collecting elastic scattering electrons scattered to the high angle side by means of an annular detector. The HAADF-STEM image is characterized in that the diffraction contrast scarcely affects the image and the contrast is proportional to neatly a square of the atomic number (Z). The image obtained is directly used as a two-dimensional map having composition information. This method can detect even trace elements with good sensitivity and therefore, is effective in analyzing the microstructure of the joint interface.

More specifically, the joint product is cut at the nugget center part and embedded in a resin so that the cross section can be observed, and the cut face is mirror-polished and roughly measured through SEM for the average thickness of each compound layer in the interface reaction layer. Thereafter, the nugget center part, the portion inside of the boundary of a layer supposed to the $Al_5Fe_2$-based compound, the portions inside and outside of the boundary of a layer supposed to be the $Al_3Fe$-based compound, and the portions inside and outside of a portion where the length in the depth direction of a layer supposed to be each compound is considered to surpass the upper limit, are thinned to a thickness enabling TEM observation by a FIB process using a focused ion beam machining device (FB-2000A) manufactured by Hitachi, Ltd., and the obtained samples are used as a sample for observation and analysis.

The sample is observed using an HAADF detector-equipped field emission-type scanning electron microscope (JEM-2010F) manufactured by JEOL at an acceleration voltage of 200 kV in a visual field range of 100 μm (at a magnification of 5,000 to 10,000), and respective particles and different phases all are examined by EDX point analysis, whereby the $Al_3Fe$-based compound layer or $Al_5Fe_2$-based compound layer is identified.

The thickness (length) $l_1$ in the depth direction of the $Al_3Fe$-based compound in FIG. 4 is determined by measuring the length in the depth direction of all particles and needles identified as the $Al_3Fe$-based compound from the obtained HAADF-STEM image in a visual field of 100 μm, and averaging the values.

The thickness (length) $l_2$ in the depth direction of the $Al_5Fe_2$-based compound layer in FIG. 5 is determined by measuring the thickness at 5 points on the image above and averaging the values. These measurements are performed on all samples for observation and analysis.

(Measuring Method of Area in Plane Direction of Intermetallic Compound)

By these measurements, the total area $S_1$ occupied in the plane direction at the joint interface on the aluminum material side by a portion where the total thickness l in the nugget depth direction of two layers, that is, $Al_3Fe$-based compound layer and $Al_5Fe_2$-based compound layer, is from 0.5 to 10 μm is determined. Also, the nugget area S occupied in the plane direction at the joint interface on the aluminum material side is determined in the same manner. That is, as shown in FIGS. 9 and 10, on the assumption that these layers each is symmetrical in the circumferential direction of the nugget, the area in the plane direction, assuming a concentric circle, is calculated from the existing position in the radius direction of the cross section. Also, the total area $S_4$ in the plane direction of the Zn layer 30 is calculated by the same method. That is, as shown in FIG. 4, when the Zn layer 30 is present, the layer exists along the circumference (periphery) of the nugget. Therefore, in the case where the presence of the Zn layer 30 is confirmed, on the assumption that the Zn layer 30 is symmetrical in the nugget circumferential direction, the area in the plane direction, assuming a concentric circle, is calculated from the existing position In the radius direction of the cross section.

(Measuring Method of Area in Cross-Sectional Direction of Intermetallic Compound The total area $S_2$ in the cross-sectional direction of a portion where the total average thickness l in the nugget depth direction of two layers, that is, $Al_3Fe$-based compound layer and $Al_5Fe_2$-based compound layer, identified and determined by the EDX point analysis as above is from 0.5 to 10 μm the total area $S_3$ in the cross-sectional direction of the Zn—Fe-based compound layer contained in each of those two layers, and the like are determined by the above-described SEM observation of the identified joint interface site, namely, SEM observation at a magnification of 2,000 to 10,000 (at a magnification of 2,000 when the average thickness l is 1 μm or more and at a magnification of 2,000 when the average thickness l is less than 1 μm). Specifically, the area in the cross-sectional direction of each reaction layer is measured in a visual field width of 100 μm at respective positions 500 μm distant in the radius direction from the center part of the nugget radius, the measurement is performed in the nugget radius direction until the position where the reaction layer is present, and the values are summed.

Incidentally, these results may be verified by TEM observation similarly at a magnification of 2,000 to 10,000. For example, in the SEM photograph at a magnification of 5,000 of the joint interface shown in FIG. 6 and the TEM photograph at a magnification of 5,000 of the same joint interface shown in FIG. 7, the portion indicated by the dotted line is the joint interface and this joining surface is more clearly distinguished with an eye in the TEM photograph.

(Size of Nugget)

The average diameter t of the nugget 25 in the spot welded part at the joint interface on the aluminum material side in FIG. 4 is preferably 7 mm or more for ensuring the bonding strength. In other words, the spot welding conditions are preferably selected so that the nugget 25 can have an average diameter of 7 mm or more.

If the average diameter of the nugget 25 is less than 7 mm, the nugget area is too small and the bonding strength highly probably becomes insufficient. On the other hand, the average diameter of the nugget 25 is preferably 12 mm or less. If the average diameter of the nugget 25 exceeds 12 mm, this may be sufficient to obtain the bonding strength but surface flash is readily generated and due to great decrease in the thickness of the aluminum material, the bonding strength conversely decreases.

It has been conventionally supposed to be optimal in view of strength from both aspects of workability and profitability that at the spot welding of similar metal materials, the area of the nugget 25 in the spot welded part is about $20 \times t^{0.5}$ mm$^2$ with respect to the thickness t of the metal material.

However, in the present invention where dissimilar metal materials are joined to each other, the nugget area is specified to be larger than that in the joining of similar metal materials above. By performing the spot welding so that the nugget 3 in the spot welded part can have an average diameter of 7 mm or more, sufficiently high bonding strength is obtained and both workability and profitability are excellent.

(Measurement of Nugget Area)

In the present invention, the area S occupied in the plane direction at the joint interface on the aluminum material 22 side by the nugget 25, the area $S_5$ occupied in the cross-sectional direction by the nugget 25, and the nugget average diameter (diameter occupied in the plane direction at the joint interface on the aluminum material 22 Side) can be measured by observation through an optical microscope, for example, at a magnification of 200. That is, the nugget on the aluminum material side separated by peeling or cutting at the joint interface is measured by analyzing a plurality of sample images, and the values are averaged. At this time, the cross section centered in the nugget center is observed. In the case of a nugget having a nearly circular shape, the diameter may also be determined by a method where the joint part is cut and observed at the cross section through an optical microscope, the diameter of the formed nugget at the joint interface on the aluminum material side is measured on a plurality of samples, and the values are averaged. In this case, nugget diameters in at least two orthogonal directions are measured.

(Decrease in Thickness of Aluminum Material)

For the purpose of ensuring the bonding strength, the decrease in the thickness of the aluminum material is preferably minimized. As a measure thereof, the minimum residual sheet thickness $\Delta t$ is preferably 50% or more of the original thickness $t_2$. The minimum residual sheet thickness $\Delta t$ is more preferably 90% or more of the original thickness $t_2$. The minimum residual sheet thickness $\Delta t$ can be determined by observing the joint cross section at a magnification of 200, measuring the length of decrease in the sheet thickness, and taking the difference from the original sheet thickness.

(Spot Welding)

Figure 11:
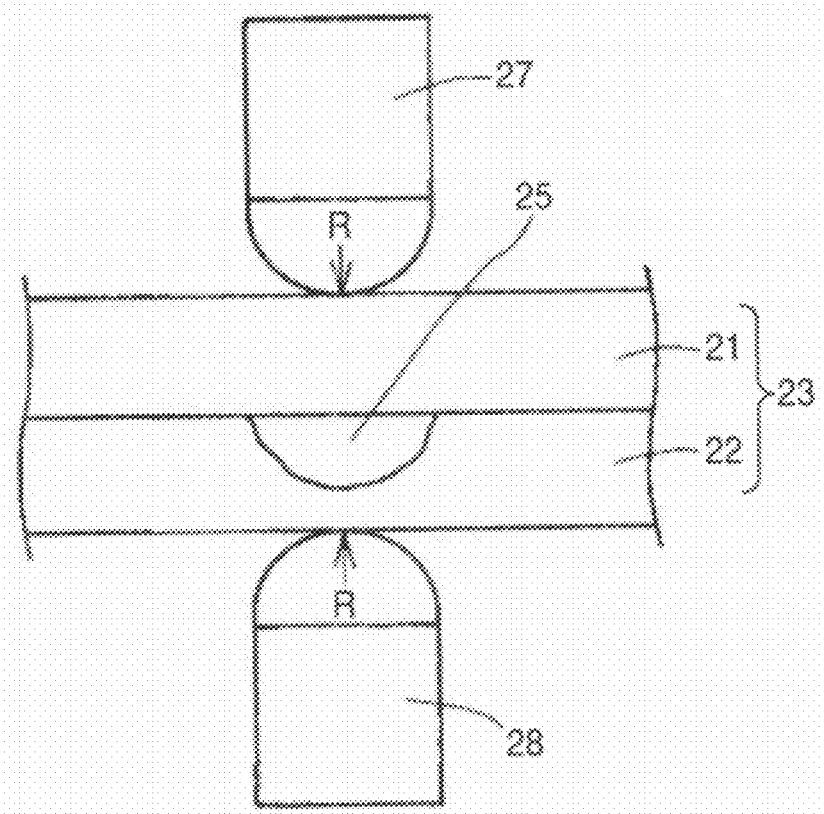
FIG. 11 is an explanatory view showing the embodiment of spot welding for obtaining a dissimilar material joint product.

FIG. 11 shows one embodiment of the spot welding as a premise for obtaining the dissimilar material joint product. The fundamental embodiment of the spot welding method of the present invention is the same as the embodiment of normal spot welding. In FIG. 11, 21 is a steel sheet, 22 is an aluminum alloy sheet, 23 is a dissimilar material joint product, 25 is a nugget, and 27 and 28 are electrodes.

The conditions of spot welding for obtaining the dissimilar material joint product of the present invention are described below.

(Welding Pressure)

As for the welding pressure at the spot welding, in order to obtain the above-described relatively large nugget area and the requisite area of the above-described optimal interface reaction layer and achieve the optimal range specified in the present invention, a relatively high welding pressure needs to be applied.

Specifically, the welding pressure is selected from a relatively high welding pressure range of $1 \times t^{0.5}$ to $2.5 \times t^{0.5}$ kN in relation to the sheet thickness l ($t_1 + t_2$ in FIG. 4) of the joint part as a whole. However, even in this relatively high welding pressure range, the manner of finishing of the compound above differs depending on the material or other welding conditions and the optimal range specified in the present invention is not always achieved. Therefore, an optimal welding pressure needs to be selected from the above-described relatively high welding pressure range so that the optimal range specified in the present invention can be achieved.

On the other hand, when such a relatively large welding pressure is applied, irrespective of the shape of the electrode chip or the like, electrical contact between dissimilar materials or between the electrode and the material can be stabilized, the molten metal inside the nugget can be supported by the unmelted part in the periphery of the nugget, and the above-described relatively large requisite area of the nugget and the requisite area of the above-described optimal interface reaction layer can be obtained. Also, generation of surface flash can be suppressed.

If the welding pressure is less than $1 \times t^{0.5}$ kN, the welding pressure is too low and these effects cannot he obtained. In particular, the contact area is decreased in a chip having R at the tip and this leads to decrease in the nugget area and increase in the current density (=increase of interface reaction layer), as a result, the bonding strength is reduced. Also, it is very likely to fail in obtaining, for example, the average thickness $l_1$ of Al$_3$Fe-based compound layer, the average thickness $l_2$ of Al$_5$Fe$_2$-based compound layer, and the total average thickness l of these two layers.

On the other hand, when the welding pressure is increased, the nugget area tends to decrease and if the welding pressure exceeds $2.5 \times t^{0.5}$ kN, a current over the optimal current described below is required for obtaining the desired nugget area and this brings about generation of surface flash or growth of the interface reaction layer, as a result the bonding strength decreases. Also, the aluminum material is greatly deformed and a large concave part remains as a joint mark, which is undesirable in view of outer appearance.

(Current)

In order to obtain the above-described relatively large requisite area of the nugget and the requisite area of the above-described optimal interface reaction layer, it is necessary to control the current at the spot welding and pass a relatively high current for a short time.

Specifically, a relatively high current of $12 \times t_1^{0.5}$ to $35 \times t_1^{0.5}$ kA needs to be passed for a short time of $320 \times t_1^{0.5}$ msec or less in relation to the sheet thickness $t_1$ ($t_1$ in FIG. 4, but when two or more steel products are stacked, the sheet thickness of the entire steel product). However, even within this relatively high current or short time range, the manner of finishing of the compound above differs depending on the material or other welding conditions and the optimal range specified in the present invention is not always achieved. Therefore, an optimal current or time needs to be selected from the above-described relatively high current or short time range so that the optimal range specified in the present invention can be achieved.

Also, when such a relatively high current is passed for a short time, electrical contact between dissimilar materials or between the electrode and the material can be stabilized, the molten metal inside the nugget can be supported by the unmelted part in the periphery of the nugget, and the above-described relatively large requisite area of the nugget and the requisite area of the above-described optimal interface reaction layer can be obtained. Furthermore, generation of surface flash can be suppressed.

If the current is a low current of less than $12 \times t_1^{0.5}$ kA, more strictly, less than $15 \times t_1^{0.5}$ kA, heat input in an amount large enough for the formation and growth of the nugget is not obtained and therefore, the above-described relatively large requisite area of the nugget and the requisite area of the above-described optimal interface reaction layer cannot be obtained. Also, it is very likely to fail in obtaining, for example, the average thickness $l_1$ of the $Al_3Fe$-based compound and $Al_{19}Fe_4Si_2Mn$-based compound layers, and the average thickness $l_2$ in the nugget depth direction of the $Al_5Fe_2$-based compound layer in a range of nugget center±0.1 mm.

On the other hand, if the current is a high current exceeding $35 \times t_1^{0.5}$ kA, extra equipment is necessary and this is disadvantageous in view of operation and cost. For this reason, the current is set to be $35 \times t_1^{0.5}$ kA or less. Accordingly, the current used is from $12 \times t_1^{0.5}$ to $35 \times t_1^{0.5}$ kA, preferably from $15 \times t_1^{0.5}$ to $35 \times t_1^{0.5}$ kA.

(Electrification Time)

The electrification time is a relatively short time of $320 \times t_1^{0.5}$ msec or less in relation to the sheet thickness $t_1$ of the entire steel product. If the electrification time is a long time exceeding $320 \times t_1^{0.5}$ msec, the nugget diameter is ensured, but generation of surface flash or growth of the interface reaction layer is brought about and the bonding strength decreases. As described above, for controlling the interface reaction layer, the electrification time is $320 \times t_1^{0.5}$ msec or less, preferably from $100 \times t_1^{0.5}$ to $280 \times t_1^{0.5}$ msec. However, it is necessary to select the optimal time in relation to the current according to the material or other welding conditions so that the compound control can achieve the optimal range specified in the present invention.

(Two-Step Electrification)

In order to allow the reaction layer at the joint interface to grow like the compound layer specified in the present invention, two-step electrification or two-step spot welding but not normal electrification in one step is preferably performed. By passing a current in two steps at the spot welding, particularly, passing a lower current in the second step than the current passed in the first step, the galvanization layer on the steel product surface can be expelled (removed) to facilitate direct bonding between the steel product and the aluminum material.

Also, the compound layer specified in the present invention can be more easily obtained. That is, an $Al_5Fe_2$-based compound layer and an $Al_3Fe$-based compound layer are readily formed on the steel product side and the aluminum material side, respectively, at the joint interface of the dissimilar material joint product. Furthermore, the area $S_1$ of the specific thickness portions of these two layers is liable to be 50% or more of the nugget area $S$, and the area $S_3$ of the Zn—Fe-based compound layer contained in each of these two layers is easily controlled to be 10% or less of the compound area $S_2+S_3$ in the cross-sectional direction. In addition, the total area $S_4$ of the Zn layer at the joint interface in contact with the nugget is also easily controlled to be 30% or less of the nugget area.

Also in the case of passing a current in two steps at the spot welding, except for passing a lower current in the second step than the current passed in the first step, it is preferred that in both the first and second steps, the welding pressure is the same and the welding pressure, current value and total electrification time each is in the above-described preferred range. By satisfying these conditions, dissimilar joining can be achieved without inhibiting the spot welding efficiency.

(Electrode Shape)

The electrode chip at the spot welding may have any shape as long as the above-described nugget area and interface reaction layer are obtained. The electrode chips on the steel product side and the aluminum material side may differ in the shape or in the size. However, it is preferred that the electrode chips on both the steel product side and the aluminum material side are a "dome-shaped" electrode chip having R at the tip as shown in FIG. 5. In the case of such a tone type, the tip diameter and tip R of the electrode chip need to be 7 mmφ or more and 100 mmR or more, respectively, so as to satisfy both reduction in the current density and increase in the nugget area. The polarity is also not particularly limited, but in the case of using do spot welding, it is preferred to assign the anode to the aluminum material side and the cathode to the steel product side.

In particular, when an electrode chip having a tip diameter of 7 mmφ or more and a tip R of 120 mmR or more is used on both sides, reduction in the current density and increase in the nugget area can be optimally satisfied at the same time. In the case of using this chip, it is preferred to apply a welding pressure of $1.5 \times t_1^{0.5}$ to $2.5 \times t_1^{0.5}$ kN and pass a current of $15 \times t_1^{0.5}$ to $35 \times t_1^{0.5}$ kA for $320 \times t_1^{0.5}$ msec or less, in relation to the sheet thickness $t_1$ of the steel product.

The optimal joining conditions are established by taking the balance of these conditions described above and, for example, when the tip diameter, tip R or welding pressure is increased to decrease the current density, the interface reaction layer needs to be controlled to the optimal thickness by proportionally increasing the amount of current, Examples

TABLE 9

| | Component of Steel Product (mass %, balance: Fe) | | | | |
|---|---|---|---|---|---|
| Kind of Steel Product | C | Si | Mn | P | S |
| High-tension steel of 270 MPa grade | 20 ppm | 0.01 | 0.14 | 0.016 | 0.008 |
| High-tension steel of 590 MPa grade | 0.067 | 0.01 | 1.80 | 0.008 | 0.003 |
| High-tension steel of 780 MPa grade | 0.11 | 0.01 | 2.01 | 0.011 | 0.003 |
| High-tension steel of 980 MPa grade | 0.13 | 0.01 | 2.30 | 0.010 | 0.002 |

TABLE 10

| Kind of Compound | Components of Compound (at %) | | |
|---|---|---|---|
| | Fe | Al | Zn |
| $Al_5Fe_2$-Based compound | 24.0 to 29.0 | 70.0 to 74.0 | — |
| $Al_3Fe$-Based compound | 18.0 to 24.0 | 74.5 to 81.0 | — |
| $Fe_3Zn_7$-Based compound | 31.0 to 40.0 | — | 60.0 to 69.0 |

TABLE 11

(High-Tension GA Steel Sheet of 980 MPa Grade)

| Mark | Galvanization Film Thickness (μm) | Number of Steel Products Stacked | Sheet Thickness $t_1$ of Steel Product (mm) | Sheet Thickness $t_2$ of Aluminum (mm) | Sheet Thickness Ratio $t_1/t_2$ | Spot Welding conditions | | Tip Diameter of Electrode Chip | Remarks |
|---|---|---|---|---|---|---|---|---|---|
| | | | | | | Welding Pressure (kN), Welding Current (kA) and Welding Time (msec) in First Welding Step | Welding Pressure (kN), Welding Current (kA) and Welding Time (msec) in Second Welding Step | | |
| 1 | none | 1 | 1.2 | 1.0 | 1.2 | 3 kN-24 kA-200 msec | — | 150R | Comparative Example |
| 2 | none | 1 | 1.2 | 1.0 | 1.2 | 3 kN-24 kA-200 msec | 3 kN-6 kA-400 msec | 150R | Comparative Example |
| 3 | 3 | 1 | 1.2 | 1.0 | 1.2 | 3 kN-24 kA-200 msec | — | 150R | Comparative Example |
| 4 | 3 | 1 | 1.2 | 1.0 | 1.2 | 3 kN-24 kA-200 msec | 3 kN-6 kA-400 msec | 150R | Example |
| 5 | 5 | 1 | 1.2 | 1.0 | 1.2 | 3 kN-24 kA-200 msec | — | 150R | Comparative Example |
| 6 | 5 | 1 | 1.2 | 1.0 | 1.2 | 3 kN-24 kA-200 msec | 3 kN-6 kA-400 msec | 150R | Example |
| 7 | 10 | 1 | 1.2 | 1.0 | 1.2 | 3 kN-24 kA-200 msec | — | 150R | Comparative Example |
| 8 | 10 | 1 | 1.2 | 1.0 | 1.2 | 3 kN-24 kA-200 msec | 3 kN-6 kA-400 msec | 150R | Example |
| 9 | 15 | 1 | 1.2 | 1.0 | 1.2 | 3 kN-24 kA-200 msec | — | 150R | Comparative Example |
| 10 | 15 | 1 | 1.2 | 1.0 | 1.2 | 3 kN-24 kA-200 msec | 3 kN-6 kA-400 msec | 150R | Example |
| 11 | 19 | 1 | 1.2 | 1.0 | 1.2 | 3 kN-24 kA-200 msec | — | 150R | Comparative Example |
| 12 | 19 | 1 | 1.2 | 1.0 | 1.2 | 3 kN-24 kA-200 msec | 3 kN-6 kA-400 msec | 150R | Example |
| 13 | 20 | 1 | 1.2 | 1.0 | 1.2 | 3 kN-24 kA-200 msec | — | 150R | Comparative Example |
| 14 | 20 | 1 | 1.2 | 1.0 | 1.2 | 3 kN-24 kA-200 msec | 3 kN-6 kA-400 msec | 150R | Comparative Example |

TABLE 12

(High-Tension GA Steel Sheet of 980 MPa Grade)

| Mark | Presence or Absence of $Al_5Fe_2$ Compound Layer | Joint Interface Reaction Layer | | | | | Nugget Diameter (mm) | Ratio of Minimum Residual Sheet Thickness of Aluminum Material to Original Sheet Thickness (%) | Cross Tensile Test Strength | Remarks |
|---|---|---|---|---|---|---|---|---|---|---|
| | | Area $S_1$ Occupied in Plane Direction by Portion Having Joint Interface Reaction Layer Thickness of 0.5 to 10 μm (mm²) | Ratio of $S_1$ to Nugget Area S (%) | Area $S_2$ Occupied in Cross-Sectional Direction by Portion Having Joint Interface Reaction Layer Thickness of 0.5 to 10 μm (mm²) | Ratio of Area $S_3$ of Zn—Fe-Based Compound Layer to $S_2 + S_3$ (%) | Ratio of Area $S_4$ of Zn Layer to Nugget Area S (%) | | | | |
| 1 | none | 17.0 | 43 | 1800 | 0.0 | 0.0 | 7.1 | 40 | X | Comparative Example |
| 2 | present | 15.4 | 34 | 4160 | 0.0 | 0.0 | 7.6 | 30 | X | Comparative Example |

TABLE 12-continued (High-Tension GA Steel Sheet of 980 MPa Grade)

| | | Joint Interface Reaction Layer | | | | | | | | |
|---|---|---|---|---|---|---|---|---|---|---|
| Mark | Presence or Absence of $Al_5Fe_2$ Compound Layer | Area $S_1$ Occupied in Plane Direction by Portion Having Joint Interface Reaction Layer Thickness of 0.5 to 10 μm (mm²) | Ratio of $S_1$ to Nugget Area S (%) | Area $S_2$ Occupied in Cross-Sectional Direction by Portion Having Joint Interface Reaction Layer Thickness of 0.5 to 10 μm (mm²) | Ratio of Area $S_3$ of Zn—Fe-Based Compound Layer to $S_2 + S_3$ (%) | Ratio of Area $S_4$ of Zn Layer to Nugget Area S (%) | Nugget Diameter (mm) | Ratio of Minimum Residual Sheet Thickness of Aluminum Material to Original Sheet Thickness (%) | Cross Tensile Test Strength | Remarks |
| 3 | none | 17.7 | 46 | 1720 | 2.6 | 8.6 | 7.0 | 57 | X | Comparative Example |
| 4 | present | 22.4 | 52 | 5320 | 1.1 | 4.3 | 7.4 | 51 | ◯ | Invention |
| 5 | none | 20.4 | 45 | 1540 | 8.5 | 13.1 | 7.6 | 81 | Δ | Comparative Example |
| 6 | present | 34.3 | 70 | 5060 | 3.4 | 8.2 | 7.9 | 75 | ◎ | Invention |
| 7 | none | 18.0 | 36 | 1300 | 12.6 | 26.6 | 8.0 | 83 | Δ | Comparative Example |
| 8 | present | 45.4 | 80 | 5020 | 6.8 | 8.8 | 8.5 | 75 | ◎ | Invention |
| 9 | none | 21.8 | 48 | 1160 | 18.1 | 28.1 | 7.6 | 82 | X | Comparative Example |
| 10 | present | 34.5 | 67 | 4620 | 9.3 | 13.7 | 8.1 | 75 | ◯ | Invention |
| 11 | none | 20.0 | 44 | 1090 | 19.4 | 30.4 | 7.6 | 83 | X | Comparative Example |
| 12 | present | 28.0 | 53 | 4170 | 9.8 | 19.2 | 8.2 | 75 | ◯ | Invention |
| 13 | none | 13.5 | 29 | 820 | 20.8 | 33.1 | 7.7 | 84 | X | Comparative Example |
| 14 | present | 20.0 | 37 | 1820 | 12.5 | 22.9 | 8.3 | 75 | Δ | Comparative Example |

* In cross tensile test results, X indicates failure of joining (the same applies to the following Tables).

TABLE 13

(High-Tension GA Steel Sheet of 780 MPa Grade)

| Mark | Galvanization Film Thickness (μm) | Number of Steel Products Stacked | Sheet Thickness $t_1$ of Steel Product (mm) | Sheet Thickness $t_2$ of Aluminum (mm) | Sheet Thickness Ratio $t_1/t_2$ | Spot Welding conditions | | Tip Diameter of Electrode Chip | Remarks |
|---|---|---|---|---|---|---|---|---|---|
| | | | | | | Welding Pressure (kN), Welding Current (kA) and Welding Time (msec) in First Welding Step | Welding Pressure (kN), Welding Current (kA) and Welding Time (msec) in Second Welding Step | | |
| 15 | 10 | 1 | 0.9 | 1.0 | 0.9 | 3 kN-24 kA-50 msec | — | 150R | Comparative Example |
| 16 | 10 | 1 | 0.9 | 1.0 | 0.9 | 3 kN-24 kA-100 msec | — | 150R | Comparative Example |
| 17 | 10 | 1 | 0.9 | 1.0 | 0.9 | 3 kN-24 kA-200 msec | — | 150R | Comparative Example |
| 18 | 10 | 1 | 0.9 | 1.0 | 0.9 | 3 kN-24 kA-300 msec | — | 150R | Comparative Example |
| 19 | 10 | 1 | 0.9 | 1.0 | 0.9 | 3 kN-24 kA-400 msec | — | 150R | Comparative Example |
| 20 | 10 | 1 | 0.9 | 1.0 | 0.9 | 3 kN-24 kA-50 msec | 3 kN-6 kA-400 msec | 150R | Comparative Example |

TABLE 13-continued (High-Tension GA Steel Sheet of 780 MPa Grade)

| Mark | Galvanization Film Thickness (μm) | Number of Steel Products Stacked | Sheet Thickness $t_1$ of Steel Product (mm) | Sheet Thickness $t_2$ of Aluminum (mm) | Sheet Thickness Ratio $t_1/t_2$ | Spot Welding conditions | | Tip Diameter of Electrode Chip | Remarks |
|---|---|---|---|---|---|---|---|---|---|
| | | | | | | Welding Pressure (kN), Welding Current (kA) and Welding Time (msec) in First Welding Step | Welding Pressure (kN), Welding Current (kA) and Welding Time (msec) in Second Welding Step | | |
| 21 | 10 | 1 | 0.9 | 1.0 | 0.9 | 3 kN-24 kA-200 msec | 3 kN-6 kA-400 msec | 150R | Example |
| 22 | 10 | 1 | 1.8 | 1.0 | 1.8 | 4 kN-20 kA-50 msec | — | 150R | Comparative Example |
| 23 | 10 | 1 | 1.8 | 1.0 | 1.8 | 4 kN-20 kA-100 msec | — | 150R | Comparative Example |
| 24 | 10 | 1 | 1.8 | 1.0 | 1.8 | 4 kN-20 kA-200 msec | — | 150R | Comparative Example |
| 25 | 10 | 1 | 1.8 | 1.0 | 1.8 | 4 kN-20 kA-400 msec | — | 150R | Example |
| 26 | 10 | 1 | 1.8 | 1.0 | 1.8 | 4 kN-20 kA-500 msec | — | 150R | Example |
| 27 | 10 | 1 | 1.8 | 1.0 | 1.8 | 4 kN-20 kA-600 msec | — | 150R | Comparative Example |
| 28 | 10 | 1 | 1.8 | 1.0 | 1.8 | 4 kN-20 kA-100 msec | 4 kN-6 kA-400 msec | 150R | Comparative Example |
| 29 | 10 | 1 | 1.8 | 1.0 | 1.8 | 4 kN-20 kA-200 msec | 4 kN-6 kA-200 msec | 150R | Example |
| 30 | 10 | 1 | 1.8 | 1.0 | 1.8 | 4 kN-20 kA-200 msec | 4 kN-6 kA-400 msec | 150R | Example |
| 31 | 10 | 1 | 1.8 | 1.0 | 1.8 | 4 kN-20 kA-500 msec | 4 kN-6 kA-400 msec | 150R | Example |
| 32 | 10 | 2 | 0.9 | 1.0 | 1.8 | 4 kN-20 kA-50 msec | — | 150R | Comparative Example |
| 33 | 10 | 2 | 0.9 | 1.0 | 1.8 | 4 kN-20 kA-100 msec | — | 150R | Comparative Example |
| 34 | 10 | 2 | 0.9 | 1.0 | 1.8 | 4 kN-20 kA-200 msec | — | 150R | Example |
| 35 | 10 | 2 | 0.9 | 1.0 | 1.8 | 4 kN-20 kA-300 msec | — | 150R | Comparative Example |
| 36 | 10 | 2 | 0.9 | 1.0 | 1.8 | 4 kN-20 kA-400 msec | — | 150R | Comparative Example |
| 37 | 10 | 2 | 0.9 | 1.0 | 1.8 | 4 kN-20 kA-50 msec | 4 kN-6 kA-400 msec | 150R | Comparative Example |
| 38 | 10 | 2 | 0.9 | 1.0 | 1.8 | 4 kN-20 kA-200 msec | 4 kN-6 kA-200 msec | 150R | Example |
| 39 | 10 | 2 | 0.9 | 1.0 | 1.8 | 4 kN-20 kA-200 msec | 4 kN-6 kA-400 msec | 150R | Example |

*The sheet thickness $t_1$ (0.9 mm) of steel product of 32 to 39 is a sheet thickness per one sheet of the steel product (the total sheet thickness of two sheets is 1.8 mm).

TABLE 14

(High-Tension GA Steel Sheet of 780 MPa Grade)

| Mark | Presence or Absence of $Al_5Fe_2$ Compound Layer | Joint Interface Reaction Layer | | | | | Nugget Diameter (mm) | Ratio of Minimum Residual Sheet Thickness of Aluminum Material to Original Sheet Thickness (%) | Cross Tensile Test Strength | Remarks |
|---|---|---|---|---|---|---|---|---|---|---|
| | | Area $S_1$ Occupied in Plane Direction by Portion Having Joint Interface Layer Thickness of 0.5 to 10 μm (mm²) | Ratio of $S_1$ to Nugget Area S (%) | Area $S_2$ Occupied in Cross-Sectional Direction by Portion Having Joint Interface Layer Thickness of 0.5 to 10 μm (μm²) | Ratio of Area $S_3$ of Zn—Fe-Based Compound Layer to $S_2 + S_3$ (%) | Ratio of Area $S_4$ of Zn Layer to Nugget Area S (%) | | | | |
| 15 | none | 6.9 | 19 | 580 | 19.5 | 48.3 | 6.8 | 92 | X | Comparative Example |
| 16 | none | 10.0 | 24 | 900 | 15.4 | 36.9 | 7.3 | 88 | X | Comparative Example |

TABLE 14-continued (High-Tension GA Steel Sheet of 780 MPa Grade)

| Mark | Presence or Absence of $Al_5Fe_2$ Compound Layer | Area $S_1$ Occupied in Plane Direction by Portion Having Joint Interface Layer Thickness of 0.5 to 10 μm (mm²) | Ratio of $S_1$ to Nugget Area S (%) | Area $S_2$ Occupied in Cross-Sectional Direction by Portion Having Joint Interface Layer Thickness of 0.5 to 10 μm (μm²) | Ratio of Area $S_3$ of Zn—Fe-Based Compound Layer to $S_2 + S_3$ (%) | Ratio of Area $S_4$ of Zn Layer to Nugget Area S (%) | Nugget Diameter (mm) | Ratio of Minimum Residual Sheet Thickness of Aluminum Material to Original Sheet Thickness (%) | Cross Tensile Test Strength | Remarks |
|---|---|---|---|---|---|---|---|---|---|---|
| 17 | none | 26.8 | 52 | 1380 | 11.8 | 29.4 | 8.1 | 70 | Δ | Comparative Example |
| 18 | none | 36.7 | 59 | 1660 | 8.9 | 21.8 | 8.9 | 46 | X | Comparative Example |
| 19 | none | 47.5 | 63 | 3540 | 8.3 | 17.3 | 9.8 | 38 | X | Comparative Example |
| 20 | present | 9.7 | 26 | 940 | 9.7 | 29.2 | 6.9 | 90 | Δ | Comparative Example |
| 21 | present | 28.5 | 54 | 2880 | 8.3 | 23.9 | 8.2 | 84 | ◯ | Example |
| 22 | none | 6.3 | 21 | 860 | 15.7 | 54.5 | 6.2 | 97 | X | Comparative Example |
| 23 | none | 11.5 | 29 | 1260 | 13.9 | 45.6 | 7.1 | 93 | X | Comparative Example |
| 24 | none | 22.6 | 38 | 1840 | 11.4 | 22.1 | 8.7 | 86 | Δ | Comparative Example |
| 25 | present | 49.7 | 62 | 4720 | 9.5 | 19.6 | 10.1 | 72 | ◯ | Example |
| 26 | present | 66.3 | 71 | 5780 | 8.2 | 9.9 | 10.9 | 65 | ◯ | Example |
| 27 | present | 76.8 | 78 | 7740 | 7.3 | 9.0 | 11.2 | 36 | X | Comparative Example |
| 28 | present | 14.2 | 33 | 1640 | 13.0 | 38.3 | 7.4 | 91 | X | Comparative Example |
| 29 | present | 47.3 | 76 | 4040 | 8.0 | 9.9 | 8.9 | 85 | ◯ | Example |
| 30 | present | 57.9 | 89 | 4980 | 6.2 | 4.8 | 9.1 | 83 | ◉ | Example |
| 31 | present | 90.1 | 94 | 8140 | 4.6 | 3.2 | 11.1 | 68 | ◉ | Example |
| 32 | none | 12.4 | 26 | 1240 | 15.2 | 43.7 | 7.8 | 83 | X | Comparative Example |
| 33 | none | 21.5 | 37 | 1380 | 12.0 | 29.3 | 8.6 | 75 | Δ | Comparative Example |
| 34 | present | 45.4 | 73 | 3200 | 9.4 | 15.9 | 8.9 | 71 | ◯ | Example |
| 35 | present | 53.7 | 79 | 5640 | 8.7 | 13.4 | 9.3 | 47 | Δ | Comparative Example |
| 36 | present | 60.1 | 83 | 6080 | 7.9 | 11.8 | 9.6 | 29 | X | Comparative Example |
| 37 | present | 13.7 | 28 | 1500 | 14.3 | 33.5 | 7.9 | 82 | X | Comparative Example |
| 38 | present | 48.8 | 75 | 4700 | 9.1 | 13.2 | 9.1 | 70 | ◯ | Example |
| 39 | present | 51.6 | 76 | 6680 | 6.9 | 7.4 | 9.3 | 68 | ◉ | Example |

TABLE 15

(GA Steel Sheet of 270 to 980 MPa Grade, galvanization film thickness: 10 μm)

| Mark | Steel Sheet | Number of Steel Products Stacked | Sheet Thickness $t_1$ of Steel Product (mm) | Sheet Thickness $t_2$ of Aluminum (mm) | Sheet Thickness Ratio $t_1/t_2$ | Spot Welding conditions Welding Pressure (kN), Welding Current (kA) and Welding Time (msec) in First Welding Step | Welding Pressure (kN), Welding Current (kA) and Welding Time (msec) in Second Welding Step | Tip Diameter of Electrode Chip | Remarks |
|---|---|---|---|---|---|---|---|---|---|
| 40 | 270GA | 1 | 0.8 | 1.0 | 0.8 | 3 kN-24 kA-200 msec | — | 150R | Comparative Example |
| 41 | 270GA | 1 | 0.8 | 1.0 | 0.8 | 3 kN-24 kA-200 msec | 4 kN-6 kA-400 msec | 150R | Comparative Example |
| 42 | 270GA | 2 | 0.8 | 1.0 | 1.6 | 4 kN-20 kA-200 msec | — | 150R | Comparative Example |
| 43 | 270GA | 2 | 0.8 | 1.0 | 1.6 | 4 kN-20 kA-400 msec | — | 150R | Example |
| 44 | 270GA | 2 | 0.8 | 1.0 | 1.6 | 4 kN-20 kA-200 msec | 4 kN-6 kA-400 msec | 150R | Example |
| 45 | 270GA | 2 | 0.8 | 1.0 | 1.6 | 4 kN-20 kA-400 msec | 4 kN-6 kA-400 msec | 150R | Example |
| 46 | 270GA | 2 | 1.2 | 1.0 | 2.4 | 4 kN-20 kA-100 msec | — | 150R | Comparative Example |
| 47 | 270GA | 2 | 1.2 | 1.0 | 2.4 | 4 kN-20 kA-200 msec | — | 150R | Example |
| 48 | 270GA | 2 | 1.2 | 1.0 | 2.4 | 4 kN-20 kA-400 msec | — | 150R | Example |
| 49 | 270GA | 2 | 1.2 | 1.0 | 2.4 | 4 kN-20 kA-50 msec | — | 150R | Comparative Example |
| 50 | 270GA | 2 | 1.2 | 1.0 | 2.4 | 4 kN-24 kA-100 msec | — | 150R | Example |
| 51 | 270GA | 2 | 1.2 | 1.0 | 2.4 | 4 kN-24 kA-200 msec | — | 150R | Example |
| 52 | 270GA | 2 | 1.2 | 1.0 | 2.4 | 4 kN-20 kA-400 msec | — | 150R | Comparative Example |
| 53 | 270GA | 2 | 1.2 | 1.0 | 2.4 | 4 kN-20 kA-200 msec | 4 kN-6 kA-400 msec | 150R | Example |
| 54 | 270GA | 2 | 1.2 | 1.0 | 2.4 | 4 kN-20 kA-400 msec | 4 kN-6 kA-400 msec | 150R | Example |
| 55 | 270GA | 2 | 1.2 | 1.0 | 2.4 | 4 kN-24 kA-100 msec | 4 kN-6 kA-400 msec | 150R | Example |
| 56 | 270GA | 2 | 1.2 | 1.0 | 2.4 | 4 kN-24 kA-200 msec | 4 kN-6 kA-400 msec | 150R | Example |
| 57 | 270GA | 2 | 1.2 | 1.0 | 2.4 | 4 kN-24 kA-400 msec | 4 kN-6 kA-400 msec | 150R | Comparative Example |
| 58 | 590GA | 1 | 1.2 | 1.0 | 1.2 | 3 kN-24 kA-100 msec | — | 150R | Comparative Example |
| 59 | 590GA | 1 | 1.2 | 1.0 | 1.2 | 3 kN-24 kA-200 msec | — | 150R | Example |
| 60 | 590GA | 1 | 1.2 | 1.0 | 1.2 | 3 kN-24 kA-600 msec | — | 150R | Comparative Example |
| 61 | 590GA | 1 | 1.2 | 1.0 | 1.2 | 3 kN-24 kA-100 msec | 3 kN-6 kA-400 msec | 150R | Example |
| 62 | 590GA | 1 | 1.2 | 1.0 | 1.2 | 3 kN-24 kA-200 msec | 3 kN-6 kA-400 msec | 150R | Example |
| 63 | 590GA | 1 | 1.2 | 1.0 | 1.2 | 3 kN-24 kA-300 msec | 3 kN-6 kA-400 msec | 150R | Comparative Example |
| 64 | 980GA | 1 | 1.2 | 1.0 | 1.2 | 3 kN-24 kA-100 msec | — | 150R | Comparative Example |
| 65 | 980GA | 1 | 1.2 | 1.0 | 1.2 | 3 kN-24 kA-200 msec | — | 150R | Example |
| 66 | 980GA | 1 | 1.2 | 1.0 | 1.2 | 3 kN-24 kA-600 msec | — | 150R | Comparative Example |
| 67 | 980GA | 1 | 1.2 | 1.0 | 1.2 | 3 kN-24 kA-100 msec | 3 kN-6 kA-400 msec | 150R | Example |
| 68 | 980GA | 1 | 1.2 | 1.0 | 1.2 | 3 kN-24 kA-200 msec | 3 kN-6 kA-400 msec | 150R | Example |
| 69 | 980GA | 1 | 1.2 | 1.0 | 1.2 | 3 kN-24 kA-300 msec | 3 kN-6 kA-400 msec | 150R | Comparative Example |

*The sheet thickness $t_1$ of steel product of 42 to 55 is a sheet thickness per one sheet of the steel product (the total sheet thickness of two sheets is $t_1 \times 2$).

TABLE 16

(GA Steel Sheet of 270 to 980 MPa Grade, galvanization film thickness: 10 μm)

| Mark | Presence or Absence of $Al_5Fe_2$ Compound Layer | Joint Interface Reaction Layer Area $S_1$ Occupied in Plane Direction by Portion Having Joint Interface Reaction Layer Thickness of 0.5 to 10 μm (mm²) | Ratio of $S_1$ to Nugget Area S (%) | Area $S_2$ Occupied in Cross-Sectional Direction by Portion Having Joint Interface Reaction Layer Thickness of 0.5 to 10 μm (μm²) | Ratio of Area $S_3$ of Zn—Fe-Based Compound Layer to $S_2 + S_3$ (%) | Ratio of Area $S_4$ of Zn Layer to Nugget Area S (%) | Nugget Diameter (mm) | Ratio of Minimum Residual Sheet Thickness of Aluminum Material to Original Sheet Thickness (%) | Cross Tensile Test Strength | Remarks |
|---|---|---|---|---|---|---|---|---|---|---|
| 40 | none | 14.5 | 41 | 1240 | 18.3 | 44.7 | 6.7 | 84 | X | Comparative Example |
| 41 | present | 16.1 | 43 | 1400 | 17.1 | 40.5 | 6.9 | 81 | X | Comparative Example |

TABLE 16-continued (GA Steel Sheet of 270 to 980 MPa Grade, galvanization film thickness: 10 μm)

Joint Interface Reaction Layer

| Mark | Presence or Absence of $Al_5Fe_2$ Compound Layer | Area $S_1$ Occupied in Plane Direction by Portion Having Joint Interface Reaction Layer Thickness of 0.5 to 10 μm ($mm^2$) | Ratio of $S_1$ to Nugget Area S (%) | Area $S_2$ Occupied in Cross-Sectional Direction by Portion Having Joint Interface Reaction Layer Thickness of 0.5 to 10 μm ($μm^2$) | Ratio of Area $S_3$ of Zn—Fe-Based Compound Layer to $S_2 + S_3$ (%) | Ratio of Area $S_4$ of Zn Layer to Nugget Area S (%) | Nugget Diameter (mm) | Ratio of Minimum Residual Sheet Thickness of Aluminum Material to Original Sheet Thickness (%) | Cross Tensile Test Strength | Remarks |
|---|---|---|---|---|---|---|---|---|---|---|
| 42 | none | 46.6 | 62 | 2060 | 12.9 | 31.3 | 7.7 | 78 | Δ | Comparative Example |
| 43 | present | 46.2 | 71 | 4420 | 9.2 | 14.4 | 9.1 | 71 | ○ | Example |
| 44 | present | 67.7 | 88 | 4940 | 5.9 | 6.5 | 9.9 | 82 | ⊚ | Example |
| 45 | present | 52.5 | 63 | 6600 | 4.2 | 3.8 | 10.3 | 57 | ○ | Example |
| 46 | none | 28.5 | 54 | 2600 | 10.4 | 34.1 | 8.2 | 80 | Δ | Comparative Example |
| 47 | present | 48.2 | 81 | 3360 | 9.3 | 22.5 | 8.7 | 74 | ○ | Example |
| 48 | present | 47.2 | 68 | 6900 | 8.8 | 10.8 | 9.4 | 56 | ○ | Example |
| 49 | none | 21.1 | 39 | 2360 | 15.5 | 47.1 | 8.3 | 78 | X | Comparative Example |
| 50 | present | 40.9 | 72 | 3940 | 9.6 | 28.9 | 8.5 | 77 | ○ | Example |
| 51 | present | 63.4 | 84 | 5080 | 7.7 | 19.4 | 9.8 | 70 | ○ | Example |
| 52 | present | 73.3 | 88 | 8640 | 6.1 | 12.8 | 10.3 | 36 | X | Comparative Example |
| 53 | present | 52.3 | 84 | 4680 | 8.9 | 19.7 | 8.9 | 64 | ○ | Example |
| 54 | present | 64.3 | 81 | 8680 | 6.8 | 8.4 | 10.1 | 54 | ○ | Example |
| 55 | present | 51.4 | 71 | 5860 | 8.3 | 11.6 | 9.6 | 78 | ○ | Example |
| 56 | present | 76.7 | 92 | 6720 | 4.1 | 3.4 | 10.3 | 71 | ⊚ | Example |
| 57 | present | 94.3 | 94 | 9480 | 3.8 | 3.1 | 11.3 | 23 | X | Comparative Example |
| 58 | none | 12.0 | 32 | 1640 | 14.3 | 38.1 | 6.9 | 91 | Δ | Comparative Example |
| 59 | present | 25.9 | 57 | 3160 | 9.1 | 27.4 | 7.6 | 80 | ○ | Example |
| 60 | present | 49.2 | 74 | 6840 | 7.3 | 8.9 | 9.2 | 32 | X | Comparative Example |
| 61 | present | 34.5 | 67 | 3280 | 9.0 | 18.2 | 8.1 | 88 | ○ | Example |
| 62 | present | 44.8 | 72 | 4420 | 8.4 | 14.5 | 8.9 | 76 | ○ | Example |
| 63 | present | 56.5 | 78 | 6980 | 6.8 | 10.3 | 9.6 | 45 | Δ | Comparative Example |
| 64 | none | 15.4 | 39 | 1500 | 12.9 | 33.8 | 7.1 | 88 | Δ | Comparative Example |
| 65 | present | 41.2 | 71 | 3200 | 8.7 | 21.5 | 8.6 | 81 | ○ | Example |
| 66 | present | 52.5 | 79 | 6220 | 7.3 | 14.0 | 9.2 | 39 | X | Comparative Example |
| 67 | present | 43.0 | 74 | 3640 | 5.2 | 10.9 | 8.6 | 83 | ⊚ | Example |
| 68 | present | 55.2 | 83 | 3740 | 4.1 | 8.6 | 9.2 | 67 | ○ | Example |
| 69 | present | 61.0 | 86 | 6460 | 3.7 | 7.3 | 9.5 | 48 | Δ | Comparative Example |

Dissimilar material joint products were produced under the conditions shown in Tables 11, 13 and 15. The produced joint products each was measured for the area ratio of each compound by the measuring method described above, and the bonding strength and decrease in the thickness of the aluminum material (minimum residual sheet thickness) were evaluated. The results of joining by spot welding under the conditions of Table 11 are shown together in Table 12, the results of joining by spot welding under the conditions of Table 13 are shown together in Table 14, and the results of joining by spot welding under the conditions of Table 15 are shown together in Table 16.

(Steel Product Conditions)

Four kinds of steel products for test containing the chemical components (mass %) shown in Table 9 each was melted, and the melt was rolled to a sheet thickness of 0.8 to 1.2 mm to obtain a shin steel sheet. The shin steel sheet was annealed by continuous annealing at 500 to 1,000° C., subjected to hot-water washing or water washing and then tempered to obtain four kinds of steel sheets having respective strengths (MPa) shown in Table 9.

(Aluminum Material Conditions)

Aluminum materials used are all in common a commercially available A6022 aluminum alloy sheet (0.6 mass % of Al-1.0 mass % of Si-0.08 mass % of Mn-0.17 mass % of Fe) having a sheet thickness of 1.0 mm.

(Spot Welding Conditions)

These steel sheet (steel material) and aluminum alloy sheet (aluminum material) were worked into a cross tensile test specimen shape described in JIS A 3137 and then spot-welded under the conditions shown in Table 10 to produce a dissimilar material joint product.

A dc resistance welding tester was used for the spot welding, and the correlation between the conditions such as welding pressure, welding current and time and the control of the average thickness or area of sire compound specified in the present invention was previously examined. Thereafter, the welding pressure, welding current and time each was set according to the sheet thickness $t_2$ of the aluminum material, and welding was performed at one point under the conditions shown in each Table.

The welding pressure, welding current and electrification time were changed within respective preferred ranges described in the above in relation to the following electrode chip used.

In the case of passing a current in two steps at the spot welding, except for passing a lower current in the second step than the current passed in the first step, the welding pressure was the same and a welding pressure, a current, value and a total electrification time each in the above-described preferred range were employed in both the first and second steps.

The electrode chips all were a 12 mm$\phi$ dome-type chip composed of Cu—Cr alloy, in which the curvature at the electrode tip was 150 mmR, and the anode and the cathode were assigned to the aluminum material and the steel product, respectively.

In the measurement of nugget diameter, minimum residual sheet thickness of aluminum and residual ratio of Zn plating layer, the sample after spot welding was cut at the welded part center, embedded in a resin, polished, subjected to chemical etching and then observed through an optical microscope at a magnification of 200.

The thickness of the interface reaction layer was measured using the same cross-sectional sample as above by the above-described measuring method.

(Evaluation of Bonding Strength)

As for the evaluation of bonding strength of each joint product, a cross tensile test of the dissimilar material joint product was performed. In the cross tensile test, based on the bonding strength (=1.0 kN) between A6022 material, the sample was rated ⊚ when the bonding strength was 1.5 kN or more or the rupture mode was the aluminum base material rupture, rated ○ when the bonding strength was from 1.0 to 1.5 kN, rated Δ when the bonding strength was from 0.5 to 1.0 kN, and rated x when the bonding strength was less than 0.5 kN.

Incidentally, in this Example, a cross tensile test, was employed for the evaluation of the strength, because the difference among test conditions was larger in the cross tensile test than in the shear tensile test. However, when the shear tensile test was performed using some samples selected from Examples of the Invention, the results agreed with the test results in this cross tensile test, and samples rated ○ and ⊚ in the cross tensile test all had a high shear strength of 2.5 kN or more.

As regards the results of joining by spot welding in Tables 12, 14 and 16, in Examples of the Invention, the ratio of the total area $S_1$ occupied in the plane direction by the joint interface compound layer portion having a given thickness to the nugget area S is 50% or more. Also, the ratio of the total area $S_2+S_3$ of the Zn—Fe-based compound layer and other two layers to the area $S_2$ occupied in the cross-sectional direction by the joint interface compound layer portion having a given thickness is 10% or less. Furthermore, as preferred conditions, the total area $S_4$ occupied in the plane direction by the Zn layer at the joint Interface in contact with the nugget accounts for 30% or less of the nugget area S and the nugget average diameter is 7.0 mm or more.

Consequently, as shown in Tables 12, 14 and 16, high bonding strength of the dissimilar material joint product is obtained in Examples of the Invention. Among Examples of the Invention, as the area of the joint interface compound layer portion having a given thickness is larger or the area of the Zn—Fe-based compound layer portion is smaller, the bonding strength of the dissimilar material joint product is higher. Also, as the nugget average diameter is larger or the total area $S_4$ occupied in the plane direction by the Zn layer is smaller, which are preferred conditions, the bonding strength of the dissimilar material joint product is higher.

As regards the results of joining by spot welding in Tables 12, 14 and 16, in Comparative Examples, the ratio of the total area $S_1$ occupied in the plane direction to the nugget area S is less than 50% or the ratio of the total area $S_2+S_3$ of the Zn—Fe-based compound layer and other two layers to the area $S_2$ occupied in the cross-sectional direction by the joint interface compound layer portion having a given thickness exceeds 10%. That is, the area of the joint interface compound layer portion having a given thickness is too small or the area of the Zn—Fe-based compound layer portion is too large. Consequently, the bonding strength of the dissimilar material joint product is extremely low as compared with corresponding Examples of the Invention.

Here, the joint interface texture is specifically compared between Example 8 of the Invention and Comparative Example 7 in Table 12. FIGS. 6 and 7 each shows the joint interface texture of Example 8 of the Invention. FIG. 6 is an SEM photograph of the joint interface at a magnification of 5,000, and FIG. 7 is a TEM photograph of the same joint interface at a magnification of 5,000. As seen from FIGS. 6 and 7, the joint interface texture of Example 8 of the Invention has an $Al_5Fe_2$-based compound layer on the steel product side and an $Al_3Fe$-based compound layer on the aluminum material side.

Figure 12:
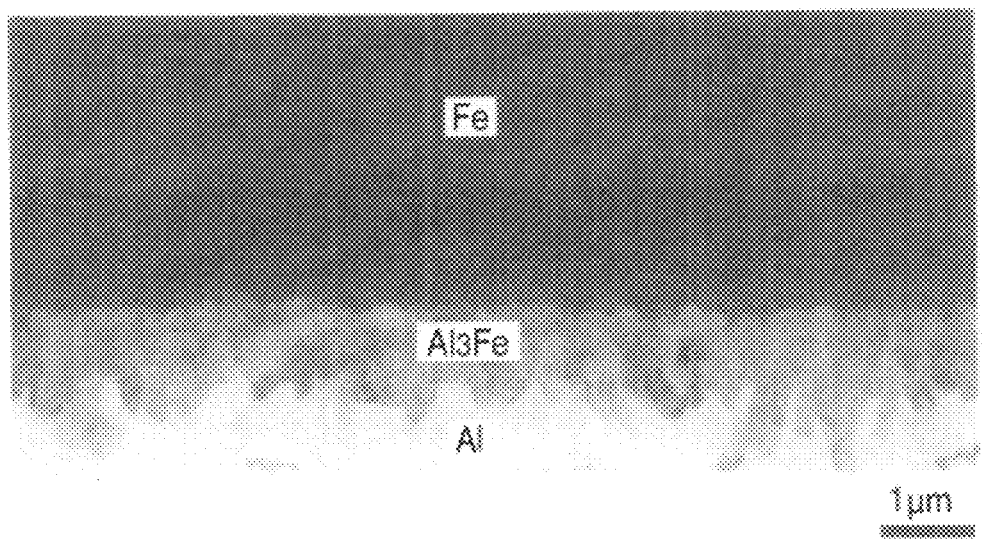
FIG. 12 is a drawing-substituting TEM photograph showing the cross-sectional texture in the joint part interface of the dissimilar material joint product of Comparative Example.

On the other hand, FIG. 12 shows the joint interface structure of Comparative Example 7 and is a TEM photograph of the joint interface at a magnification of 5,000. As seen from FIG. 12, the joint interface texture of Comparative Example 7 has an $Al_3Fe$-based compound layer on the aluminum material side, but an $Al_5Fe_2$-based compound layer is not present on the steel product side.

Figure 8:
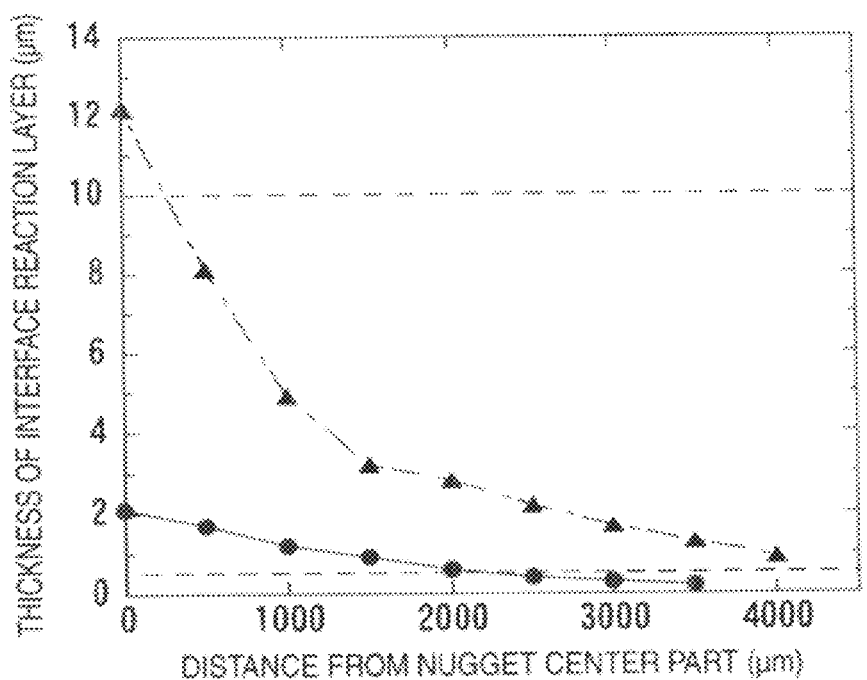
FIG. 8 is an explanatory view showing the thickness distribution of the interface reaction layer in the joint part of the dissimilar material joint product of the present invention.

FIG. 8 shows the distribution of the total average thickness of two layers, that is, $Al_3Fe$-based compound layer and $Al_5Fe_2$-based compound layer, in each of Example 8 of the Invention and Comparative Example 7 with respect to the distance from the nugget center part. In FIG. 8, the portion where the total average thickness l of these two layers is from 0.5 to 10 μm is the region between two dotted lines.

In Example 8 of the Invention denoted by black triangles, the portion having an average thickness l of 0.5 to 10 μm extends to the portion at a distance of 4,000 μm from the nugget center part, except for the nugget center part where the average thickness is too large. In FIG. 9, this state, at the joint interface on the aluminum material side, is planarly shown. That is, in Example 8 of the Invention, the area ratio to the area S occupied in the plane direction by the nugget at the joint interface on the aluminum material side is 80%, and the portion is almost approximated by (overlapped with) the nugget (area S).

On the other hand, in Comparative Example 7 denoted by black circles below Example 8 of the Invention, the range of the portion where the average thickness l is from 0.5 to 10 μm is up to the position at a distance of 2,000 μm from the nugget center part. In FIG. 10, this state, at the joint interface on the aluminum material side, is planarly shown. That is, in Comparative Example 7, the area ratio to the area S occupied in the plane direction by the nugget at the joint interface on the aluminum material side is 36%, and the portion is overlapped with the nugget (area S) only in the nugget center part and its peripheral part.

Accordingly, critical meanings in specifying the thickness and structure of the interface reaction layer at joint interface in the present invention to obtain high bonding strength of the dissimilar material joint product ate corroborated by Examples above.

INDUSTRIAL APPLICABILITY

According to the present invention, in producing a dissimilar material joint product of a steel product and an aluminum material by spot welding, an existing spot welding apparatus can be used, unlike conventional techniques, without newly using other materials such or without newly adding a separate step, so that great reduction in the cost can he realized.

Also, according to the present invention, a dissimilar material joint product and a spot welding method for the dissimilar material joint product can be provided, ensuring that in joining a steel product and an aluminum material together by spot welding, the bonding strength can be increased and at the same time, the contact corrosion and in turn, reduction in the bonding strength can be suppressed.

Furthermore, according to the present invention, a dissimilar material joint product of a steel product and an aluminum material can be provided, ensuring that spot welding with high bonding strength can be performed without using other materials such as clad material, without adding a separate step and without greatly changing the conditions on the steel product side, aluminum material side or spot welding side.

Such a joint product can he very usefully applied as various structural members in the transport field such as automobile and railway vehicle or in a mechanical part, a building structure rend the like.

Consequently, the usage of a dissimilar material joint product between a steel product and an aluminum material can be greatly expanded by the present invention.

The invention claimed is:

1. A method for spot-welding a steel product and an aluminum material, said method comprising:
    forming a joint product of the steel product and the aluminum material by spot welding a steel product having a sheet thickness $t_1$ of 0.3 to 3.0 mm with an aluminum material having a sheet thickness $t_2$ of 0.5 to 4.0 mm,
    wherein a nugget area in a joint part is from $20 \times t_2^{0.5}$ to $100 \times t_2^{0.5}$ mm$^2$,
    wherein an area of a portion where a thickness of an interface reaction layer is from 0.5 to 3 μm is $10 \times t_2^{0.5}$ mm$^2$ or more,
    wherein a difference between the thickness of the interface reaction layer at a joint part center and the thickness of the interface reaction layer at a point distant from the joint part center by a distance of one-fourth of a joint diameter is 5 μm or less,
    wherein the aluminum material is either a pure aluminum or an aluminum alloy material, and
    wherein the spot welding is performed while cooling at least one of the steel product and the aluminum material to 5° C. or less.

2. The method according to claim 1, wherein the interface reaction layer has a maximum thickness in a range of 0.5 to 10 μm.

* * * * *